(12) United States Patent
Retterath et al.

(10) Patent No.: US 10,036,801 B2
(45) Date of Patent: Jul. 31, 2018

(54) METHODS AND APPARATUS FOR INCREASED PRECISION AND IMPROVED RANGE IN A MULTIPLE DETECTOR LIDAR ARRAY

(71) Applicant: Big Sky Financial Corporation, Oviedo, FL (US)

(72) Inventors: James E. Retterath, Excelsior, MN (US); Robert A. Laumeyer, Eden Prairie, MN (US)

(73) Assignee: Big Sky Financial Corporation, Oviedo, FL (US)

( * ) Notice: Subject to any disclaimer, the term of this patent is extended or adjusted under 35 U.S.C. 154(b) by 489 days.

(21) Appl. No.: 14/639,802

(22) Filed: Mar. 5, 2015

(65) Prior Publication Data
US 2016/0259038 A1    Sep. 8, 2016

(51) Int. Cl.
*G01S 7/48* (2006.01)
*G01S 7/486* (2006.01)
(Continued)

(52) U.S. Cl.
CPC .......... *G01S 7/4802* (2013.01); *G01S 7/4815* (2013.01); *G01S 7/4865* (2013.01); *G01S 17/10* (2013.01); *G01S 17/89* (2013.01); *G01S 17/936* (2013.01)

(58) Field of Classification Search
CPC ........ G01S 17/10; G01S 17/93; G01S 7/4865; G01S 7/4863; G01S 7/4815
See application file for complete search history.

(56) References Cited

U.S. PATENT DOCUMENTS 3,971,065 A   7/1976 Bayer
4,185,891 A   1/1980 Kaestner
(Continued)

FOREIGN PATENT DOCUMENTS

EP           1912078 A1    4/2008
WO     WO 2013/127975 A1   9/2013

OTHER PUBLICATIONS

Application No. PCT/US2016/018872, filed Feb. 22, 2016, Search Report/Written Opinion dated Nov. 15, 2016, 8 pages.
(Continued)

*Primary Examiner* — Luke D Ratcliffe
(74) *Attorney, Agent, or Firm* — Patterson Thuente Pedersen, P.A.

(57) ABSTRACT

Methods, systems, and computer program products for acquiring three-dimensional LiDAR information of a scene are disclosed. According to one aspect, acquiring three-dimensional information includes emitting N pulses in a sequence with each successive pulse having a relative time shift to the sampling reference, thus producing a reconstructed sampled signal with an effective sampling rate of N times the sampling reference. According to another aspect, acquiring three-dimensional information includes emitting two or more frequencies, the differences of each pair of differing frequencies being designated as Δf, and sampling the return information with the use of a sampling reference. Frequency analysis is performed on the sampled information to determine the reference times at which the Δf signals occur and the signal intensity of the Δf signals at each time. Systems as described herein can be utilized for autonomous vehicle navigation, collision avoidance and navigation systems for UAVs, roadway surface texture analysis, non-contact friction analysis, and in-motion deflectometer measurement.

20 Claims, 29 Drawing Sheets

(51) Int. Cl.
*G01S 17/89* (2006.01)
*G01S 17/10* (2006.01)
*G01S 17/93* (2006.01)
*G01S 7/481* (2006.01)

(56) References Cited

U.S. PATENT DOCUMENTS

| | | |
|---|---|---|
| 4,739,398 A | 4/1988 | Thomas et al. |
| 4,935,616 A | 6/1990 | Scott |
| 5,006,721 A | 4/1991 | Cameron et al. |
| 5,026,156 A | 6/1991 | Bayston et al. |
| 5,054,911 A | 10/1991 | Ohishi et al. |
| 5,081,530 A | 1/1992 | Medina |
| 5,084,895 A | 1/1992 | Shimada et al. |
| 5,090,245 A | 2/1992 | Anderson |
| 5,122,796 A | 6/1992 | Beggs et al. |
| 5,212,706 A | 5/1993 | Jam |
| 5,400,350 A | 3/1995 | Galvanauskas |
| 5,418,359 A | 5/1995 | Juds et al. |
| 5,420,722 A | 5/1995 | Bielak |
| 5,446,529 A | 8/1995 | Stettner et al. |
| 5,465,142 A | 11/1995 | Krumes et al. |
| 5,485,009 A | 1/1996 | Meyzonnetie et al. |
| 5,497,269 A | 3/1996 | Gal |
| 5,619,317 A | 4/1997 | Oishi et al. |
| 5,675,326 A | 10/1997 | Juds et al. |
| 5,682,229 A | 10/1997 | Wangler |
| 5,793,491 A | 8/1998 | Wangler et al. |
| 5,831,551 A | 11/1998 | Geduld |
| 5,892,575 A | 4/1999 | Marino |
| 5,940,170 A | 8/1999 | Berg et al. |
| 6,118,518 A | 9/2000 | Hobbs |
| 6,133,989 A | 10/2000 | Stettner et al. |
| 6,150,956 A | 11/2000 | Laufer |
| 6,181,463 B1 | 1/2001 | Galvanauskas et al. |
| 6,212,480 B1 | 4/2001 | Dunne |
| 6,323,942 B1 | 11/2001 | Bamji |
| 6,327,090 B1 | 12/2001 | Rando et al. |
| 6,370,291 B1 | 4/2002 | Mitchell |
| 6,373,557 B1 | 4/2002 | Megel et al. |
| 6,377,167 B1 | 4/2002 | Juds et al. |
| 6,448,572 B1 | 9/2002 | Tennant et al. |
| 6,456,368 B2 | 9/2002 | Seo |
| 6,480,265 B2 | 11/2002 | Maimon et al. |
| 6,512,892 B1 | 1/2003 | Montgomery et al. |
| 6,522,396 B1 | 2/2003 | Halmos |
| 6,535,275 B2 | 3/2003 | McCaffrey et al. |
| 6,619,406 B1 | 9/2003 | Kacyra et al. |
| 6,646,725 B1 | 11/2003 | Eichinger et al. |
| 6,654,401 B2 | 11/2003 | Cavalheiro Vieira et al. |
| 6,665,055 B2 | 12/2003 | Ohishi et al. |
| 6,674,878 B2 | 1/2004 | Retterath et al. |
| 6,683,727 B1 | 1/2004 | Göring et al. |
| 6,717,972 B2 | 4/2004 | Steinle et al. |
| 6,843,416 B2 | 1/2005 | Swartz et al. |
| 6,873,640 B2 | 3/2005 | Bradburn et al. |
| 6,881,979 B2 | 4/2005 | Starikov et al. |
| 6,906,302 B2 | 6/2005 | Drowley |
| 6,975,251 B2 | 12/2005 | Pavicic |
| 6,987,447 B2 | 1/2006 | Baerenweiler et al. |
| 7,016,519 B1 | 3/2006 | Nakamura et al. |
| 7,148,974 B1 | 12/2006 | Schmitt et al. |
| 7,171,037 B2 | 1/2007 | Mahon et al. |
| 7,224,384 B1 | 5/2007 | Iddan et al. |
| 7,236,235 B2 | 6/2007 | Dimsdale |
| 7,248,342 B1 | 7/2007 | Degnan |
| 7,248,344 B2 | 7/2007 | Morcom |
| 7,294,863 B2 | 11/2007 | Lee et al. |
| 7,362,419 B2 | 4/2008 | Kurihara et al. |
| 7,436,494 B1 | 10/2008 | Kennedy et al. |
| 7,453,553 B2 | 11/2008 | Dimsdale |
| 7,474,821 B2 | 1/2009 | Donlagic et al. |
| 7,521,666 B2 | 4/2009 | Tsang |
| 7,534,984 B2 | 5/2009 | Gleckler |
| 7,542,499 B2 | 6/2009 | Jikutani |
| 7,544,945 B2 | 6/2009 | Tan et al. |
| 7,551,771 B2 | 6/2009 | England, III |
| 7,560,680 B2 | 7/2009 | Sato et al. |
| 7,607,509 B2 | 10/2009 | Schmiz et al. |
| 7,623,248 B2 | 11/2009 | Laflamme |
| 7,649,654 B2 | 1/2010 | Shyu et al. |
| 7,663,095 B2 | 2/2010 | Wong et al. |
| 7,689,032 B2 | 3/2010 | Strassenburg-Kleciak |
| 7,733,932 B2 | 6/2010 | Faybishenko |
| 7,755,743 B2 | 7/2010 | Kumahara et al. |
| 7,755,809 B2 | 7/2010 | Fujita et al. |
| 7,787,105 B2 | 8/2010 | Hipp |
| 7,787,511 B2 | 8/2010 | Jikutani et al. |
| 7,830,442 B2 | 11/2010 | Griffis et al. |
| 7,830,532 B2 | 11/2010 | De Coi |
| 7,873,091 B2 | 1/2011 | Parent et al. |
| 7,881,355 B2 | 2/2011 | Sipes, Jr. |
| 7,888,159 B2 | 2/2011 | Venezia et al. |
| 7,894,725 B2 | 2/2011 | Holman et al. |
| 7,900,736 B2 | 3/2011 | Breed |
| 7,911,617 B2 | 3/2011 | Padmanabhan et al. |
| 7,940,825 B2 | 5/2011 | Jikutani |
| 7,944,548 B2 | 5/2011 | Eaton |
| 7,945,408 B2 | 5/2011 | Dimsdale et al. |
| 7,957,448 B2 | 6/2011 | Willemin et al. |
| 7,957,639 B2 | 6/2011 | Lee et al. |
| 7,960,195 B2 | 6/2011 | Maeda et al. |
| 7,961,328 B2 | 6/2011 | Austin et al. |
| 7,969,558 B2 | 6/2011 | Hall |
| 7,979,173 B2 | 7/2011 | Breed |
| 7,983,817 B2 | 7/2011 | Breed |
| 7,986,461 B2 | 7/2011 | Bartoschewski |
| 7,991,222 B2 | 8/2011 | Dimsdale et al. |
| 7,994,465 B1 | 8/2011 | Bamji et al. |
| 8,045,595 B2 | 10/2011 | Ma |
| 8,054,203 B2 | 11/2011 | Breed et al. |
| 8,054,464 B2 | 11/2011 | Mathur et al. |
| 8,072,581 B1 | 12/2011 | Breiholz |
| 8,072,663 B2 | 12/2011 | O'Neill et al. |
| 8,077,294 B1 | 12/2011 | Grund et al. |
| 8,089,498 B2 | 1/2012 | Sato et al. |
| 8,094,060 B2 | 1/2012 | Beard et al. |
| 8,098,969 B2 | 1/2012 | Tolstikhin et al. |
| 8,102,426 B2 | 1/2012 | Yahav et al. |
| 8,111,452 B2 | 2/2012 | Butler et al. |
| 8,115,158 B2 | 2/2012 | Buettgen |
| 8,120,754 B2 | 2/2012 | Kaehler |
| 8,125,367 B2 | 2/2012 | Ludwig |
| 8,125,620 B2 | 2/2012 | Lewis |
| 8,159,598 B2 | 4/2012 | Watanabe et al. |
| 8,194,712 B2 | 6/2012 | Müller et al. |
| 8,198,576 B2 | 6/2012 | Kennedy et al. |
| 8,199,786 B2 | 6/2012 | Gaillard et al. |
| 8,212,998 B2 | 7/2012 | Rindle |
| 8,213,479 B2 | 7/2012 | Doerfel et al. |
| 8,229,663 B2 | 7/2012 | Zeng et al. |
| 8,235,416 B2 | 8/2012 | Breed et al. |
| 8,235,605 B2 | 8/2012 | Kim |
| 8,238,393 B2 | 8/2012 | Iwasaki |
| 8,242,428 B2 | 8/2012 | Meyers et al. |
| 8,242,476 B2 | 8/2012 | Memeault et al. |
| 8,249,798 B2 | 8/2012 | Hawes et al. |
| 8,259,003 B2 | 9/2012 | Song |
| 8,280,623 B2 | 10/2012 | Trepagnier et al. |
| 8,301,027 B2 | 10/2012 | Shaw et al. |
| 8,310,654 B2 | 11/2012 | Weilkes et al. |
| 8,319,949 B2 | 11/2012 | Cantin et al. |
| 8,325,256 B2 | 12/2012 | Egawa |
| 8,338,900 B2 | 12/2012 | Venezia et al. |
| 8,340,151 B2 | 12/2012 | Liu et al. |
| 8,354,928 B2 | 1/2013 | Morcom |
| 8,355,117 B2 | 1/2013 | Niclass |
| 8,363,156 B2 | 1/2013 | Lo |
| 8,363,511 B2 | 1/2013 | Frank et al. |
| 8,364,334 B2 | 1/2013 | Au et al. |
| 8,368,005 B2 | 2/2013 | Wang et al. |
| 8,368,876 B1 | 2/2013 | Johnson et al. |
| 8,378,287 B2 | 2/2013 | Schemmann et al. |
| 8,378,885 B2 | 2/2013 | Comic et al. |

(56) References Cited

U.S. PATENT DOCUMENTS

| | | |
|---|---|---|
| 8,380,367 B2 | 2/2013 | Schultz et al. |
| 8,391,336 B2 | 3/2013 | Chiskis |
| 8,401,046 B2 | 3/2013 | Shveykin et al. |
| 8,401,049 B2 | 3/2013 | Sato et al. |
| 8,422,148 B2 | 4/2013 | Langer et al. |
| 8,437,584 B2 | 5/2013 | Matsuoka et al. |
| 8,442,084 B2 | 5/2013 | Ungar |
| 8,451,432 B2 | 5/2013 | Crawford et al. |
| 8,451,871 B2 | 5/2013 | Yankov |
| 8,456,517 B2 | 6/2013 | Spektor et al. |
| 8,477,819 B2 | 7/2013 | Kitamura |
| 8,487,525 B2 | 7/2013 | Lee |
| 8,494,687 B2 | 7/2013 | Vanek et al. |
| 8,503,888 B2 | 8/2013 | Takemoto et al. |
| 8,508,567 B2 | 8/2013 | Sato et al. |
| 8,508,720 B2 | 8/2013 | Kamiyama |
| 8,508,721 B2 | 8/2013 | Cates et al. |
| 8,520,713 B2 | 8/2013 | Joseph |
| 8,531,650 B2 | 9/2013 | Feldkhun et al. |
| 8,538,636 B2 | 9/2013 | Breed |
| 8,558,993 B2 | 10/2013 | Newbury et al. |
| 8,570,372 B2 | 10/2013 | Russell |
| 8,587,637 B1 | 11/2013 | Cryder et al. |
| 8,594,455 B2 | 11/2013 | Meyers et al. |
| 8,599,367 B2 | 12/2013 | Canham |
| 8,604,932 B2 | 12/2013 | Breed et al. |
| 8,605,262 B2 | 12/2013 | Campbell et al. |
| 8,619,241 B2 | 12/2013 | Mimeault |
| 8,633,989 B2 | 1/2014 | Okuda |
| 8,640,182 B2 | 1/2014 | Bedingfield, Sr. |
| 8,655,513 B2 | 2/2014 | Vanek |
| 8,675,184 B2 | 3/2014 | Schmitt et al. |
| 8,681,255 B2 | 3/2014 | Katz et al. |
| 8,687,172 B2 | 4/2014 | Faul et al. |
| 8,717,417 B2 | 5/2014 | Sali et al. |
| 8,717,492 B2 | 5/2014 | McMackin et al. |
| 8,723,689 B2 | 5/2014 | Mimeault |
| 8,724,671 B2 | 5/2014 | Moore |
| 8,736,670 B2 | 5/2014 | Barbour et al. |
| 8,736,818 B2 | 5/2014 | Weimer et al. |
| 8,742,325 B1 | 6/2014 | Droz et al. |
| 8,743,455 B2 | 6/2014 | Gusev et al. |
| 8,754,829 B2 | 6/2014 | Lapstun |
| 8,760,499 B2 | 6/2014 | Russell |
| 8,767,190 B2 | 7/2014 | Hall |
| 8,773,642 B2 | 7/2014 | Eisele et al. |
| 8,781,790 B2 | 7/2014 | Zhu et al. |
| 8,797,550 B2 | 8/2014 | Hays et al. |
| 8,804,101 B2 | 8/2014 | Spagnolia et al. |
| 8,809,758 B2 | 8/2014 | Molnar et al. |
| 8,810,647 B2 | 8/2014 | Niclass et al. |
| 8,810,796 B2 | 8/2014 | Hays et al. |
| 8,811,720 B2 | 8/2014 | Seida |
| 8,820,782 B2 | 9/2014 | Breed et al. |
| 8,836,921 B2 | 9/2014 | Feldkhun et al. |
| 8,854,426 B2 | 10/2014 | Pellman et al. |
| 8,855,849 B1 | 10/2014 | Ferguson et al. |
| 8,864,655 B2 | 10/2014 | Ramamurthy et al. |
| 8,885,152 B1 | 11/2014 | Wright |
| 8,908,157 B2 | 12/2014 | Eisele et al. |
| 8,908,159 B2 | 12/2014 | Mimeault |
| 8,918,831 B2 | 12/2014 | Meuninck et al. |
| 8,928,865 B2 | 1/2015 | Rakuljic |
| 8,933,862 B2 | 1/2015 | Lapstun |
| 8,934,087 B1 | 1/2015 | Stobie et al. |
| 8,947,647 B2 | 2/2015 | Halmos et al. |
| 8,963,956 B2 | 2/2015 | Latta et al. |
| 8,988,754 B2 | 3/2015 | Sun et al. |
| 8,995,577 B2 | 3/2015 | Ullrich et al. |
| 9,032,470 B2 | 5/2015 | Meuninck et al. |
| 9,066,087 B2 | 6/2015 | Shpunt |
| 9,069,060 B1 | 6/2015 | Zbrozek et al. |
| 9,098,931 B2 | 8/2015 | Shpunt et al. |
| 9,102,220 B2 | 8/2015 | Breed |
| 9,113,155 B2 | 8/2015 | Wu et al. |
| 9,119,670 B2 | 9/2015 | Yang et al. |
| 9,131,136 B2 | 9/2015 | Shpunt et al. |
| 9,137,463 B2 | 9/2015 | Gilboa et al. |
| 9,137,511 B1 | 9/2015 | LeGrand, III et al. |
| 9,142,019 B2 | 9/2015 | Lee |
| 9,158,375 B2 | 10/2015 | Maizels et al. |
| 9,185,391 B1 | 11/2015 | Prechtl |
| 9,186,046 B2 | 11/2015 | Ramamurthy et al. |
| 9,186,047 B2 | 11/2015 | Ramamurthy et al. |
| 9,191,582 B1 | 11/2015 | Wright et al. |
| 9,201,501 B2 | 12/2015 | Maizels et al. |
| 9,204,121 B1 | 12/2015 | Marason et al. |
| 9,228,697 B2 | 1/2016 | Schneider et al. |
| 9,237,333 B2 | 1/2016 | Lee et al. |
| 9,360,554 B2 | 6/2016 | Retterath et al. |
| 2002/0179708 A1 | 12/2002 | Zhu et al. |
| 2003/0043364 A1 | 3/2003 | Jamieson et al. |
| 2003/0085867 A1 | 5/2003 | Grabert |
| 2006/0132752 A1* | 6/2006 | Kane ............... G01S 7/4817 356/5.02 |
| 2006/0157643 A1 | 7/2006 | Bamji et al. |
| 2006/0268265 A1 | 11/2006 | Chuang et al. |
| 2007/0279615 A1 | 12/2007 | Degnan et al. |
| 2009/0045359 A1 | 2/2009 | Kumahara et al. |
| 2009/0076758 A1 | 3/2009 | Dimsdale |
| 2009/0128802 A1 | 5/2009 | Treado et al. |
| 2009/0232355 A1 | 9/2009 | Minear et al. |
| 2010/0045966 A1 | 2/2010 | Cauquy et al. |
| 2010/0128109 A1 | 5/2010 | Banks |
| 2010/0231891 A1 | 9/2010 | Mase et al. |
| 2010/0277713 A1 | 11/2010 | Mimeault |
| 2010/0301195 A1 | 12/2010 | Thor et al. |
| 2011/0007299 A1 | 1/2011 | Moench et al. |
| 2011/0037849 A1 | 2/2011 | Niclass et al. |
| 2011/0101206 A1 | 5/2011 | Buettgen |
| 2011/0131722 A1 | 6/2011 | Scott et al. |
| 2011/0134220 A1 | 6/2011 | Barbour et al. |
| 2011/0216304 A1 | 9/2011 | Hall |
| 2011/0285980 A1 | 11/2011 | Newbury et al. |
| 2011/0285981 A1 | 11/2011 | Justice et al. |
| 2011/0285982 A1 | 11/2011 | Breed |
| 2011/0295469 A1 | 12/2011 | Rafii et al. |
| 2011/0313722 A1 | 12/2011 | Zhu et al. |
| 2012/0001463 A1 | 1/2012 | Breed et al. |
| 2012/0002007 A1 | 1/2012 | Meuninck et al. |
| 2012/0002025 A1 | 1/2012 | Bedingfield, Sr. |
| 2012/0011546 A1 | 1/2012 | Meuninck et al. |
| 2012/0023518 A1 | 1/2012 | Meuninck et al. |
| 2012/0023540 A1 | 1/2012 | Meuninck et al. |
| 2012/0062705 A1 | 3/2012 | Ovsiannikov et al. |
| 2012/0098964 A1 | 4/2012 | Oggier et al. |
| 2012/0154784 A1 | 6/2012 | Kaufman et al. |
| 2012/0249998 A1 | 10/2012 | Eisele et al. |
| 2012/0261516 A1 | 10/2012 | Gilliland et al. |
| 2012/0262696 A1 | 10/2012 | Eisele et al. |
| 2012/0274745 A1 | 11/2012 | Russell |
| 2012/0287417 A1 | 11/2012 | Mimeault |
| 2012/0299344 A1 | 11/2012 | Breed et al. |
| 2013/0044129 A1 | 2/2013 | Latta et al. |
| 2013/0060146 A1 | 3/2013 | Yang et al. |
| 2013/0070239 A1 | 3/2013 | Crawford et al. |
| 2013/0076861 A1 | 3/2013 | Sternklar |
| 2013/0083310 A1 | 4/2013 | Ramamurthy et al. |
| 2013/0085330 A1 | 4/2013 | Ramamurthy et al. |
| 2013/0085331 A1 | 4/2013 | Ramamurthy et al. |
| 2013/0085333 A1 | 4/2013 | Ramamurthy et al. |
| 2013/0085334 A1 | 4/2013 | Ramamurthy et al. |
| 2013/0085382 A1 | 4/2013 | Ramamurthy et al. |
| 2013/0085397 A1 | 4/2013 | Ramamurthy et al. |
| 2013/0090528 A1 | 4/2013 | Ramamurthy et al. |
| 2013/0090530 A1 | 4/2013 | Ramamurthy et al. |
| 2013/0090552 A1 | 4/2013 | Ramamurthy et al. |
| 2013/0188043 A1 | 7/2013 | Decoster |
| 2013/0201288 A1 | 8/2013 | Billerbeck et al. |
| 2013/0215235 A1 | 8/2013 | Russell |
| 2013/0242285 A1 | 9/2013 | Zeng |
| 2013/0278917 A1 | 10/2013 | Korekado et al. |
| 2013/0300740 A1 | 11/2013 | Snyder et al. |
| 2013/0300838 A1 | 11/2013 | Borowski |

(56) References Cited

U.S. PATENT DOCUMENTS

| | | |
|---|---|---|
| 2013/0300840 A1 | 11/2013 | Borowski |
| 2013/0321791 A1 | 12/2013 | Feldkhun et al. |
| 2014/0035959 A1 | 2/2014 | Lapstun |
| 2014/0152971 A1 | 6/2014 | James |
| 2014/0168362 A1 | 6/2014 | Hannuksela et al. |
| 2014/0211194 A1 | 7/2014 | Pacala et al. |
| 2014/0218473 A1 | 8/2014 | Hannuksela et al. |
| 2014/0240464 A1 | 8/2014 | Lee |
| 2014/0240469 A1 | 8/2014 | Lee |
| 2014/0240809 A1 | 8/2014 | Lapstun |
| 2014/0241614 A1 | 8/2014 | Lee |
| 2014/0253993 A1 | 9/2014 | Lapstun |
| 2014/0292620 A1 | 10/2014 | Lapstun |
| 2014/0313376 A1 | 10/2014 | Van Nieuwenhove et al. |
| 2014/0340487 A1 | 11/2014 | Gilliland et al. |
| 2014/0347676 A1 | 11/2014 | Velten et al. |
| 2015/0002734 A1 | 1/2015 | Lee |
| 2015/0060673 A1 | 3/2015 | Zimdars |
| 2015/0077764 A1 | 3/2015 | Braker et al. |
| 2015/0082353 A1 | 3/2015 | Meuninck et al. |
| 2015/0116528 A1 | 4/2015 | Lapstun |
| 2015/0131080 A1* | 5/2015 | Retterath ............... G01S 17/10 356/5.01 |
| 2015/0145955 A1 | 5/2015 | Russell |
| 2015/0192677 A1 | 7/2015 | Yu et al. |
| 2015/0201176 A1 | 7/2015 | Graziosi et al. |
| 2015/0213576 A1 | 7/2015 | Meuninck et al. |
| 2015/0256767 A1 | 9/2015 | Schlechter |
| 2015/0269736 A1 | 9/2015 | Hannuksela et al. |
| 2015/0292874 A1 | 10/2015 | Shpunt et al. |
| 2015/0293226 A1 | 10/2015 | Eisele et al. |
| 2015/0293228 A1 | 10/2015 | Retterath et al. |
| 2015/0304534 A1 | 10/2015 | Kadambi et al. |
| 2015/0304665 A1 | 10/2015 | Hannuksela et al. |
| 2015/0309154 A1 | 10/2015 | Lohbihler |
| 2015/0319344 A1 | 11/2015 | Lapstun |
| 2015/0319355 A1 | 11/2015 | Lapstun |
| 2015/0319419 A1 | 11/2015 | Akin et al. |
| 2015/0319429 A1 | 11/2015 | Lapstun |
| 2015/0319430 A1 | 11/2015 | Lapstun |
| 2015/0378241 A1 | 12/2015 | Eldada |
| 2015/0379362 A1 | 12/2015 | Calmes et al. |
| 2016/0003946 A1 | 1/2016 | Gilliland et al. |
| 2016/0047901 A1 | 2/2016 | Pacala et al. |
| 2016/0049765 A1 | 2/2016 | Eldada |
| 2016/0161600 A1 | 6/2016 | Eldada et al. |

OTHER PUBLICATIONS

Application and File history for U.S. Appl. No. 15/173,969, filed Jun. 6, 2016. Inventors: Retterath et al.

Application and File history for U.S. Appl. No. 15/059,811, filed Mar. 3, 2016. Inventors: Retterath.

Harvey-Lynch, Inc., "Multibeam and Mobile LIDAR Solutions," 2014, 2 pages.

Krill et al., "Multifunction Array LIDAR Network for Intruder Detection, Tracking, and Identification," IEEE ISSNIP, 2010, pp. 43-48.

Levinson et al., "Unsupervised Calibration for Multi-Beam Lasers," Stanford Artificial Intelligence Laboratory, 2010, 8 pages.

Webpage http://www.geforce.com/hardware/desktop-gpus/geforce-gtx-titan/specifications, Jul. 2015, 2 pages.

Webpage, 3D LADAR & LIDAR Focal Planes and Instruments, Voxtelopto, 2007-2015, 3 pages.

ASC 3D Bringing 3D Alive!, Advanced Scientific Concepts, Inc., Feb. 9, 2010, 14 pages.

Albota et al., "Three-Dimensional Imaging Laser Radar with a Photo-Counting Avalanch Photodiode Array and Microchip Laser," Dec. 20, 2002, 8 pages.

Brazzel et al., "Flash LIDAR Based Relative Navigation," 2015 IEEE Aerospace Conference, 2014, 11 pages.

Love et al., "Active Probing of Cloud Multiple Scattering, Optical, Depth, Vertical Thickness, and Liquid Water Content Using Wide-Angle Imaging Lidar," 2002, 11 pages.

Itzler, "Focal-Plane Arrays: Geiger-Mode Focal Plane Arrays Enable SWIR 3D Imaging," 2011, 8 pages.

Superior Signal-to-Noise Ratio of a New AA1 Sequence for Random-Modulation Continuous-Wave LIDAR, Optics Letters, 2004, vol. 29, No. 15.

Frequency-Modulated Continuous-Wave LIDAR Using I/Q Modulator for Simplified Heterodyne Detection, Optics Letters, 2012, vol. 37, No. 11.

Application No. PCT/US2015/022248, filed Mar. 24, 2015, Search Report/Written Opinion dated Jun. 26, 2015, 14 pages.

Application No. PCT/US2014/064123, filed Nov. 5, 2014, Search Report/Written Opinion dated Sep. 10, 2015, 14 pages.

Application and File history for U.S. Appl. No. 14/078,001, filed Nov. 12, 2013. Inventors: Retterath et al.

Application and File history for U.S. Appl. No. 14/251,254, filed Apr. 11, 2014. Inventors: Retterath et al.

* cited by examiner

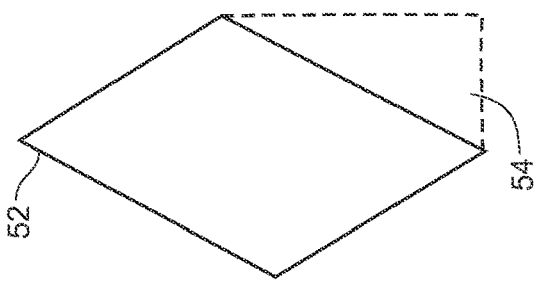
Fig. 3
*Prior Art*
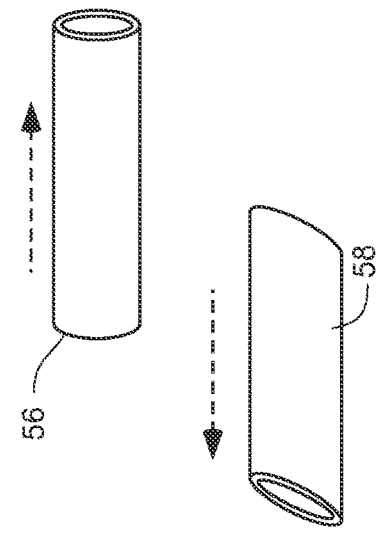
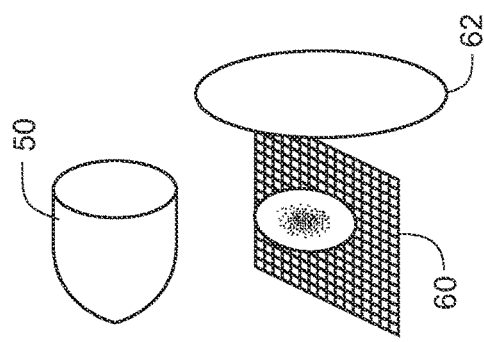

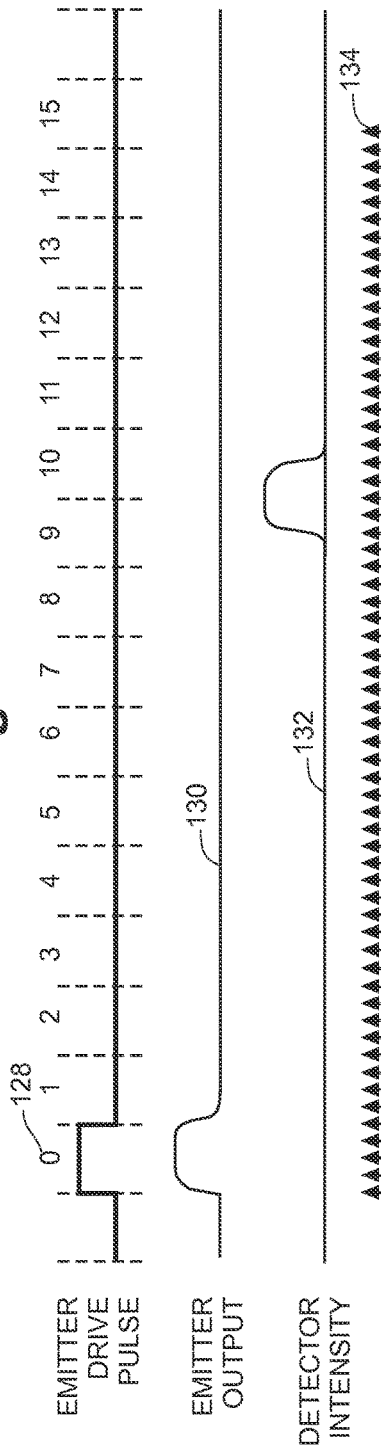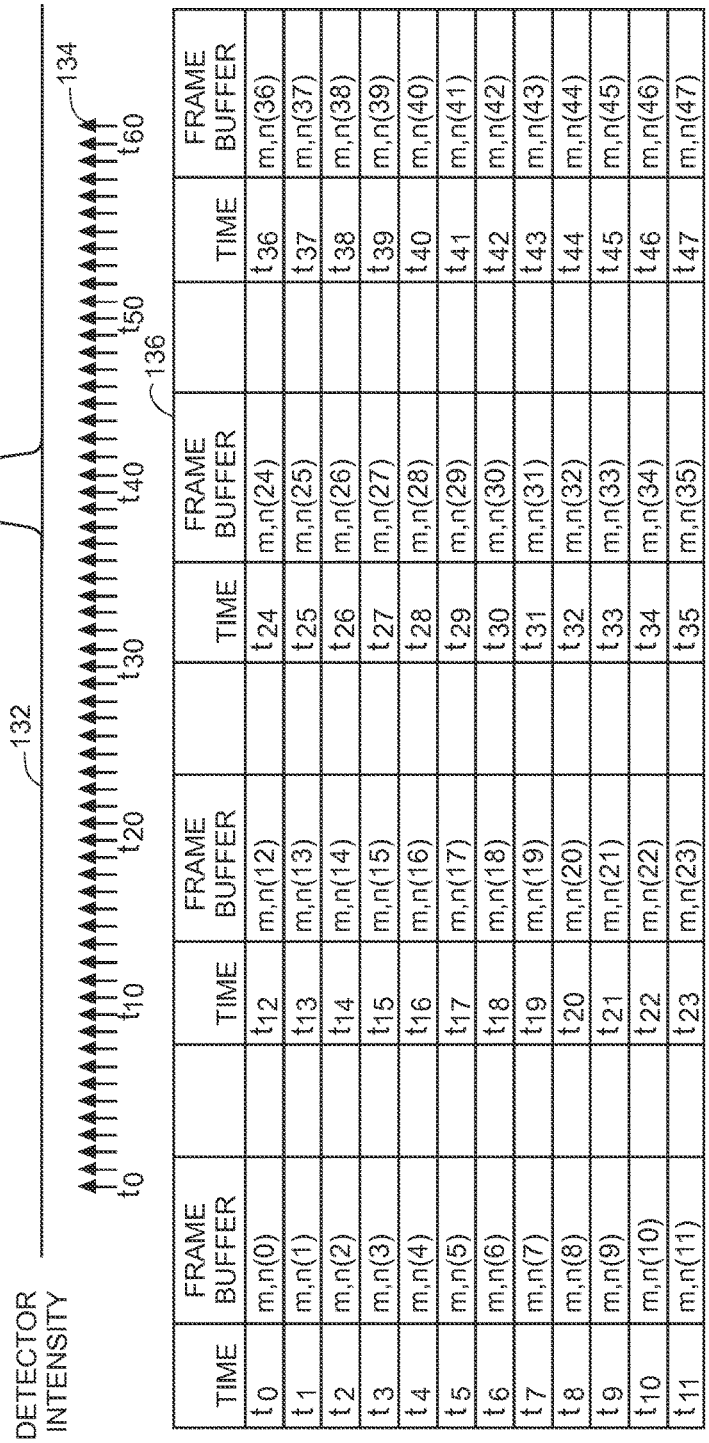
Fig. 8

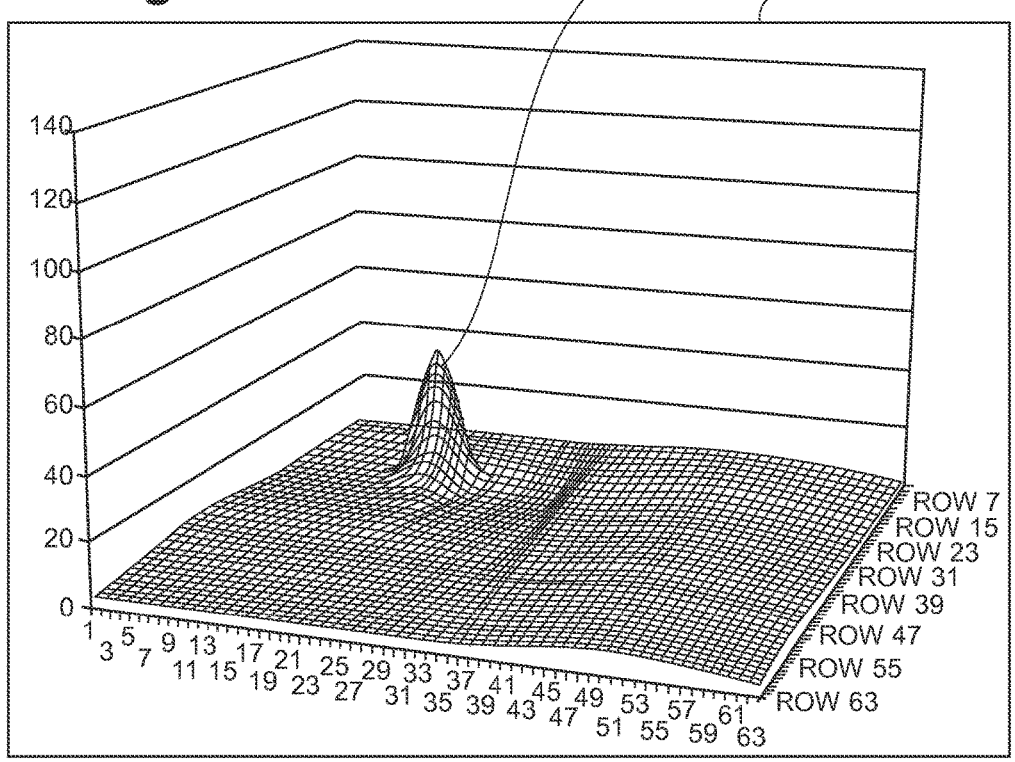

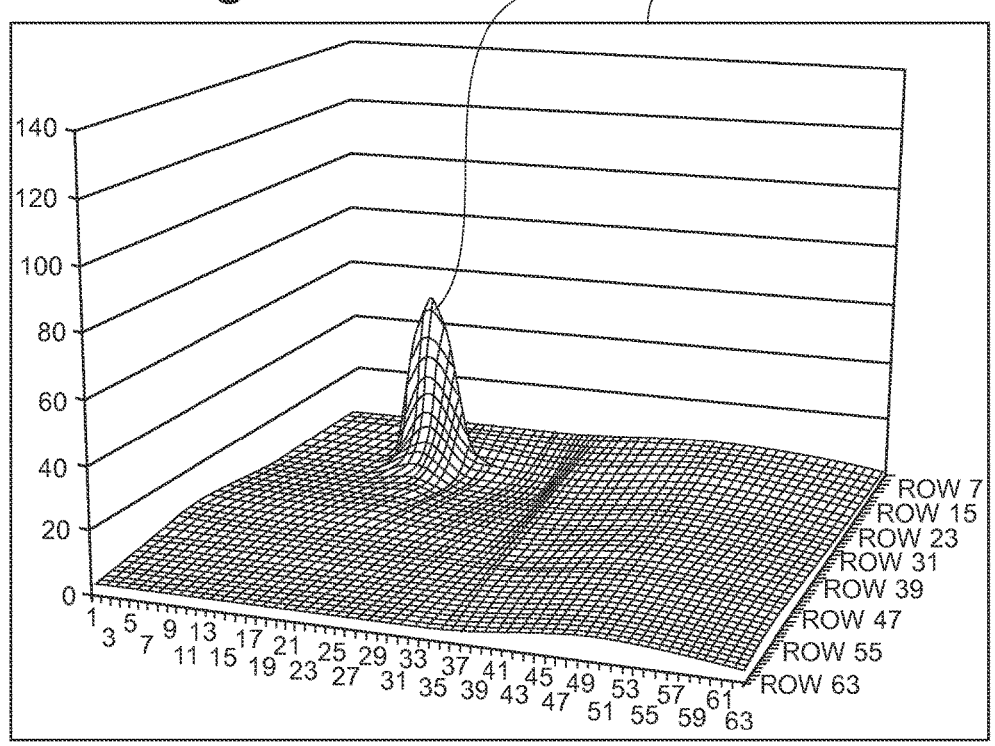

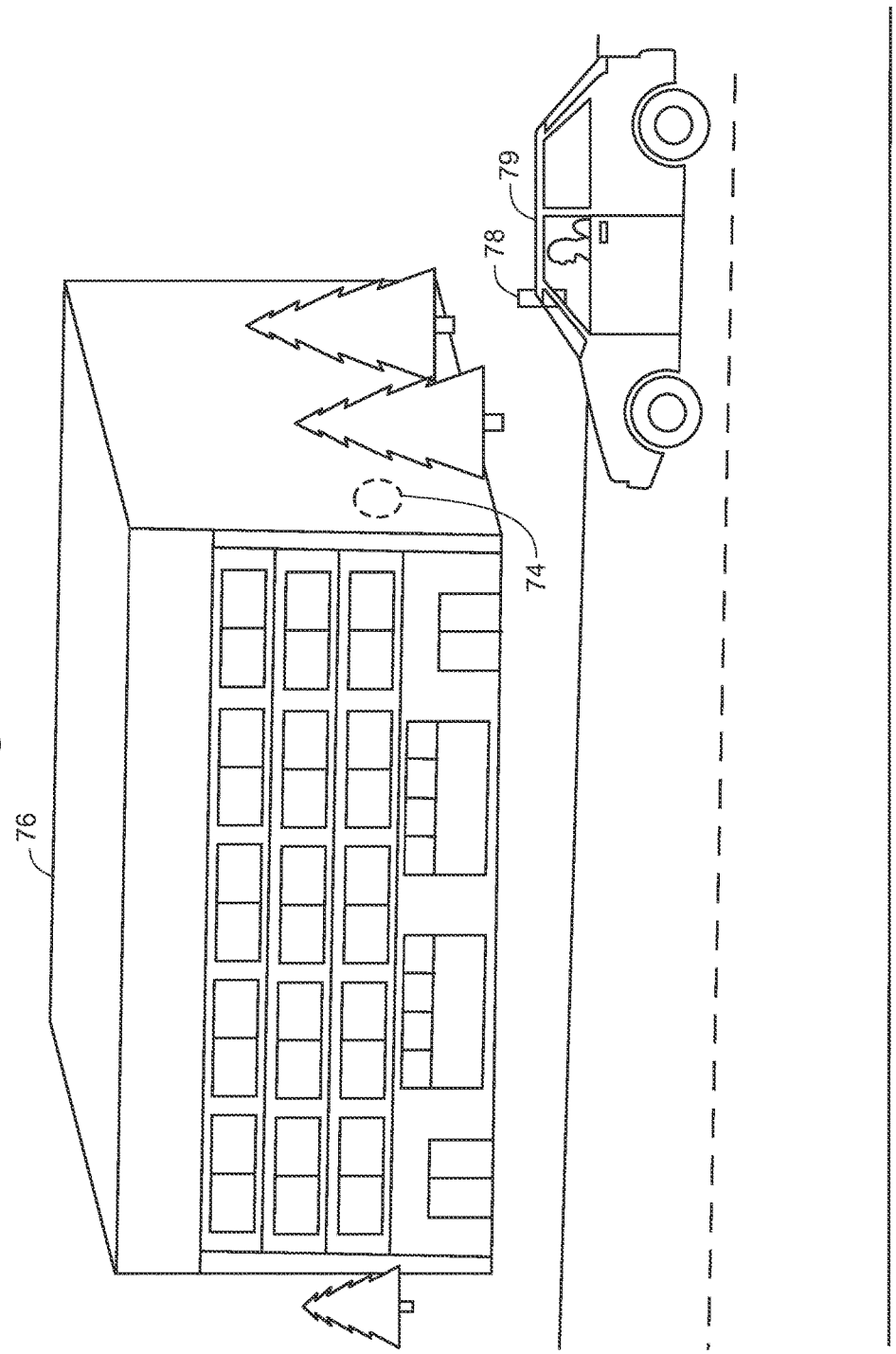

| 3 | 3.1 | 3.2 | 3.6 | 4.4 | 5.7 | 7.2 | 8 | 7.6 | 6.4 | 4.9 | 3.9 | 3.3 | 3.2 | 3.1 | 3.2 | 3.2 | 3.3 |
|---|---|---|---|---|---|---|---|---|---|---|---|---|---|---|---|---|---|
| 3.1 | 3.1 | 3.5 | 4.5 | 6.6 | 10 | 14 | 16 | 15 | 11 | 7.9 | 5.2 | 3.8 | 3.3 | 3.2 | 3.2 | 3.2 | 3.3 |
| 3.1 | 3.3 | 4 | 6.1 | 11 | 18 | 26 | 31 | 29 | 22 | 14 | 7.7 | 4.7 | 3.5 | 3.2 | 3.2 | 3.3 | 3.3 |
| 3.2 | 3.5 | 4.9 | 8.9 | 18 | 32 | 47 | 55 | 51 | 38 | 23 | 12 | 6.1 | 3.9 | 3.3 | 3.2 | 3.3 | 3.4 |
| 3.2 | 3.8 | 5.9 | 12 | 26 | 49 | 73 | 86 | 80 | 59 | 34 | 17 | 7.8 | 4.4 | 3.4 | 3.3 | 3.3 | 3.4 |
| 3.3 | 4.1 | 7 | 16 | 35 | 65 | 97 | 115 | 107 | 78 | 46 | 22 | 9.5 | 4.9 | 3.6 | 3.3 | 3.3 | 3.4 |
| 3.4 | 4.3 | 7.7 | 18 | 39 | 74 | 112 | 133 | 124 | 90 | 52 | 25 | 11 | 5.2 | 3.7 | 3.4 | 3.4 | 3.4 |
| 3.5 | 4.3 | 7.7 | 17 | 39 | 73 | 110 | 131 | 122 | 89 | 51 | 24 | 10 | 5.2 | 3.7 | 3.4 | 3.4 | 3.5 |
| 3.6 | 4.3 | 7.1 | 15 | 33 | 62 | 93 | 110 | 103 | 75 | 44 | 21 | 9.4 | 5 | 3.7 | 3.5 | 3.5 | 3.5 |
| 3.6 | 4.1 | 6.1 | 12 | 25 | 45 | 68 | 80 | 74 | 55 | 32 | 16 | 7.8 | 4.6 | 3.7 | 3.6 | 3.6 | 3.6 |
| 3.7 | 4.1 | 5.3 | 8.8 | 17 | 29 | 43 | 50 | 47 | 35 | 21 | 11 | 6.3 | 4.3 | 3.8 | 3.7 | 3.7 | 3.7 |
| 3.9 | 4 | 4.7 | 6.5 | 11 | 17 | 24 | 28 | 26 | 20 | 13 | 7.8 | 5.2 | 4.2 | 3.9 | 3.8 | 3.8 | 3.8 |
| 4.1 | 4.2 | 4.4 | 5.3 | 7.1 | 9.9 | 13 | 15 | 14 | 11 | 8.1 | 5.8 | 4.6 | 4.1 | 4 | 4 | 4 | 4 |
| 4.3 | 4.4 | 4.5 | 4.8 | 5.5 | 6.5 | 7.7 | 8.3 | 8 | 7 | 5.8 | 4.9 | 4.5 | 4.3 | 4.2 | 4.2 | 4.2 | 4.1 |
| 4.6 | 4.6 | 4.7 | 4.8 | 5 | 5.3 | 5.7 | 5.9 | 5.8 | 5.4 | 5 | 4.7 | 4.6 | 4.5 | 4.4 | 4.4 | 4.4 | 4.4 |
| 4.9 | 4.9 | 4.9 | 5 | 5 | 5.1 | 5.2 | 5.3 | 5.2 | 5.1 | 5 | 4.9 | 4.8 | 4.7 | 4.7 | 4.7 | 4.6 | 4.6 |
| 5.2 | 5.3 | 5.3 | 5.3 | 5.3 | 5.3 | 5.3 | 5.3 | 5.3 | 5.2 | 5.2 | 5.1 | 5.1 | 5 | 5 | 4.9 | 4.9 | 4.9 |

| 3 | 3 | 3.1 | 3.3 | 3.8 | 4.7 | 5.8 | 6.8 | 7.7 | 6.3 | 5.1 | 4.1 | 3.5 | 3.2 | 3.2 | 3.2 | 3.2 | 3.3 |
|---|---|---|---|---|---|---|---|---|---|---|---|---|---|---|---|---|---|
| 3 | 3.1 | 3.2 | 3.7 | 5 | 7.4 | 11 | 13 | 14 | 12 | 8.6 | 5.8 | 4.1 | 3.4 | 3.2 | 3.2 | 3.2 | 3.3 |
| 3.1 | 3.1 | 3.5 | 4.6 | 7.4 | 13 | 20 | 26 | 27 | 23 | 16 | 9.3 | 5.5 | 3.8 | 3.3 | 3.2 | 3.3 | 3.3 |
| 3.1 | 3.3 | 3.9 | 6 | 12 | 22 | 36 | 47 | 49 | 41 | 27 | 15 | 7.8 | 4.5 | 3.5 | 3.3 | 3.3 | 3.4 |
| 3.2 | 3.4 | 4.4 | 8 | 17 | 34 | 57 | 75 | 79 | 65 | 43 | 23 | 11 | 5.5 | 3.7 | 3.3 | 3.3 | 3.4 |
| 3.2 | 3.6 | 5 | 10 | 23 | 46 | 78 | 104 | 110 | 90 | 59 | 31 | 14 | 6.4 | 4 | 3.4 | 3.3 | 3.4 |
| 3.3 | 3.7 | 5.4 | 11 | 26 | 55 | 93 | 124 | 130 | 107 | 69 | 36 | 16 | 7.1 | 4.2 | 3.5 | 3.4 | 3.4 |
| 3.4 | 3.8 | 5.5 | 12 | 27 | 56 | 94 | 126 | 132 | 109 | 71 | 37 | 16 | 7.2 | 4.2 | 3.5 | 3.4 | 3.5 |
| 3.5 | 3.8 | 5.3 | 11 | 24 | 49 | 82 | 110 | 115 | 95 | 62 | 32 | 15 | 6.8 | 4.2 | 3.6 | 3.5 | 3.5 |
| 3.6 | 3.8 | 5 | 8.8 | 19 | 37 | 62 | 82 | 86 | 71 | 46 | 25 | 12 | 6 | 4.1 | 3.6 | 3.6 | 3.6 |
| 3.7 | 3.9 | 4.6 | 7 | 13 | 25 | 40 | 53 | 55 | 46 | 31 | 17 | 8.8 | 5.2 | 4 | 3.7 | 3.7 | 3.7 |
| 3.9 | 4 | 4.3 | 5.6 | 8.9 | 15 | 23 | 30 | 32 | 27 | 18 | 11 | 6.6 | 4.6 | 4 | 3.8 | 3.8 | 3.8 |
| 4.1 | 4.1 | 4.3 | 4.9 | 6.4 | 9.2 | 13 | 16 | 17 | 14 | 11 | 7.3 | 5.3 | 4.4 | 4.1 | 4 | 4 | 4 |
| 4.3 | 4.3 | 4.4 | 4.6 | 5.2 | 6.3 | 7.8 | 9 | 9.2 | 8.3 | 6.8 | 5.5 | 4.7 | 4.4 | 4.2 | 4.2 | 4.2 | 4.1 |
| 4.6 | 4.6 | 4.6 | 4.7 | 4.9 | 5.3 | 5.8 | 6.2 | 6.2 | 5.9 | 5.4 | 4.9 | 4.6 | 4.5 | 4.4 | 4.4 | 4.4 | 4.4 |
| 4.9 | 4.9 | 4.9 | 5 | 5 | 5.1 | 5.3 | 5.4 | 5.4 | 5.3 | 5.1 | 4.9 | 4.8 | 4.7 | 4.7 | 4.7 | 4.6 | 4.6 |
| 5.2 | 5.3 | 5.3 | 5.3 | 5.3 | 5.3 | 5.4 | 5.4 | 5.4 | 5.3 | 5.2 | 5.2 | 5.1 | 5 | 5 | 4.9 | 4.9 | 4.9 |

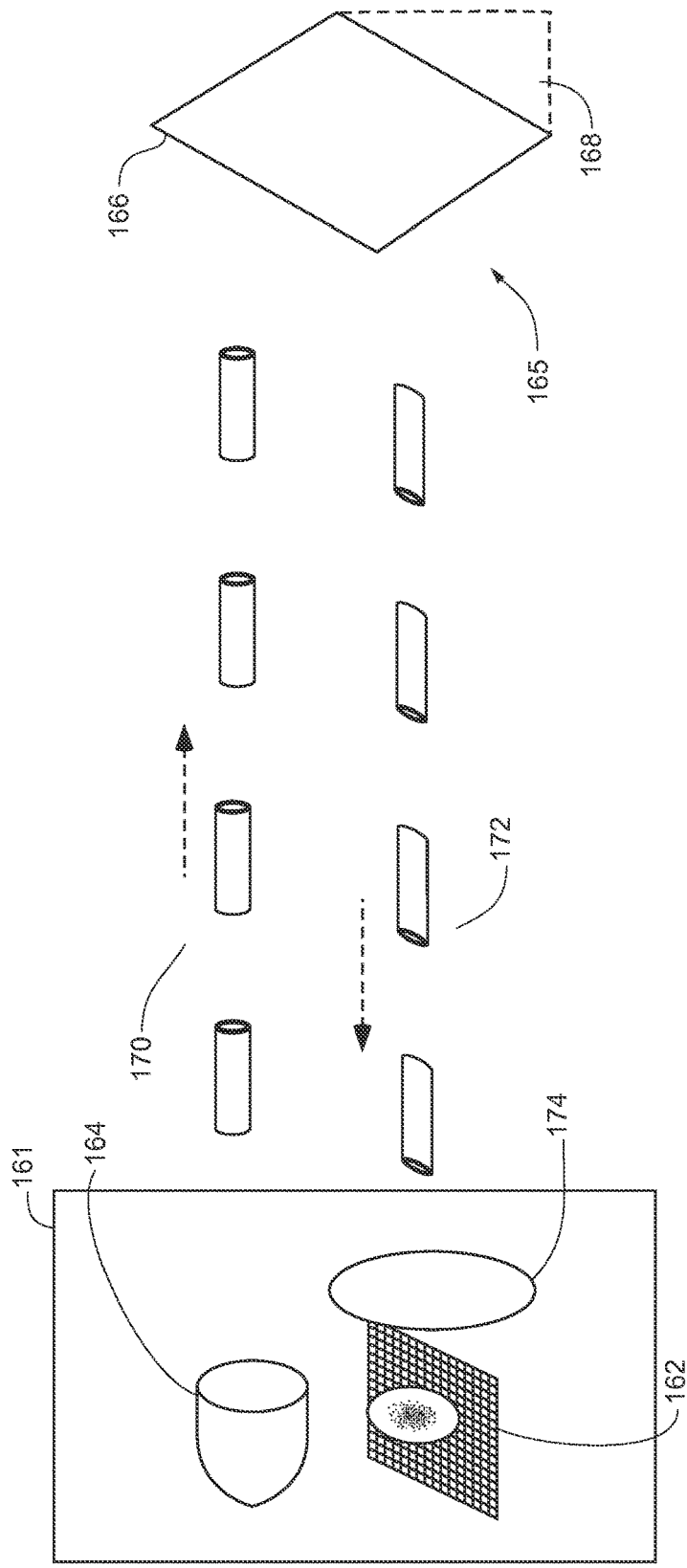

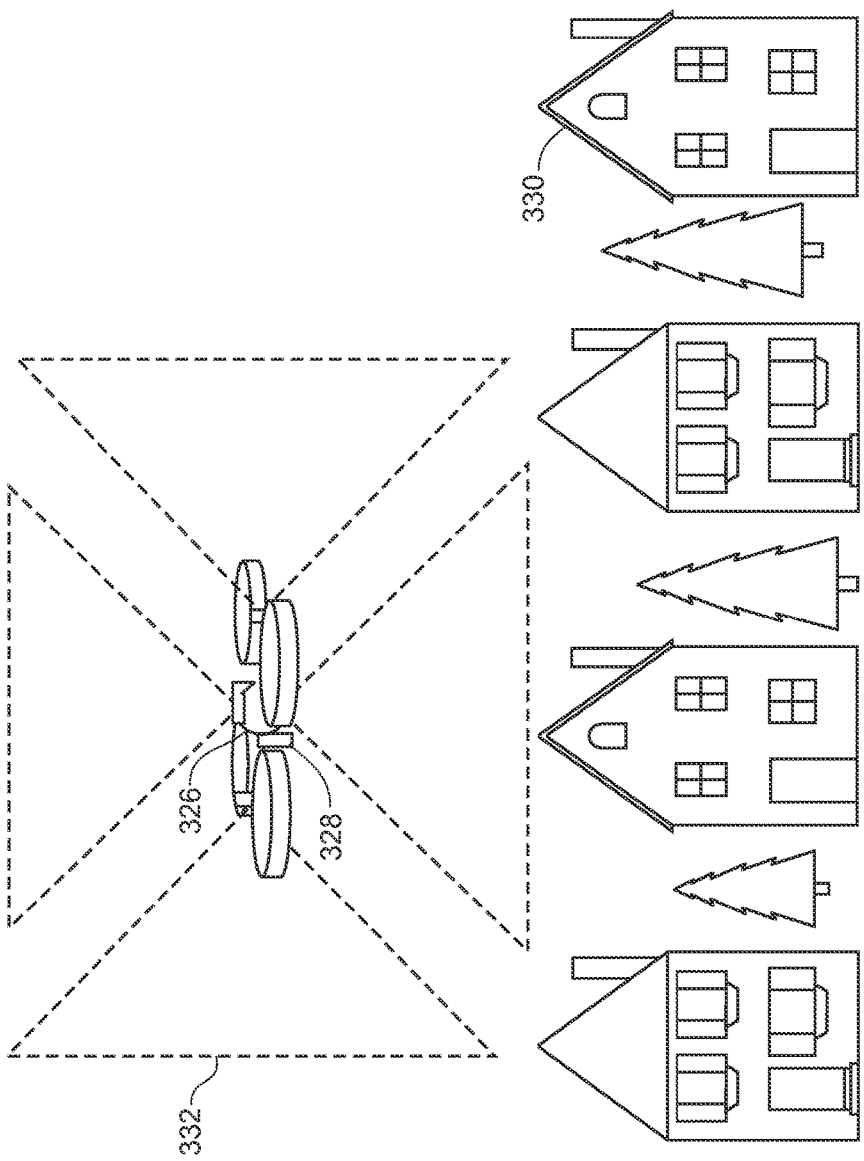

METHODS AND APPARATUS FOR INCREASED PRECISION AND IMPROVED RANGE IN A MULTIPLE DETECTOR LIDAR ARRAY

FIELD OF THE INVENTION

The invention relates generally to determining presence and position in a surrounding space of objects that interact with propagating electromagnetic waves. More particularly, the present invention relates to LiDAR systems using one or more emitters and a detector array to cover a given field of view wherein the detector array can produce a multitude of features based on volumetric analysis of each emitted light packet and/or a multitude of feature distances based on frequency analysis of the sampled return signals.

BACKGROUND OF THE INVENTION

LiDAR (light detection and ranging) uses laser technology to make precise distance measurements over short or long distances. LiDAR units have found widespread application in both industry and the research community.

The predecessor technology to current LiDAR units were object detection systems that could sense the presence or absence of objects within the field of view of one or more light beams based on phase shift analysis of the reflected light beam. Examples of these kinds of object detection systems in the field of vehicle "blind spot" warning systems include U.S. Pat. Nos. 5,122,796, 5,418,359, 5,831,551, 6,150,956, and 6,377,167.

Current LiDAR units are typically scanning-type units that emit beams of light in rapid succession, scanning across the angular range of the unit in a fan-like pattern. Using a time of flight calculation applied to any reflections received, instead of just a phase shift analysis, the LiDAR unit can obtain range measurements and intensity values along the singular angular dimension of the scanned beam. LiDAR units typically create the scanning beam by reflecting a pulsed source of laser light from a rotating mirror. The mirror also reflects any incoming reflections to the receiving optics and detector(s).

Single-axis-scan LiDAR units will typically use a polygonal mirror and a pulsed laser source to emit a sequence of light pulses at varying angles throughout the linear field of view. Return signals are measured by a bandpass photoreceptor that detects the wavelength of light emitted by the laser. The field of view of the photoreceptor covers the entire one-dimensional scan area of the laser. Thus, each subsequent emitted pulse of laser light must occur only after the reflected signal has been received for the previous laser pulse. Dual-axis-scan LiDAR units produce distance-measured points in two dimensions by using, for instance, a pair of polygonal mirrors. The horizontal scan mirror rotates at a faster rate than the vertical scan mirror. An example of a long-range scanning-type LiDAR for satellite and aircraft is U.S. Pat. No. 7,248,342 that describes scanning of both the transmitted and received laser signals along with a linear arrangement of pixel sensors referred to as a "push broom" sensor for detecting the received laser signals as it is scanned back and forth. U.S. Pat. No. 8,599,367 describes an improved push broom approach that uses laser light with different frequency components and then separates the frequency components received as reflected signals to be detected by different linear pixel sensors.

Image-type LiDAR units offer a way to acquire a 3D map of a scene via a solid state or mostly solid state approach in the form of a detector array. These image-type devices are often referred to as flash LiDAR devices because they illuminate an entire 2D field of view with a blanket of light and then simultaneously measure the return value time for each photoreceptor location in the detector array that covers the field of view. Examples of image-type LiDAR units include U.S. Pat. Nos. 7,551,771 and 8,072,581. Unfortunately, these approaches have been relegated to very close proximity applications due to the low incident laser power available for each location in the field of view. For flash LiDAR at longer ranges, the usable field of view is typically too small for applications like autonomous vehicle navigation without the use of high performance cameras operating in the picosecond range for exposure times.

U.S. Pat. No. 7,969,558 describes a LiDAR device that uses multiple lasers and a 360-degree scan to create a 360-degree 3D point cloud for use in vehicle navigation. The disclosed system has three limitations. First, the rotating scan head makes the unit impractical for widespread use on autonomous vehicles and makes it unusable for inclusion in mobile devices like smart phones, wearable devices, smart glasses, etc. Second, multiple units cannot work effectively in the same relative physical space due to the potential of crosstalk. Third, the throughput of the device is limited to measurements along a single angular direction for each emitted light pulse.

U.S. Publ. Appl. No. 2011/0313722 A1 describes a LiDAR technique used for determining the object distance in the presence of an aerosol cloud. The technique relies on analysis of a trailing edge of a given light pulse compared to an established threshold to remove reflected energy from the aerosol cloud, such as fog. U.S. Pat. No. 8,242,428 describes a LiDAR system that utilizes modulated light pulses detected by two detectors at different distances to perform quantum ghost imaging analysis. While these techniques may be useful for the specific issues addressed, such as fog or ghost imaging, these techniques address special case scenarios and are not generally applicable beyond these special cases.

LiDAR units have the potential to be utilized extensively in applications like autonomous vehicle navigation, robotics, mobile computing, wearable devices, and collision avoidance systems for unmanned aerial vehicles (UAVs), as well as high precision image analysis such as surface defect detection and texture analysis, as well as detection of roadway conditions and contaminations. Low and medium resolution LiDAR systems are typically used for object detection and some limited object identification. By increasing the precision of LiDAR processing, object identification can be markedly increased. However, the high throughput and high resolution necessary for autonomous vehicle navigation and other high precisions image analysis cannot be met with present LiDAR approaches. Furthermore, 3D point cloud approaches are inadequate for object identification and high-frequency feature extraction in real-time applications like autonomous vehicle navigation.

SUMMARY OF THE INVENTION

LiDAR (light detection and ranging) systems in accordance with various embodiments of the invention use one or more emitters and a detector array to cover a given field of view where the emitters each emit a single pulse or a multi-pulse packet of light and the reflected versions of said light are sampled by the detector array. On each emitter cycle the detector array will sample the incoming signal intensity at a pre-determined sampling frequency that generates two or more samples per emitted light packet to allow for volumetric analysis of the retroreflected signal portion of each emitted light packet as reflected by one or more objects in the field of view and then received by each detector.

LiDAR systems in accordance with various embodiments of the invention use a detector array and a graphics processing unit (GPU) to interpret the retroreflected signal to produce multiple output points corresponding to a single emitted light packet. In an embodiment the GPU establishes N points in a pre-defined grid of points throughout the field of view of the emitter, and may utilize segmentation to differentiate between multiple objects in a single field of view. In another embodiment the GPU defines an edge feature describing the edge of an object in the field of view. In another embodiment the GPU defines a corner feature describing the corner of an object in the field of view.

LiDAR systems in accordance with various embodiments of the invention may utilize a plurality of frame buffers corresponding to the detector array at different portions of the cycle associated with a given emitted light packet. In some embodiments at least three different frame buffers are used for detection and identification of objects in the field of view of the emitter. In some embodiments a leading-edge frame buffer, a steady-state-frame buffer, and a trailing-edge frame buffer are analyzed by the GPU to compare relative ratios among detectors in the array. In other embodiments a ramp-up frame buffer, a steady-state frame buffer, and a ramp-down frame buffer are used by the GPU to compare and/or reconstruct relative intensities among detectors in the array.

LiDAR systems in accordance with various embodiments may determine other attributes of the objects in the field of view. The slope of the object—where slope is defined as the normal vector of the surface of a detected object whereby the vector is expressed as an angle relative to the measurement device—may be determined through analysis of received waveforms. Time domain analysis for leading-edge, steady-state and trailing-edge portions of light packets as reflected allows the GPU to determine the direction and the rate of the slope of detected objects. In some embodiments the GPU utilizes analysis of neighboring detectors to facilitate in determination of angles of the retroreflected light energy.

In various embodiments calibration of a given LiDAR system may be utilized to account for manufacturing, aging, and related differences in the emitter and detector array. In situ calibration, for example, may be performed by emitting pre-determined calibration patterns and measuring the intensity, location, and angle of the reflected signals. Characterization of the intensity of the emitted beam may be determined throughout the entire cross section of the beam and may be utilized to differentiate light energy patterns and resolve between emitted and reflected light energies. Characterization parameters unique to the given LiDAR system may be saved in a profile for the unit that can account for any modified optical path of the incident and/or reflected light and provide for better determination of the center vector of each emitter and for more accurate volumetric analysis of the light packets.

LiDAR systems in accordance with various embodiments may compute object intensity for multiple objects within a field of view. In various embodiments the reported intensity may be modified based on environmental factors such as rain, fog, and snow. In various embodiments the reported intensity may be modified based on the location and severity of dirt or other foreign substance that has accumulated on a windshield or other protective layer near the device.

LiDAR systems in accordance with various embodiments utilize laser diodes preferably wherein the laser can be tuned by varying a bias current or bias voltage. The bias current or voltage preferably comprises a component of the injection current or voltage of the laser, wherein the bias current or voltage variation waveform can be ramp-shaped over at least a portion of its cycle, can be staircase-shaped over at least a portion of its cycle, or can be at a constant value for at least a portion of its cycle. Also, with respect to various embodiments, the shape of the bias current or voltage variation waveform can be controlled in order to reduce the variations in total optical dose across the waveform emitter timeframes.

LiDAR systems in accordance with various embodiments may utilize two or more frequencies of emitted energy. The reflected portions of these emitted signals will produce beat frequencies or "chirp" frequencies at the detectors whereby each chirp frequency is the difference in the frequencies of the emitted signals. By utilizing N samples in the detector frame buffers and performing an N-sample FFT, the time location of the chirp frequencies for each detector can be established.

In various embodiments each detector in the array-based LiDAR unit has a unique angle at which the reflected light energy is received. For purposes of these embodiments, the angle may be defined as the center of the area of the light beam received by the detector not including any modifications to the light beam due to optic elements internal to the LiDAR unit. In some embodiments the light energy or light packet is emitted and received as common laser wavelengths of 650 nm, 905 nm or 1550 nm. In some embodiments the light energy can be in the wavelength ranges of ultraviolet (UV)—100-400 nm, visible—400-700 nm, near infrared (NIR)—700-1400 nm, infrared (IR)—1400-8000 nm, long-wavelength IR (LWIR)—8 um-15 um, far IR (FIR)—15 um-1000 um, or terahertz—0.1 mm-1 mm. These various embodiments can provide increased device throughput, an increased number of computed points per emitted light packet, and/or additional point and linear feature elements at these various wavelengths.

BRIEF DESCRIPTION OF THE DRAWINGS

FIG. 3 illustrates an emitted packet of light and the resulting return packet of light at a detector array.

FIG. 8 illustrates the electrical and optical timing of sampled waveforms with a detector array in accordance with an embodiment of the invention.

FIG. 9A illustrates a three-dimensional graphical representation of a surface image in accordance with an embodiment of the invention.

FIG. 9B illustrates a sampled frame buffer for a detector array in accordance with an embodiment of the invention.

FIG. 9E illustrates a three-dimensional graphical representation of a surface image in accordance with an embodiment of the invention.

FIG. 9F illustrates a sampled frame buffer for a detector array in accordance with an embodiment of the invention.

FIG. 10 illustrates a typical roadside scene with an object face at a non-normal orientation to the sensor.

FIG. 12 illustrates emitted packets of light and the resulting return packets of light at a detector array for a multi-pulse system in accordance with an embodiment of the invention.

FIG. 25 illustrates the use of devices in accordance with an embodiment of the invention in an unmanned aerial vehicle application.

DETAILED DESCRIPTION OF THE DRAWINGS

Figure 1:
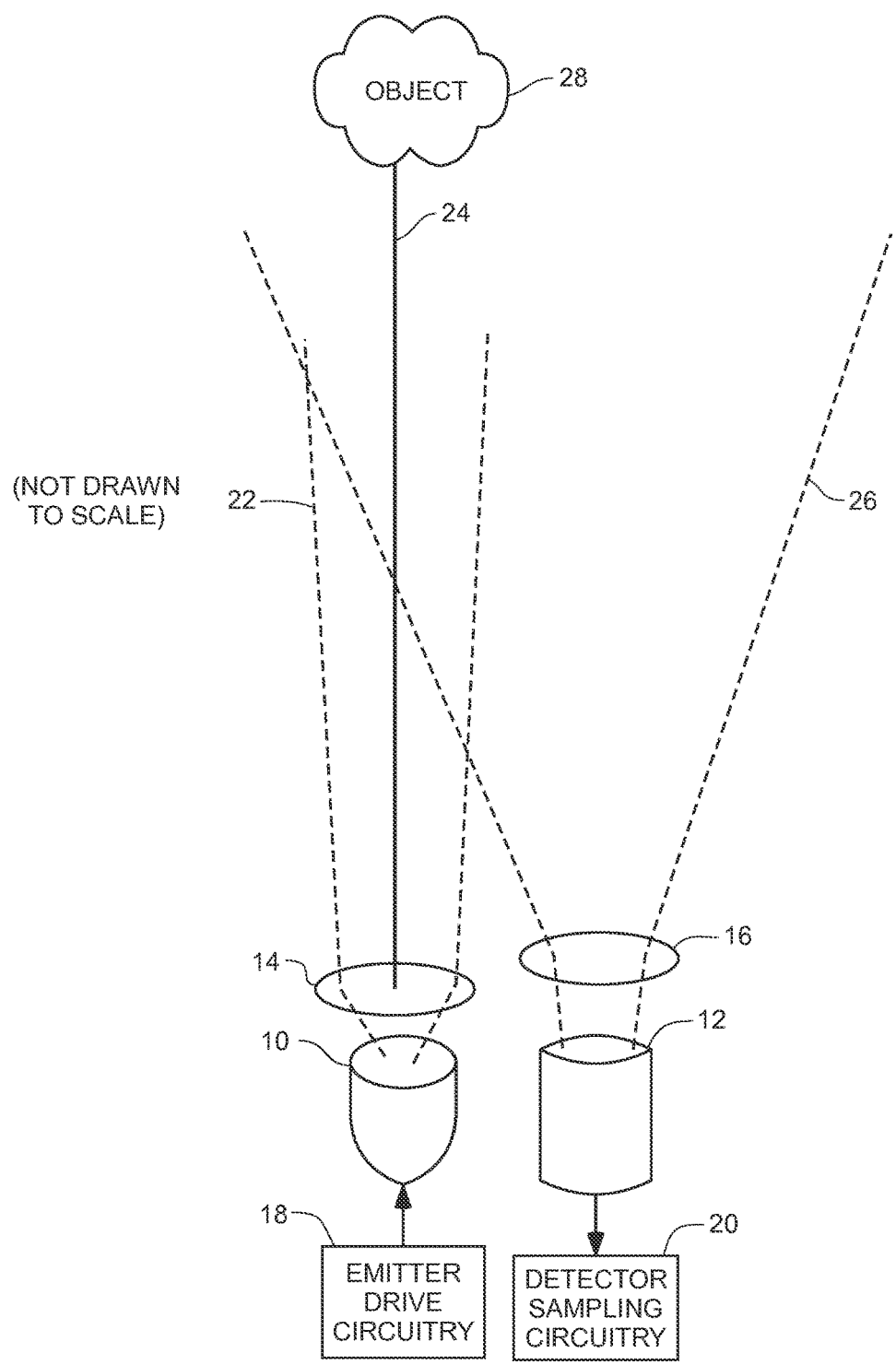
FIG. 1 illustrates a single emitter and single detector configuration.

FIG. 1 shows the configuration of the optical elements in a typical LiDAR system. The emitter 10 is a light source that is controlled by the emitter drive circuitry 18. The beam of emitted light will typically be near collimated or slightly diverging in multi-point measurement systems and will be widely diverging in flash LiDAR systems. The profile of the emitted beam is typically controlled by a focusing lens 14. FIG. 1 shows the extents 22 of a slightly diverging beam. Incident light from the detector will reach the object 28, with a portion of the light being absorbed by the object, another portion reflected at various angles, and still another portion of the light reflected off the object back toward the light source 10. The detector 12 is typically a photodetector that may include a wavelength filter that allows only photons at or near the wavelength of the emitter 10. A lens 16 is typically used to establish the field of view 26 of the detected photons. The detector sampling circuitry 20 will sample the detected signal at various intervals throughout the device's capture cycle. The mid-point of the emitted beam 24 determines the angle of the detected object 28 relative to the device.

Figure 2:
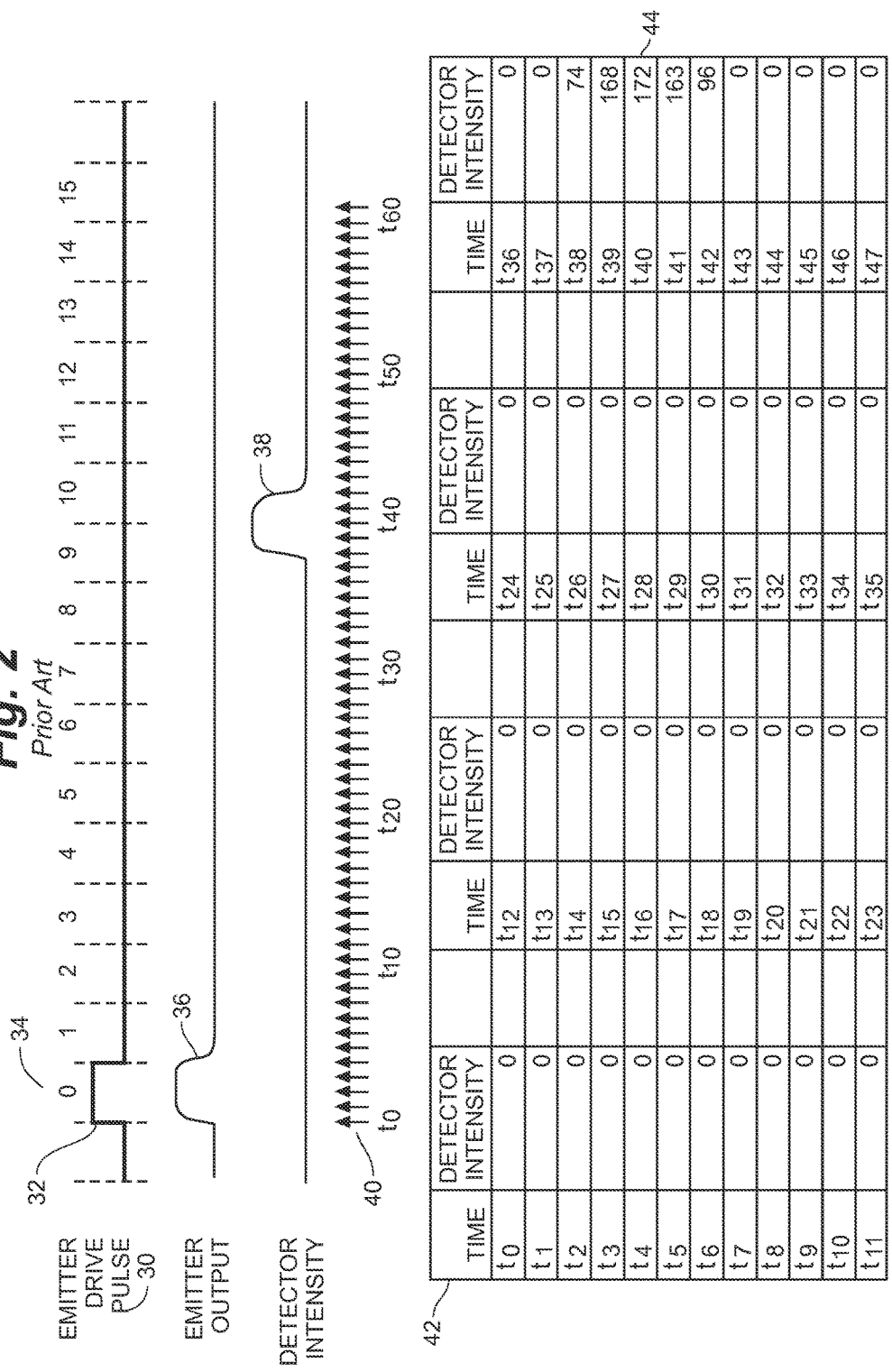
FIG. 2 illustrates the electrical and optical timing parameters for a single emitter and single detector configuration of FIG. 1.

The timing diagram in FIG. 2 shows some of the essential electrical and optical elements of a typical emitter/detector cycle associated with FIG. 1. A high level 32 on the emitter drive pulse 30 controls the enabling of the emitter output 36. The emitter drive pulse 30 is activated during emitter cycle number 0 (as shown at 34). The detector samples 40 are taken at periodic intervals throughout an emitter cycle. These samples are typically digital representations of an A/D converted signal from the detector. The detector intensity 38 increases at some point in time after the start of the emitter cycle. Starting at $t_0$, the detector level is sampled at each detector interval and the sampled value is stored in a detector frame buffer 42.

Upon completion of the emitter/detector cycle, the frame buffer 42 is post-processed to determine the time of flight for the light. The typical equation for time of flight (tof) is:

$$\text{tof} = \lambda_{detector} * k \qquad \text{(Eq. 1)}$$

where $\lambda_{detector}$ is the period of the detector clock k is the detector counter value that signifies when the reflected signal is sensed by the detector For the emitter/detector cycle shown, the value of k for Eq. 1 would be 38 (the leading edge of the sampled signal), 39 (the sample at which full intensity is detected), 38.5 (the mid-point of the leading edge sample and the full intensity sample), or some value in this range based on a pre-determined intensity threshold value or some other interpolation technique used for sub-sample determination. The intensity of the sampled waveform will typically be the maximum intensity value 44 in the frame buffer 42.

Flash LiDAR systems typically utilize a single emitter to cover a scene with laser light and utilize a detector array to establish 3D point locations relative to the device. Each detector in the detector array will measure the time of flight for the first return signal, or via periodic sampling will determine the time of flight of the emitted and detected photons.

FIG. 3 shows a LiDAR emitter 50 for a flash LiDAR system directed toward a planar surface 52 that is positioned at an oblique angle 54 to the emitter 50. The emitter 50 emits light for a defined period of time and the incident light packet 56 is shown as a collection of photons traveling through space at a time after the emitter 50 emits the light pulse. The incident light packet 56 is collimated and a portion of the incident photons 56 are reflected off the surface 52 back toward the light source 50. The reflected light packet 58 will often have a different shape and different energy distribution throughout the packet depending on characteristics of the surface 52. The reflected light packet 58 is focused onto a detector array 60 with a lens 62 or other optics.

Flash LiDAR systems that accurately measure time of flight for first-return photons can interpret some amount of surface angularity 54 if the time-of-flight circuitry is sufficiently fast to differentiate between photons that arrive at different first-return times. In sampling flash LiDAR systems, the sampling rate must be sufficiently fast enough in order to detect small differences in the times of flight of reflected photons. Typical response times for the sampling rate and/or processing by the time-of-flight circuitry may range from 10 picoseconds to 10 nanoseconds and may depend up the nature/frequency of the light energy that is emitted.

It would be an advantage for a multi-return LiDAR system to report a different angle for each return. The use of a single detector with a wide field of view like that shown in FIG. 1 makes it difficult to differentiate reflected light angles in multi-return situations. In order to increase the accuracy and resolution for each emitted packet of light energy a new approach is desirable. Various embodiments of the present invention disclosed herein utilize a multi-detector sensing mechanism and image analysis techniques to increase the spatial accuracy (the detected angle) of detected objects. Some of the embodiments of the present invention also disclose techniques to increase the resolution (the number of object points per incident light packet) of the detected objects. Further embodiments of the present invention disclose techniques to enhance the reported data about detected objects to include information like object edges, corners, and normal angles of surfaces of objects.

Figure 4:
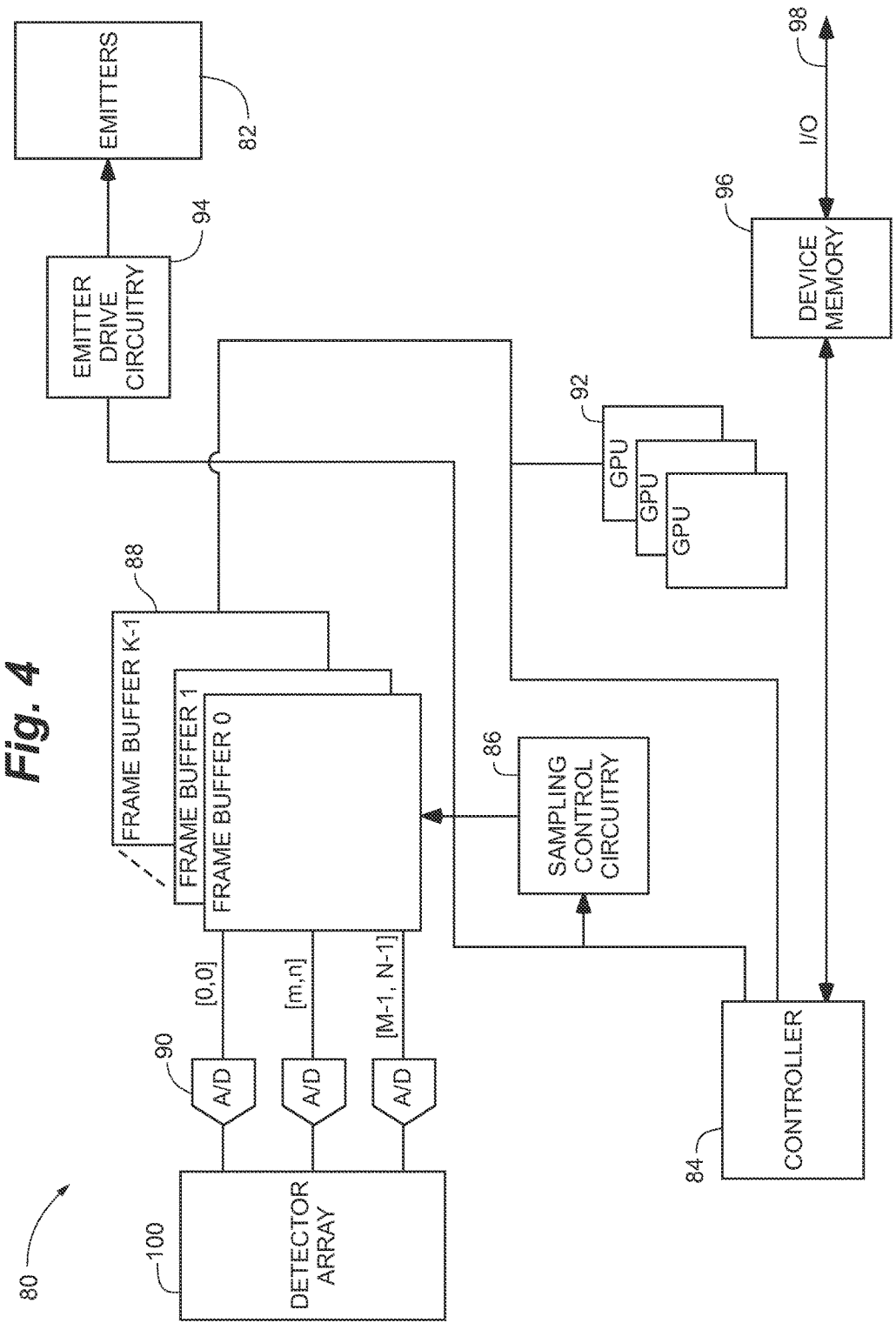
FIG. 4 illustrates a system block diagram for electrical components in accordance with an embodiment of the invention.

FIG. 4 shows some of the elements of a LiDAR device 80 in accordance with various embodiments of the present invention that can be used to improve the resolution, spatial accuracy, precision and information types for detected objects. Emitter drive circuitry 94 is used to control the incident light from the one or more emitters 82. Some embodiments herein can be implemented to enhance a single emitter device as well as a multi-emitter device. The emitter(s) can be incorporated as part of the LiDAR device 80 or can be part of a disparate device that is operably connected to the LiDAR device 80. One differentiating aspect of the embodiments of the LiDAR system of FIG. 4 is that the detector circuitry (controller 84 and sampling control circuitry 86) has precise knowledge of when the emitter(s) 82 are energized. The LiDAR device 80 contains a multi-detector configuration of an array 100 of individual detectors arranged in an embodiment of M rows and N columns. In this embodiment, each detector in the array 100 has a dedicated A/D converter 90, and there are M×N A/D converters 90 per LiDAR device 80.

In embodiments an A/D converter 90 establishes a digital output based on analog input information to a corresponding detector in the array 100. The analog information can be in the form of a voltage, an electrical current, a charge, or any other electrical, photonic or molecular description of the converted or transformed optical signal. The digital output of the A/D 90 can be multi-bit or can be a single bit (1 or 0) based on a defined or configurable threshold. In various embodiments A/D converter 90 can take the form of a quantum effect counter whereby the digital output is a representation of the number of quantum events or quantum particles present in the transformed optical signal.

A frame buffer block 88 contains K frame buffers, where K represents the number of samples acquired for each detector during a single detector/emitter cycle. For example, Frame Buffer 0 represents the sampled detector values at time $t_0$ for all M×N detector elements in the detector array 100. The number of bits per detector sample will be equivalent to the number of bits produced by each A/D converter 90. As an example, a LiDAR device 80 that has a detector array 100 of 256 rows and 256 columns will have 65,536 detectors. If each A/D converter 90 in this device has 16 bits, each frame buffer 88 will contain 1,048,576 bits, or 131,072 8-bit bytes. If the number K of samples per detector/emitter cycle is 128, there will be 16,777,216 bytes of storage in all of the frame buffers for frame buffer block 88.

The sampling control circuitry 86 controls the sampling of the A/D converters 90 for each of the M×N detectors at each of the K frame buffers. Upon completion of the detector/emitter cycle the Graphics Processing Units (GPUs) 92 analyze the frame buffer 88 contents to determine the information for each detected signal in accordance with the volumetric analysis techniques described in the various embodiments of the present invention. The number of GPUs 92 per device can vary from 1 to M×N. More GPUs 92 will yield greater throughput for the device 80. In one embodiment the number of GPUs 92 will be equal to the number of emitters utilized for each emitter/detector cycle. Each GPU 92 consists of a processing unit, instruction memory, working memory, result memory and configuration circuitry. The results of the GPU 92 analyses are stored within each GPU 92 and moved to the device memory 96 by the controller 84. Upon completion of the data packet creation in device memory 96, the controller initiates the transmission of the data packets via the I/O interface 98.

An example of a commercially available multi-GPU device suitable for use with various embodiments of the present invention is the nVidea GEFORCE® Titan product that contains 2688 CUDA cores, wherein a CUDA core is described as a proprietary parallel computing platform and programming model that enables dramatic increases in computing performance by harnessing the power of the graphics processing unit (GPU). For a more detailed description of this embodiment of GPU 92, reference is made to the disclosure at http://www.geforce.com/hardware/desktop-gpus/geforce-gtx-titan/specifications, which is hereby incorporated by reference.

While a multi-GPU device is used in certain embodiments, it will be recognized the processing units such as GPU 92 may be any programmable device that accepts digital data as input, is configured to process the input according to instructions or algorithms, and provides results as outputs. In an embodiment, the processing systems can include one or more central processing units (CPUs) configured to carry out the instructions stored in an associated memory of a single-threaded or multi-threaded computer program or code using conventional arithmetical, logical, and input/output operations. The associated memory can comprise volatile or non-volatile memory to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these are given only by way of example and are not intended to limit the scope of the invention.

The other embodiments, the processing system can include various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware that execute an operating system, system programs, and/or application programs, while also implementing the engine using multitasking, multithreading, distributed processing where appropriate, or other such techniques.

Accordingly, it will be understood that each processing system can be realized in a variety of physically realizable configurations, and should generally not be limited to any particular implementation exemplified herein, unless such limitations are expressly called out. In addition, a processing system can itself be composed of more than one engines, sub-engines, or sub-processing systems, each of which can be regarded as a processing system in its own right. Moreover, in the embodiments described herein, each of the various processing systems may correspond to a defined autonomous functionality; however, it should be understood that in other contemplated embodiments, each functionality can be distributed to more than one processing system. Likewise, in other contemplated embodiments, multiple defined functionalities may be implemented by a single processing system that performs those multiple functions, possibly alongside other functions, or distributed differently among a set of processing system than specifically illustrated in the examples herein.

Figure 5:
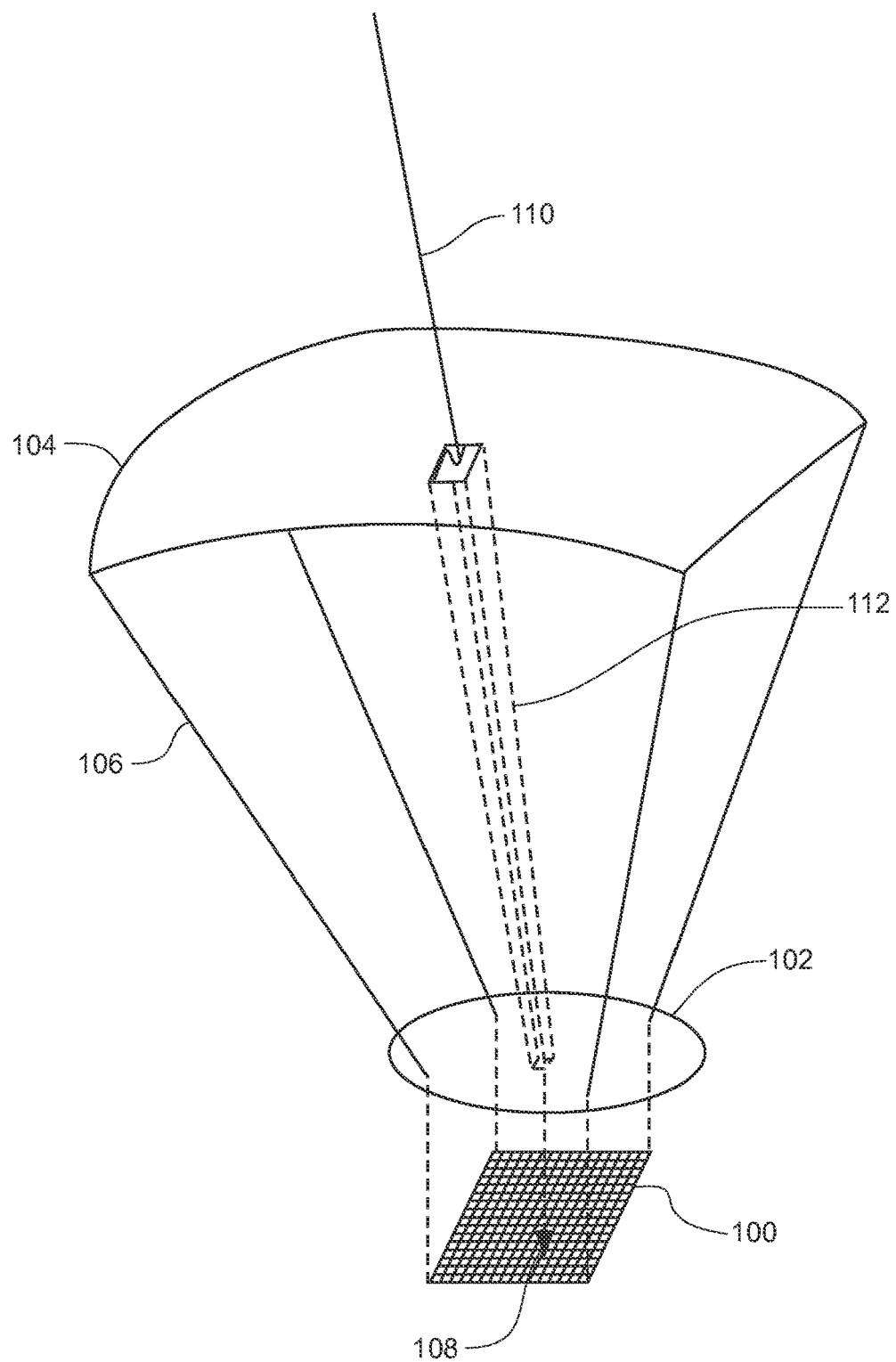
FIG. 5 illustrates a device field of view for a detector array in accordance with an embodiment of the invention.

FIG. 5 shows the optical configuration of an embodiment for a detector array 100. A lens 102 or other optics determines the field of view 106 of the detector array 100. The edges of the detector array 100 field of view 106 are defined by angular extents from the normal vector of the device. This same normal vector will serve as the reference vector for subsequent angular measurements for detected objects. The surface 104 shown is a portrayal of the detector array 100 field of view at a constant distance from the array 100. In various embodiments, each detector element 108 in the array 100 may be associated with a different angle 110 within the field of view 106. The individual detector's 108 field of view 112 will be a subset of the detector array's 100 field of view 106. Said another way, the detector array 100 field of view 106 is the summation of all of the individual fields of view 112.

For a detector array 100 with an in-focus lens 102 the individual fields of view 112 corresponding to each detector 108 should perfectly align with the fields of view for neighboring detectors. In practice, a lens 102 will almost never be perfectly in focus. Thus, the fields of view 112 of each detector 108 in a lensed system may typically overlap. Detector arrays 100 may not have optimal density in their configuration due to semiconductor layout limitations, substrate heat considerations, electrical crosstalk avoidance, or other layout, manufacturing, or yield constraints. As such, sparse detector arrays 100 may experience loss in photon detector efficiency within the device field of view 106 due to reflected photons contacting the unutilized spaces between successive detector elements 108.

For non-lensed systems the field of view 112 of each detector 108 can be determined by a diffraction grating, an interferometer, a waveguide, a 2D mask, a 3D mask, or a variety of other aperture configurations designed to allow light within a specific field of view. These individual detector apertures will typically have overlapping fields of view 112 within the device field of view 106.

An element of various embodiments of the present invention is the determination of an angle 110 for each detector 108. FIG. 5 shows a detector array 100 with a single lens 102. Another embodiment utilizes micro lenses at each detector element 108 wherein the individual micro lenses are configured to transmit reflected light at various angles throughout the device's field of view 106. Another embodiment utilizes detector elements 108 with waveguides at various angles throughout the device's field of view. Other embodiments utilize detector elements with apertures created from interferometers, diffraction gratings, 2D masks, 3D masks, or other aperture-forming structures to create waveguide properties at various angles throughout the device's field of view. For a single-lens 102 system like that of FIG. 5 with a lens 102 configured to transmit in-focus light to the array 100, the individual fields of view 112 are essentially adjacent to the fields of view of the neighboring detectors 108 in the array 100. Out-of-focus lenses 102 will produce overlapping fields of view 112 for individual detectors 108. Waveguide and aperture detectors will likely produce overlapping fields of view 112 for individual detectors 108. Micro lenses will also likely produce overlapping fields of view 112 for the individual detectors 108. All of these overlapping field-of-view embodiments produce reliable results according to the specifications herein. The features of the optical detection system of these embodiments are that multiple detector elements comprise a device's field of view 106, and every element in the detector array is defined by the angle 110 that determines the detector 108 field of view 112.

Variations will occur in the fabrication of LiDAR devices. In single-lens 102 detector array devices like that shown in FIG. 5, miniscule differences in the alignment of the array 100 and the lens 102 can cause differences in the detector angles between separate devices. Because of the minor fabrication and assembly differences between devices, each device will undergo a post-production characterization process. The characterization process will define the central angle 110 for each as-constructed detector element. In various embodiments, characterization data from this process is stored in non-volatile memory or in a configuration file for every device. Waveguide, micro lens and aperture devices will require similar characterization to establish angles 110 for each detector element.

Due to the importance of accurate determination of the optical path, in situ calibration may be desirable for devices according to various embodiments of the present invention. As an example, a LiDAR device according to an embodiment of the present invention may be used as a sensor in an autonomous vehicle. In order to protect the device it may be mounted inside a passenger vehicle affixed to the windshield behind the rear-view mirror. Since the device is facing in front of the vehicle, emitted light and reflected light will pass through the windshield on its way to and from external objects. Both components of light will undergo distortion when passing through the windshield due to reflection, refraction, and attenuation. In situ calibration for this autonomous vehicle LiDAR device may include the device emitting pre-determined calibration patterns and measuring the intensity, location, and angle of the reflected signals. The device characterization parameters would be updated to account for the modified optical path of the incident and/or reflected light based on the calibration.

Figure 6:
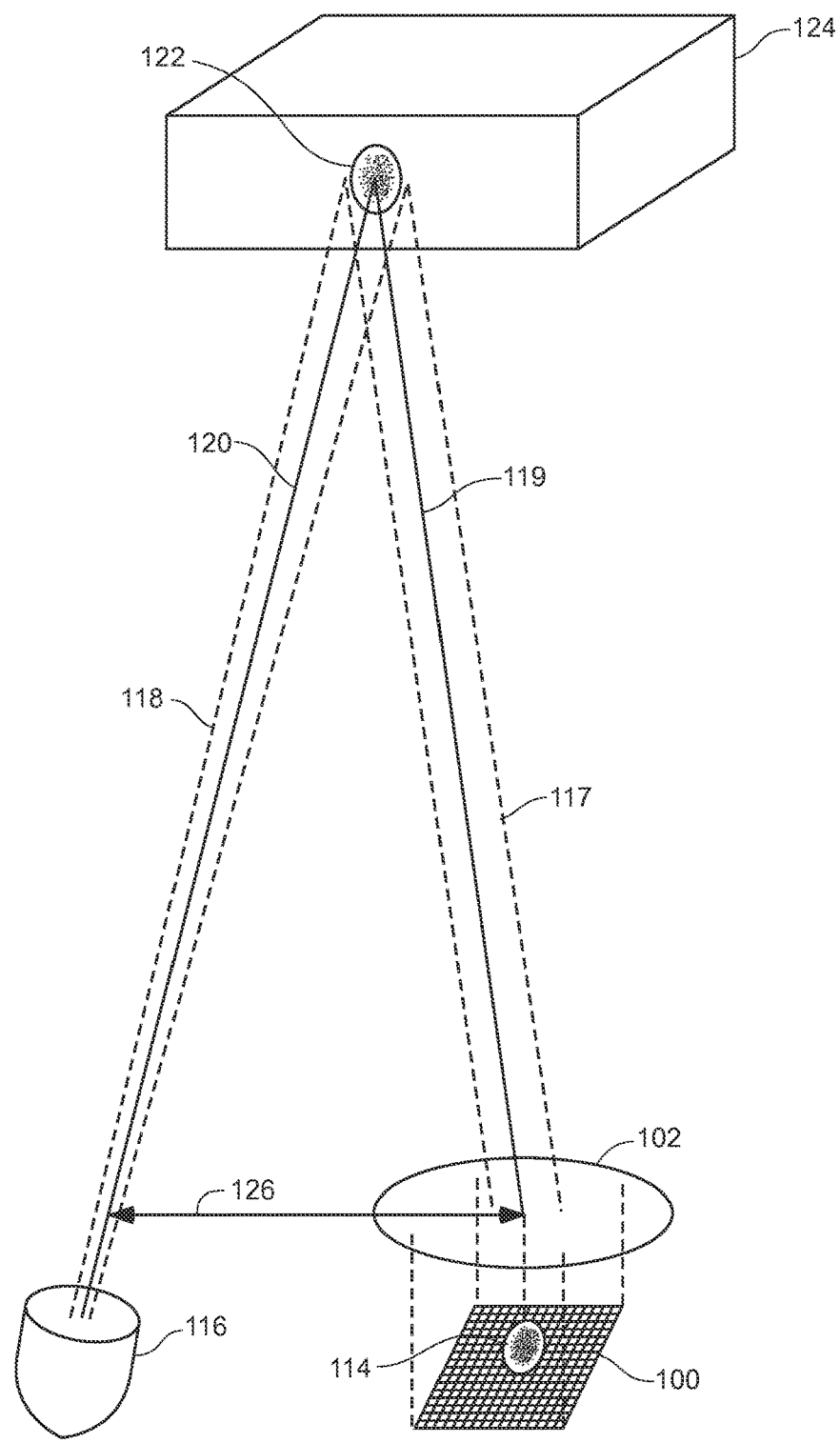
FIG. 6 illustrates the geometry of a single emitter, a single object, and a detector array.

FIG. 6 shows a device configuration with a lensed detector array 100, a single emitter 116, and an object 124 with a flat side with a normal vector that is roughly aligned with the normal vector of the device. The light beam from the emitter 116 has a center vector 120 and a field of view 118. Incident photons 122 that contact the surface of an object 124 will undergo one of four main effects. First, some photons will be absorbed by the object 124 and will not be reflected from the object's surface. Second, some photons will exhibit specular (mirror-like) reflection where the angle of incidence on the surface equals the angle at which it is reflected. Third, some photons will exhibit diffuse reflection where the reflected photons project at various angles relative to the surface of the object 124 and relative to the incident angle. Fourth, other photons will exhibit retroreflection where the reflected energy is directed back toward the source of the incident energy, in this case the emitter 116.

Most LiDAR systems utilize detectors that lie along or essentially along the incident axis of the emitter 116. As such, most LiDAR systems measure the retroreflective properties of objects at the emitter wavelength. Some LiDAR systems attempt to include some of the properties of diffuse reflection into the analysis of return signals, but the intensity of the returned diffuse signal is typically very low relative to the retroreflected signal. The reflected signal has a centerline 119 and a field of view 117 that intersects the lens 102 surface and is directed toward the detector array 100. The offset 126 between the emitter 116 and detector is relatively small compared to the object 124 distance. However, knowing the offset 126 between each detector element and the emitter 116 that produced the beam is an important parameter in working backwards to determine the precise distance to the object 124.

The emitter beam is described in various embodiments as non-uniform. In practice the cross-sectional profile of this beam may have a two-dimensional Gaussian distribution with an ovoid shape. The emitted beam may likely have different divergence angles for the horizontal and vertical axis. Each emitter beam may undergo a characterization process whereby the emitted beam's intensity is determined throughout the entire cross section. The beam intensity profile may be described mathematically or numerically. Mathematical representations require less storage on the device, but may introduce more error than numerical approaches. One skilled in the art can utilize other methods for determining, storing, and manipulating beam profiles. It will be appreciated that various embodiments of the present invention may utilize any characterized beam profile in the processing of reflected signals to enhance the information produced.

A typical beam profile for a two-dimensional Gaussian beam will consist of a center vector and a 2D array of values with each set of values comprising a signal intensity and an angle. The angle of each sub-beam within the array can be expressed as relative to the center vector or relative to the device normal vector. An important feature of the beam profile is that the light intensity is expressed along a defined angle. FIG. 6 shows the reflected beam 114 that has been transmitted by the lens 102 onto the detector array 100. Every element on the array 100 is connected to an A/D converter 90 and sampling circuitry for the respective frame buffer bank 88 to capture intensity values throughout the device field of view for each sampling event.

The round trip distance from the emitter to the target and back to detector m,n in the array 100 is designated as the sample distance and is expressed as:

$$D_{(sample)[m,n]} = V_{light} * tof_{m,n} \quad \text{(Eq. 2)}$$

where $v_{light}$ is the velocity of light in the medium (atmosphere, water, oceans, space, etc.) where the device is used $tof_{m,n}$ is the round trip time of flight for the emitted and detected signal From FIG. 6 the sample distance is the sum of the incident and reflected distances and is expressed as:

$$D_{(sample)[m,n]} = D_{incident} D_{(reflected)[m,n]} \quad \text{(Eq. 3)}$$

where $D_{incident}$ is the distance from the emitter to the target $D_{(reflected)[m,n]}$ is the distance from the target to detector m,n Using the law of cosines, the distances from FIG. 6 can be expressed as:

$$D_{incident}^2 = D_{(reflected)[m,n]}^2 + offset_{m,n}^2 - 2 * D_{(reflected)[m,n]} * offset_{m,n} * \cos(90-\alpha) \quad \text{(Eq. 4)}$$

where $D_{incident}$ is the distance from the emitter to the target $D_{(reflected)[m,n]}$ is the distance from the target to detector m,n $offset_{m,n}$ is the offset distance from the emitter to detector m,n $\alpha$ is the angle of the center point of the detected signal, expressed in degrees Solving Eq. 3 and Eq. 4 for the distance from the target to each detector:

$$D_{(reflected)[m,n]} = \frac{D_{(sample)[m,n]}^2 - offset_{m,n}^2}{2 * D_{(sample)[m,n]} - 2 * offset_{m,n} * \cos(90-\alpha)} \quad \text{(Eq. 5)}$$

For values of α close to 90 degrees and offset values that are small relative to the reflected distance, the offset terms in Eq. 5 can be ignored and the reflected distance can be expressed as:

$$D_{(reflected)[m,n]} = D_{(sample)[m,n]} / 2 \quad \text{(Eq. 6)}$$

In an application, for example, where a is 80 degrees, the offset is 30 mm and the sample distance is 20 meters, Eq. 6 will yield a reflected distance of 10 meters while Eq. 5 will yield a reflected distance of 10.00258 meters, or roughly 2.58 mm more than the result of Eq. 6. For high precision measurements at close ranges where the distance to the object is less than 5 meters Eq. 5 can be used to compute the distances to objects. Whereas, for measurements that can be used for analysis of surface characteristics, such as road surface measurements, Eq. 6 can be used. LiDAR systems as described herein will typically be a smart sensor component of a collision avoidance system, autonomous vehicle navigation system, data collection and analysis system and/or a surveillance system. Examples of these various kinds of upstream systems for which a LiDAR system in accordance with the various embodiments can be used are described, for example, in U.S. Pat. Nos. 8,855,849 and 8,364,334, the disclosures of which are incorporated herein by reference.

For each measured location within the field of view the LiDAR system in accordance with at least some of the embodiments described will report 3D location information to an upstream system for the point in the form of (d, φ, θ, i) where d is the distance to the measured point or object from the device, φ is the horizontal plane angular offset from the device normal vector, θ is the vertical plane angular offset from the device normal vector, and i is the intensity of the reflected signal. U.S. patent application Ser. No. 14/251,254, which is commonly owned with the present application and the disclosure of which is hereby incorporated by reference, discloses several versions of 3D object and point location reporting that include parameters like edge features, corner features and normal vectors for the surfaces of detected objects.

Systems that utilize LiDAR as smart sensors typically convert the relative positional information provided by the sensor into real-world coordinates. For example, a data collection system will need to associate sensor-provided points to actual real-world features and objects. The data collection system will utilize its trajectory information, typically described utilizing 6 DOF (degrees of freedom) nomenclature like (X, Y, Z, roll, pitch, yaw) for a reference point on the system, the relative offset measurement between the sensor reference point and the system reference point, and the relative location(s) of the point(s) provided by the sensor to establish the real-world coordinates of the point(s).

Figure 7:
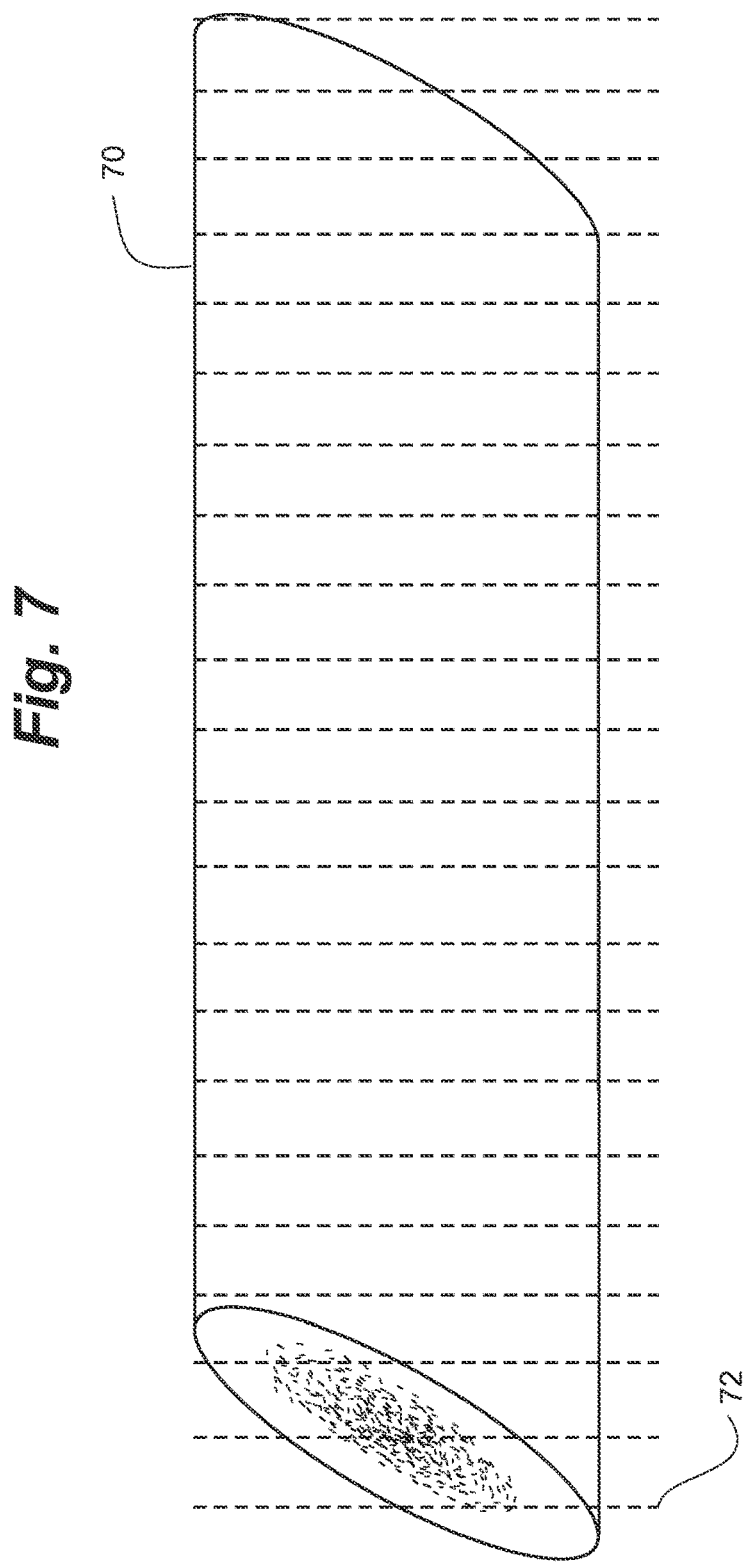
FIG. 7 illustrates volumetric reconstruction of a sampled light packet in accordance with an embodiment of the invention.
Figures 9C, 9D:
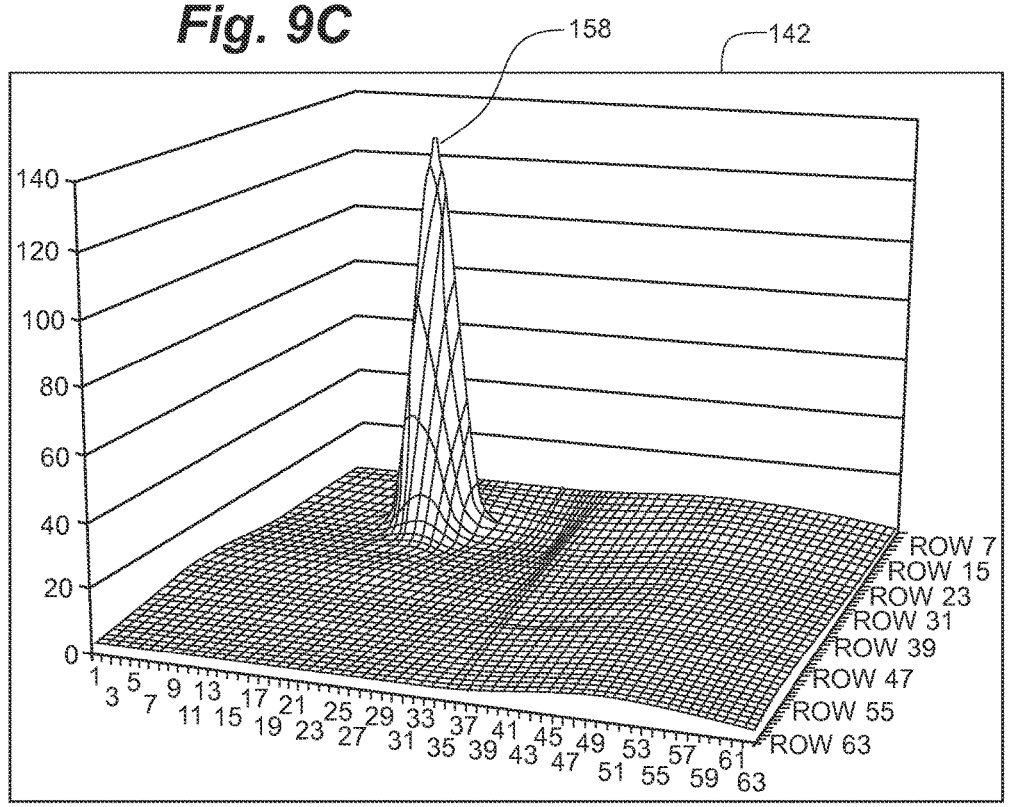
FIG. 9C illustrates a three-dimensional graphical representation of a surface image in accordance with an embodiment of the invention.
FIG. 9D illustrates a sampled frame buffer for a detector array in accordance with an embodiment of the invention.
Figures 11A, 11B:
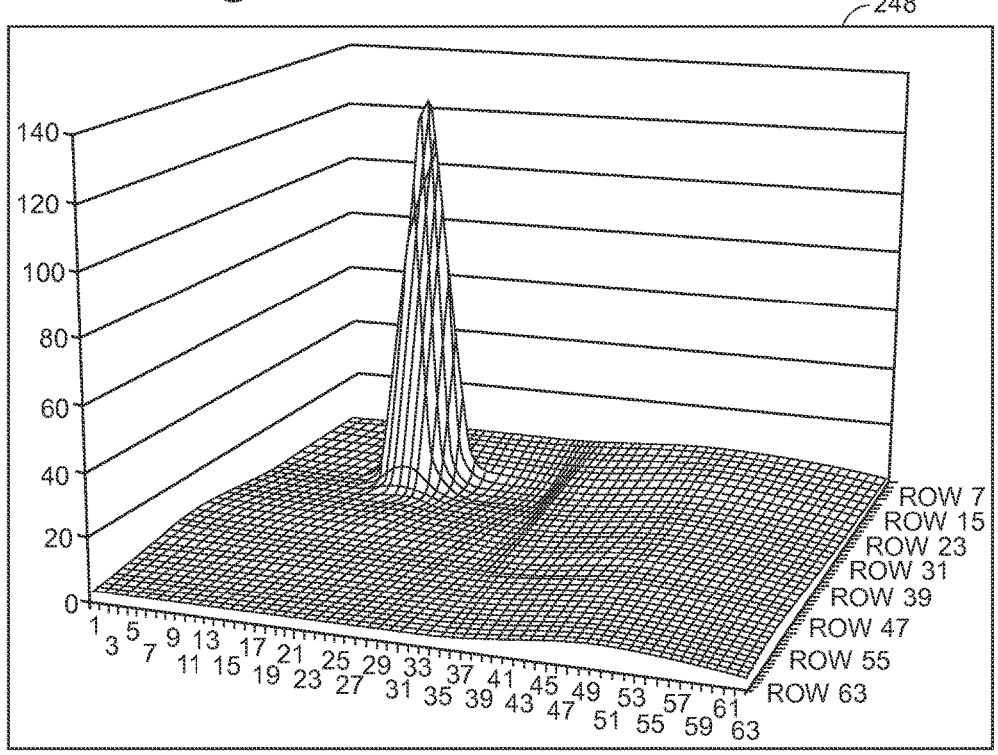
FIG. 11A illustrates a three-dimensional graphical representation of a surface image in accordance with an embodiment of the invention.
FIG. 11B illustrates a sampled frame buffer for a detector array with an object face at a non normal orientation to the sensor in accordance with an embodiment of the invention.
Figures 11C, 11D:
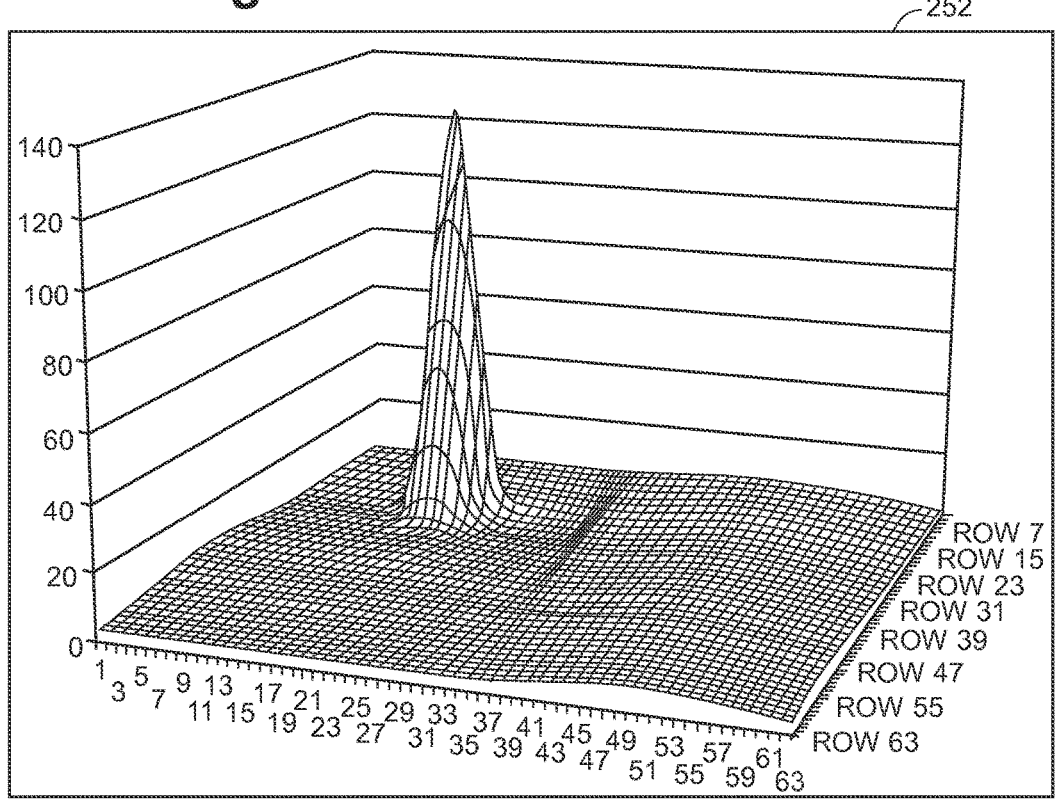
FIG. 11C illustrates a three-dimensional graphical representation of a surface image in accordance with an embodiment of the invention.
FIG. 11D illustrates a sampled frame buffer for a detector array with an object face at a non normal orientation to the sensor in accordance with an embodiment of the invention.
Figures 11E, 11F:
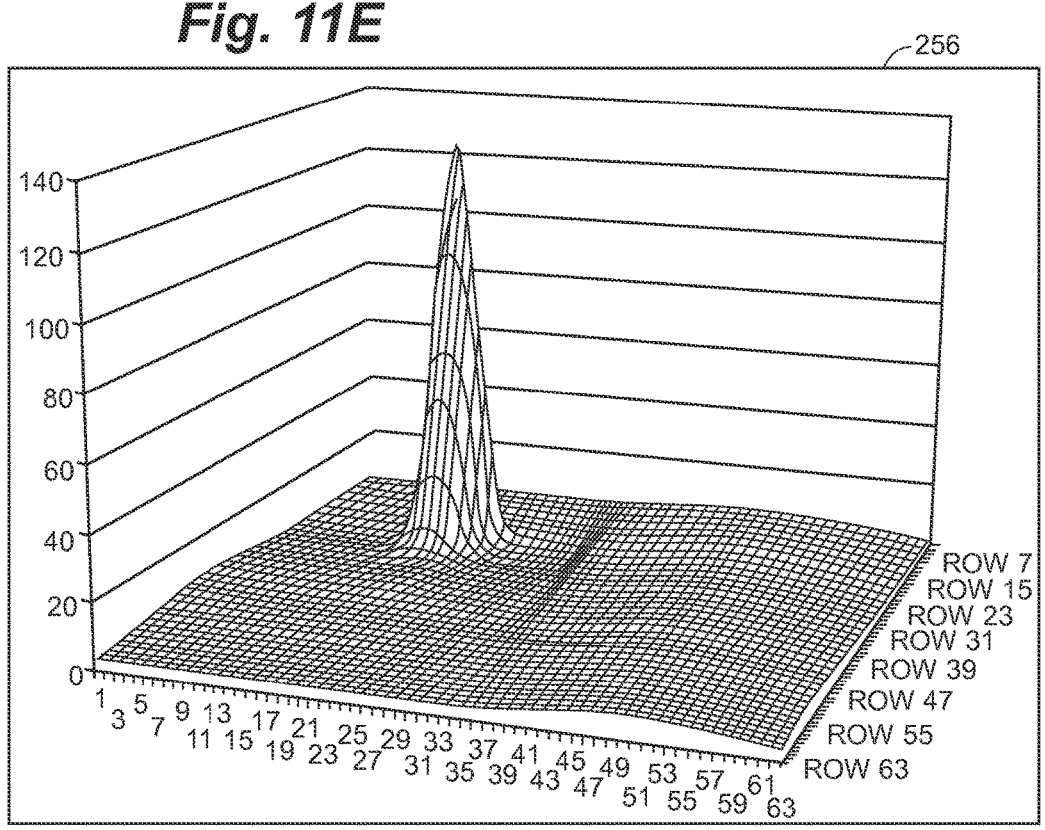
FIG. 11E illustrates a three-dimensional graphical representation of a surface image in accordance with an embodiment of the invention.
FIG. 11F illustrates a sampled frame buffer for a detector array with an object face at a non normal orientation to the sensor in accordance with an embodiment of the invention.

FIG. 7 shows a close-up of the reflected light packet 70 subject to the volumetric analysis in accordance with various embodiments of the present invention. For purposes of the present invention, it will be understood that a volumetric analysis includes an analysis of frame buffers corresponding to the LiDAR detectors that is performed for multiple points in time or samples within that frame buffer such that there are multiple periodic samples that may be evaluated to reconstruct and analyze the reflected light energy. For example, the vertical lines 72 represent a periodic sampling of the reflected light by the LiDAR detector sampling circuitry 86 as shown, for example, in FIG. 4. At each sampling time a frame buffer is created that constitutes a single-bit or multi-bit intensity value for each discrete detector in the detector array 100.

By utilizing volumetric reconstruction and analysis of the reflected light packet 70, embodiments of the present invention can determine more information about the surface characteristics of the object than in the flash LiDAR case as shown in FIG. 1. Changes in the energy distribution along the axis of the light packet will yield information about the contour of the surface. Transformations of the energy distribution between the characterized incident wave and the reflected wave will yield information about the texture of the surface.

A sample comparison of surface angle measurements for first return system of conventional flash LiDAR and a GPU-based volumetric analysis in accordance with various embodiments of the present invention highlights the difference in surface angle determination capabilities. For this sample comparison, assume:

1) the speed of light is 0.3 mm/picosecond,
2) a 10 picosecond period sampling clock,
3) incident energy contacting a sloped surface of 8 degrees from the normal vector,
4) incident light circular field of view of diameter 4 centimeters, and
5) a detector grid of 5×5 that covers the field of view of the returned signal.

With these assumptions, the first-return system of conventional flash LiDAR systems will obtain only one sample during the leading-edge portion of a returned light energy. The values in the detector array of the conventional Flash LiDAR system will be unable to resolve a difference between the eight-degree sloped surface and a 0.5 degree sloped surface. The error in this case would be approximately +/−4 degrees. In contrast, the GPU-based system with volumetric analysis in accordance with various embodiments of the present invention utilizes the leading edge sample and at least one steady state sample during the period of the light pulse to determine the angle of the measured surface to +/−1.5 degrees.

FIG. 8 shows the timing diagram for the sampling of the detectors for a single object. The emitter drive pulse 128 activates the emitter output 130 at emitter time $t_0$. There are 48 samples acquired for this emitter/detector cycle, denoted as times $t_0$ through $t_{47}$ on the detector sampling timeline 134. The intensity of the reflected light at the detector elements is shown as detector m,n intensity 132. In the frame buffer block 136, there is a frame buffer for each detector sample event. Each frame buffer contains a multi-bit value for each detector in the array 100. For a device that has M*N detectors and A/D converters with L bits, each frame buffer will have M*N*L bits. If K represents the number of samples per detector cycle, the frame buffer block 136 will contain M*N*L*K bits.

FIGS. 9A-9F display[s] frame buffers for three sample times for the single-object example. The first frame buffer 140 (FIG. 9B) is for $t_{38}$, the second frame buffer 144 (FIG. 9D) is for times $t_{39}$ through $t_{41}$, and the last frame buffer 148 (FIG. 9F) is for $t_{42}$. The values in each cell correspond to the sampled intensity value for each detector element. The maximum intensity values 150, 152, 154 are denoted in each frame buffer. The 3D surfaces 156, 158, 160 (see FIGS. 9A, 9C, and 9E) graphically show a visualization for understanding the contents of the frame buffers 140, 144, 148 where each element on the x-y plane of the graph 138, 142, 146 represents a detector in the array and the z value (height) of the surface 156, 158, 160 represents the intensity value of each element in the array.

Frame buffer $t_{38}$ 140 establishes the time of first return as t=37.5 time periods. Utilizing Eq. 1 and Eq. 2 yields the $D_{sample}$ for this object, which is the length of the optical path from the emitter to the object and back to the detector array. With a characterized emitter at a known central angle, a characterized beam profile and a known $D_{sample}$ the theoretical reflected beam profile can be compared to the sampled profile. If m,n(k) represents the detector frame buffer at time k and m,n($D_{sample}$) represents the expected frame buffer values for the emitter as received from a normal object of constant intensity at distance $D_{sample}$, the ratio of sampled to expected values for each detector can be expressed as:

$$\text{Ratio}_{m,n} = m,n(D_{sample})/m,n(k) \quad \text{(Eq. 7)}$$

The expected frame buffer in this embodiment will typically cover a small percentage of the elements in a detector frame buffer since the field of view of the emitted beam will usually be rather small compared to the detector array field of view. The area of interest for Eq. 7 will be confined to those pixels that have an expected value that is non-zero and above a defined threshold. Having established the localized ratios of actual values to expected values, the processing as part of the volumetric analysis can identify the pixels with a constant ratio within the expected value array. These constant-ratio pixels will be grouped together as being from the same surface. For constant-ratio analysis the ratios of the pixels do not need to be equivalent. The ratio analysis may search for pixel ratios that fall within a defined range based on the pixel ratios from neighboring pixels. The analysis of near-constant ratios to determine surfaces is referred to as segmentation and will be utilized in subsequent examples.

Constant-ratio segmentation analysis, such as in accordance with Eq. 7, can utilize a somewhat large intensity range for grouping pixels together on the same object or surface. Object qualities like surface texture, color, and temperature will result in varying reflective characteristics on the surface of the object. As a result, the intensity values in the frame buffer will vary accordingly. Analysis that utilizes a large range for constant-ratio segmentation can be expanded to include analysis and identification of the surface qualities like texture, color, temperature, friction, density, and surface type.

For each object detected within the frame buffers, the peak detector intensity is identified. The peak intensity is used to determine the reported intensity of the object.

$$\text{Intensity}_{[object](m,n)} = \frac{A * I_{max} * I_{[m,n]}(k)}{I_{[m,n]}(D_{sample})} \quad \text{(Eq. 8)}$$

where $\text{Intensity}_{[object](m,n)}$ is the computed intensity of the object with a peak intensity value at location (m,n)

A is a scaling factor that depends on the efficiency of the device $I_{max}$ is the maximum value allowed for the computed intensity $I_{[m,n]}(k)$ is the measured intensity value for location m,n in the frame buffer for time k $I_{[m,n]}(D_{sample})$ is the expected intensity value for location m,n at an object distance of $D_{sample}$ Since the typical beam from an emitter is diverging, objects farther from the emitter will receive less incident radiation than those objects closer to the emitter. The angular characterization of each emitter will establish the intensity of the emitted beam throughout the emitter's field of view. For every object distance, simple geometry may be used to compute the incident radiation (using an interpolation method for an actual angle between two discrete angles in our light source characterization and calibration) hitting the actual object.

In the determination of the reported intensity of an object, in various embodiments the processing system knows how much incident radiation intersects with the object and how much retroreflected radiation is returned toward the photon source. An "ideal retroreflector" is an object that reflects all incident photons back toward the source of the photons. For every object distance, there will be an expected return signal for the ideal retroreflector. This expected return signal is a function of the emitter characterization (the diverging angles throughout the emitter field of view), the device calibration (the angular and intensity adjustments due to the medium), and the distance to the object. The intensity conversion from the detector intensities to the reported intensity of an object is governed by the $I_{[m,n]}(D_{sample})$ term of Eq. 8.

FIG. 10 shows a typical roadside scene. The field of view 74 of an emitted beam from a LiDAR device 78 mounted on a vehicle 79 traveling along the road is shown on the side of the foreground building 76. The surface of the building 76 is likely uniform intensity, but the normal vector to the building 76 side is not aligned with the normal vector of the LiDAR device 78. For the non-normal building 76 side, photons from the emitter will reach the building 76 at the left side of the emitter field of view 74 before they reach the building 76 at the right side of the field of view 74. In turn, the return paths for photons on the right side will be longer than those return paths on the left side. Stated another way, the $D_{[sample](m,n)}$ values will be lower for detectors on the left side of the returned signal than they will be on the right side.

Analysis of frame buffers at the leading and trailing edges of return packets from the roadside scene will yield information about the angle of the side of the building. FIGS. 11A-11F show[s] three frame buffers 246, 250, 254 (see FIGS. 11B, 11D, and 11F) and the associated 3D surfaces 248, 252, 256 (see FIGS. 11A, 11C, and 11E) for the sampled reflections from the building side. Segmentation analysis of the steady-state frame buffer 250 determines that there is a single object of near-uniform intensity. Furthermore, frame buffer analysis determines there are no signal returns at other sampling times throughout the emitter/detector cycle. The leading-edge frame buffer 246 is a collection of sampled values for all detectors at a sampling time that is early in the received packet cycle. Using Eq. 7 the ratio is computed for all detectors in the leading-edge frame buffer 246. Analysis of the frame buffer ratio map identifies a detector 258 at which the ratio is a maximum. This maximum-ratio location is labeled m,n$_{MaxRatio}$(leading).

In various embodiments, the steady-state frame buffer 250 corresponds to a sample time that is in the middle of the return packet. These steady-state values are experiencing small variations from sample to sample since they reflect time periods whereby all of the incident photons are intersecting with the object throughout the emitter field of view and all reflected photons throughout the field of view. Using Eq. 7 the ratio is computed for all detectors. If the surface of the intersecting object has uniform reflectivity and a constant normal vector throughout the emitter field of view, the ratio analysis on the steady-state frame buffer should yield relatively constant ratios throughout the relevant detector area. The detector of maximum intensity 260 will have a ratio at steady state that is consistent with the ratios of neighboring detectors.

The trailing-edge frame buffer 254 is a collection of sampled values for all detectors at a sampling time that is late in the received packet cycle. Using Eq. 7 the ratio is computed for all detectors in the trailing-edge frame buffer 254. Analysis of the frame buffer ratio map identifies a detector 262 at which the ratio is a maximum. This maximum-ratio location is labeled m,n$_{MaxRatio}$(trailing).

Having determined the locations of the maximum ratios of the leading and trailing edges of the received packet, the GPU can compute the normal vector for the object surface.

$$uvw = \{2*D_1*\sin[(\text{angle-}m_2-\text{angle-}m_1)/2],$$

$$2*D_1*\sin[(\text{angle-}n_2-\text{angle-}n_1)/2],$$

$$\sqrt{[u\text{-comp}^2+v\text{-comp}^2+(D_2-D_1)^2]}*\tan[90-\tan^{-1}((D_2-D_1)/\sqrt{(u\text{-comp}^2+v\text{-comp}^2)})]\} \quad \text{(Eq. 9)}$$

Where $D_1 = D_{[reflected](m,n)}$ for $m,n_{MaxRatio}$(leading),
$D_2 = D_{[reflected](m,n)}$ for $m,n_{MaxRatio}$(trailing),
Angle-$m_1$ is the x component of the angle for $m,n_{MaxRatio}$ (leading),
Angle-$m_2$ is the x component of the angle for $m,n_{maxRatio}$ (trailing),
Angle-$n_1$ is the y component of the angle for $m,n_{MaxRatio}$ (leading),
Angle-$n_2$ is the y component of the angle for $m,n_{maxRatio}$ (trailing),
u-comp is the u component of the uvw notation for Eq. 9
v-comp is the v component of the uvw notation for Eq. 9

The determination of maximum-ratio locations in the detector array depends on a sufficiently high sampling rate for the detectors. For sampling rates that are somewhat lower than ideal, extrapolation is used to establish accurate maximum-ratio locations. For example, a sampling system that captures a single frame buffer during the "ramp-up" part of the cycle, a single frame buffer during the "ramp-down" part of the cycle, and multiple steady state frame buffers will underestimate the locations of maximum ratios for both the leading and trailing edges. For a "ramp-up" frame buffer the location of the sample in time can be estimated by comparing the additive intensity of the ramp-up frame buffer to the additive intensity of the steady-state frame buffer.

$$Pct(\text{leading}) = \frac{\sum \text{Intensity}_{m,n}(\text{ramp-up})}{\sum \text{Intensity}_{m,n}(\text{steady-state})} \quad \text{(Eq. 10)}$$

where Pct(leading) is the percentage of leading edge time that has elapsed from the start of the leading edge of the light packet until the sampling of the ramp-up frame buffer.
Intensity$_{m,n}$(ramp-up) is the intensity value of location m,n in the ramp-up frame buffer.
Intensity$_{m,n}$(steady-state) is the intensity value of location m,n in the steady-state frame buffer.

The Pct(trailing) number is obtained in a similar way by computing the ratio of the additive intensity of the ramp-down frame buffer to the additive intensity of the steady-state frame buffer. Using Eq. 10 for leading and trailing end percentages, the maximum ratio locations can be determined by:

$$m_{MaxRatio}(\text{leading}) = \quad \text{(Eq. 11)}$$
$$m_{r-u} - (m_{r-u} - m_{r-d}) * \frac{Pct(\text{leading})}{Pct(\text{leading}) + Pct(\text{trailing})}$$

$$n_{MaxRatio}(\text{leading}) = \quad \text{(Eq. 12)}$$
$$n_{r-u} - (n_{r-u} - n_{r-d}) * \frac{Pct(\text{leading})}{Pct(\text{leading}) + Pct(\text{trailing})}$$

$$m_{MaxRatio}(\text{trailing}) = \quad \text{(Eq. 13)}$$
$$m_{r-u} + (m_{r-u} - m_{r-d}) * \frac{Pct(\text{trailing})}{Pct(\text{leading}) + Pct(\text{trailing})}$$

$$n_{MaxRatio}(\text{trailing}) = \quad \text{(Eq. 14)}$$
$$m_{r-u} + (m_{r-u} - m_{r-d}) * \frac{Pct(\text{trailing})}{Pct(\text{leading}) + Pct(\text{trailing})}$$

where $m_{r-u}$—is the horizontal component of the max-ratio location in the ramp-up frame buffer
$n_{r-u}$—is the vertical component of the max-ratio location in the ramp-up frame buffer
$m_{r-d}$—is the horizontal component of the max-ratio location in the ramp-down frame buffer
$n_{r-d}$—is the vertical component of the max-ratio location in the ramp-down frame buffer The extrapolated MaxRatio locations from Eqs. 11-14 for the leading and trailing edges are utilized in Eq. 9 to determine the normal vector for the surface of the object.

One measure of the precision of a LiDAR device is how accurately the measured distances to objects are reported by the device. For example, using a speed of light of 0.3 mm/picosecond and a LiDAR system according to an embodiment that utilizes a detector sampling frequency of 100 picoseconds, the precision of the system would be based on frame buffers sampled at 30 mm increments. Depending on GPU post-processing, the actual object distances could be measured to +/−7.5 mm increments. In some embodiments it is desirable to utilize lower sampling frequencies to reduce device cost and/or increase manufacturability. In other embodiments it is desirable to increase the precision of the device by increasing the effective sampling rate.

FIG. 12 shows an embodiment of a LiDAR device 161 in accordance with the present invention that includes a detector array 162 with a single emitter 164. The device 161 is operated in an environment whereby the device 161 and an object 165 are stationary, or whereby the relative movement between the device 161 and the object 165 is relatively small during the timeframe of the emitter cycles. Small relative movement of the device and/or scene could be defined as the movement of less than the inter-element spacing in the detector array. For embodiments wherein the relative movement is small the processing software can assume the axis of the 3D volumetric reconstruction is normal to the detector elements in the array. For relative movement greater than the inter-element spacing in the detector array during the timeframe of the emitter cycles the frame buffer analysis software will need to construct 3D volumetric representations of the sampled waveforms whereby the representations have an axis that is non-normal to the detector elements in the array.

The emitter 164 is directed toward a planar surface 166 of the object 165 that is positioned at an oblique angle 168 to the emitter 164. The emitter 164 emits a series of light pulses, each for a defined period of time and the incident light packets 170 are shown as collections of photons traveling through space at a time after the emitter 164 emits the light pulses. The incident light packets 170 are all uniform in their shape, duration, and intensity. The only differences in the incident light packets are their positions within the emitter timing cycle and their relative relationships to the detector sampling clock. Incident photons 170 are reflected off the surface 166 back toward the light source 164. The reflected light packets 172 will typically differ from the incident light packets 170 primarily due to the characteristics of the object's surface 166. Reflected light packets 172 will often have a different shape and different energy distribution throughout the packets. The modified shape and energy distribution are some of the characteristics that embodiments will detect, analyze, and interpret to determine myriad descriptions of the object's characteristics. The reflected light packets 172 will all be essentially the same shape and energy distribution as the other reflected light packets, with the only differentiating factor being their positions within the detector timing cycle and their relative positions to the detector sampling clock. It is the uniformity of the reflected light packets 172 and their relative timing position within the detector clock cycle that is exploited in various embodiments of the present invention to reconstruct a high-precision high effective sampling rate volumetric reconstruction of the reflected light packets. The reflected light packets 172 are focused onto a detector array 162 with a lens 174.

Figure 13:
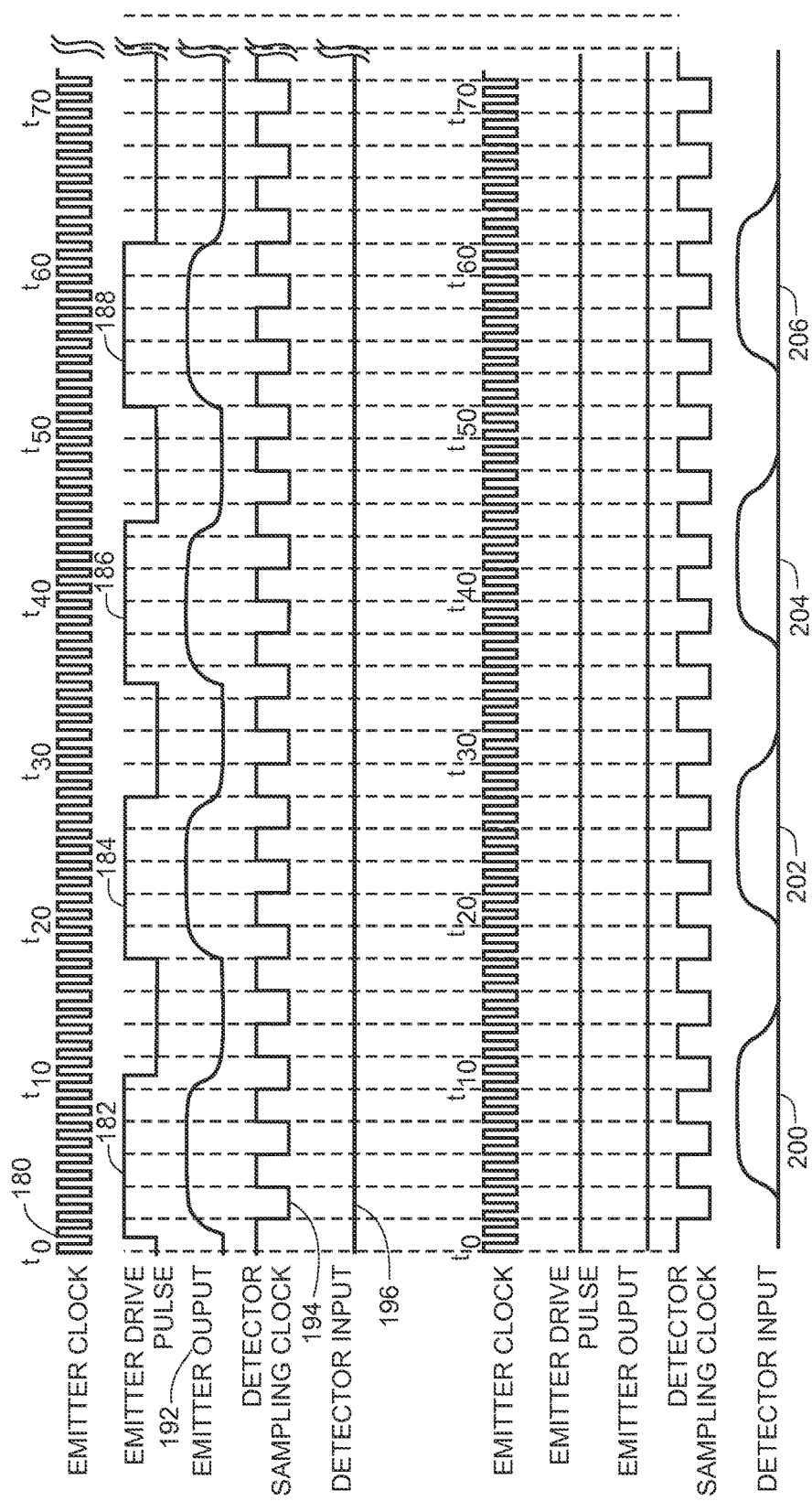
FIG. 13 illustrates the electrical and optical signal timing for a multi-pulse, time-shifted emitter configuration in accordance with an embodiment of the invention.

FIG. 13 shows the electrical and optical timing for a multi-pulse embodiment. The emitter clock 180 is an electrical signal that is used to determine the start time for the emitter drive pulse. Each activation of the electrical emitter drive pulse results in a corresponding activation of the optical emitter output 192. The detector sampling clock 194 determines the sampling rate of the detector frame buffers. Utilizing positive transition logic, one detector frame buffer is filled with sampled detector data on each rising edge of the detector sampling clock 194. In a traditional system with a single-pulse emitter cycle, the start time for the emitter drive pulse is typically synchronized with the detector sampling clock 194.

In the FIG. 13 embodiment the frequency of the emitter clock 180 is four times the frequency of the detector sampling clock 194. The four emitter pulses 182, 184, 186, 188 are offset in time by one full emitter activation period and by a fraction of the detector sampling clock 194. The start time for the emitter drive pulse for the first emitter period 182 is delayed by ¼ of a detector clock period, or one emitter clock period. The start time for the emitter drive pulse for the second emitter period 184 is delayed by ½ of a detector clock period, or two emitter clock periods. The start time for the emitter drive pulse for the third emitter period 186 is delayed by ¾ of a detector clock period, or three emitter clock periods. The start time for the emitter drive pulse for the fourth emitter period 188 is delayed by one detector clock period, or four emitter clock periods. At a point later in time (around $t_{84}$ in FIG. 13), the reflected signals begin energizing the detector input 196 circuitry. The returned signals 200, 202, 204, 206 correspond to the reflected portions of the four pulses emitted previously.

Figure 14:
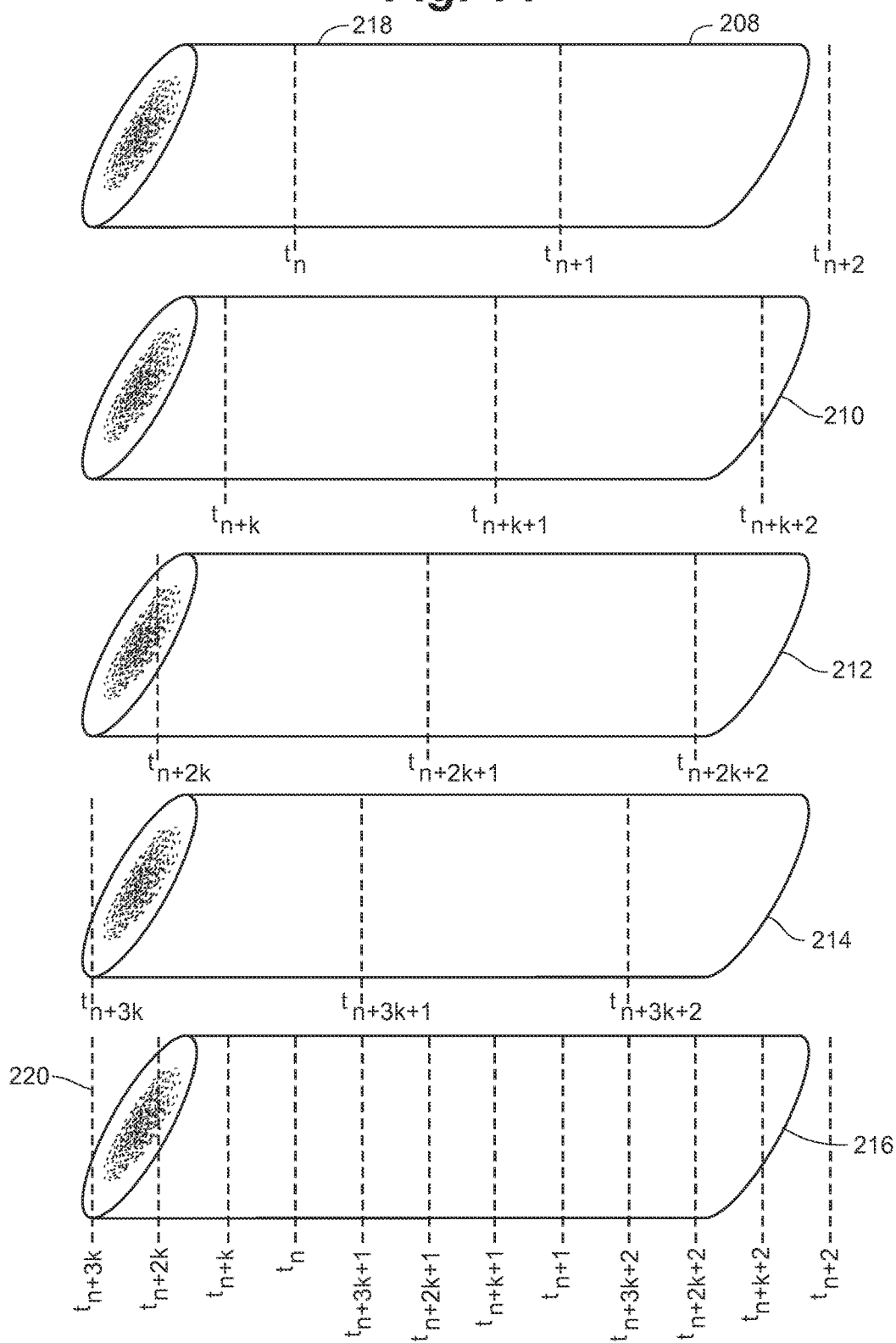
FIG. 14 illustrates the volumetric reconstruction of the reflected light packets resulting from relative time-shifted incident emitter pulses in accordance with an embodiment of the invention.

FIG. 14 shows the 3D profiles of the four reflected packets discussed in FIG. 12 and FIG. 13. Vertical dashed lines 218 show the relative location of the sample that is captured in each frame buffer. Each sample line represents a positive transition of the detector sampling clock and a corresponding filling of the frame buffer with the intensity information for each detector in the array. The first return packet 208 is shown along with the sampling times ($t_n$, $t_{n+1}$ and $t_{1+2}$) within the packet 208. The second return packet 210, which energizes the device detectors at a later point in time, shows the sampling times ($t_{n+K}$, $t_{n+K+1}$ and $t_{n+K+2}$) within the packet 210. Since the start time of the incident packet for the second pulse was delayed by ¼ of the sampling clock period, the samples within the second light packet 210 are captured at different locations, corresponding to a time difference equal to ¼ of the detector sampling clock period, within the second light packet. The third returned light packet 212 and the fourth returned light packet 214 are both shown with their relative times ($t_{n+2K}$, $t_{n+2K+1}$ and $t_{n+2K+2}$ for the third packet and $t_{n+3K}$, $t_{n+3K+1}$ and $t_{n+3K+2}$ for the fourth packet) of the detector sampling clock period. For the detector sampling times of the form:

$$\text{Detector sampling time} = t_{n+aK+b} \quad \text{(Eq. 15)}$$

n signifies the detector sample time at which any detector intensity is first realized for the series of detected waveforms K is the number of detector clock cycles between successive emitted pulses a is the pulse number within the series of detected waveforms, with a=0 for the first pulse b is the sample sequence number within a detected waveform The last item in FIG. 14 portrays the light packet model 216 that is produced by sampling the incoming light packets in a multi-pulse, relative time-shifted system as depicted in FIG. 12 and FIG. 13. The samples 220 shown in the model represent the samples that are acquired for the four relative time-shifted return signals. The effective sampling frequency for the volumetric model 216 is four times the actual sampling frequency for the detector frame buffers.

$$f_{effective} = N * f_{sampling} \quad \text{(Eq. 16)}$$

where $f_{effective}$ is the effective sampling frequency of the device,

N is the number of pulses used in a multi-pulse embodiment $f_{samping}$ is the sampling frequency of the detector frame buffers For each phase-shifted emitter pulse the start times for the N emitter cycles are phase shifted by 1/N, 2/N, 3/N, ... N/N detector clock periods. High-speed electrical systems are typically described using sampling periods instead of sampling frequencies. Expressing the relationship from Eq. 16 as a sampling period yields:

$$p_{effective} = p_{sampling}/N \quad \text{(Eq. 17)}$$

where $p_{effective}$ is the effective sampling period for the relative time-shifted system N is the number of pulses used in a multi-pulse embodiment $p_{sampling}$ is the sampling period of the detector frame buffers In the multi-pulse case where N=4, the emitter drive pulse offsets from the detector sampling clock were established by integer multiples of the emitter clock. Utilizing synchronous clocking methods, the emitter clock frequency will typically be equal to the effective sampling frequency. While utilizing synchronous clocks is practical for N=4, the use of synchronous clocks for N=100 is problematic for embodiments with high detector sampling frequencies. As such, asynchronous methods are desirable for higher-N applications whereby the emitter pulse start times for the 1/N, 2/N, 3/N, ... N/N offsets from the detector clock for the N pulses is selectable utilizing digital delay logic or some other semiconductor-based asynchronous delay circuitry.

As a practical example, assume a LiDAR system embodiment that, due to electrical considerations, has a maximum sampling frequency of 1 GHz, which corresponds to a minimum sampling period of 1 nSec. Utilizing half-cycle interpolation and a speed of light of 300 mm per nanosecond, the precision of the described device for distance measurement would be +/−15 cm. Utilizing the same LiDAR system, but with an N-pulse time-shifted configuration as described herein, with N being equal to 100, the effective sampling rate would be 100 GHz, the effective sampling period would be 10 picoseconds, and the precision of the distance measurement would be +/−1.5 mm.

One skilled in the art will recognize that the sampling period does not need to be uniform throughout the detector sampling cycle. In addition, the offsets for emitter start pulses from the detector sampling clock are not required to be a uniform offset for each successive emitter pulse. The essential elements of the embodiment are that N equally shaped (duration, amplitude, and frequency) emitter pulses are utilized in succession, with each of the N pulses starting at a different relative offset in time from the detector sampling clock.

The range of a LiDAR device is the maximum distance at which objects of interest can be measured. Objects that are highly retroreflective at the given emitter wavelengths will have longer distances at which they can be measured. The range of a particular LiDAR device can be extended by increasing the emitter power and/or increasing the detector sensitivity. Both methods add cost and complexity. One technique that has been utilized to some success to increase range is continuous waveform (CW) imaging where the detector circuitry is tuned to interpret a chirp frequency, defined as the Δf of the incident and reflected frequencies. The incident waveform is typically a portion of the emitted waveform directed toward the detector with an interferometer. The emitted waveform will typically have a changing frequency throughout the emitter cycle. The distance to the reflective object in a CW LiDAR system is a function of the chirp frequency of the interferometer-provided incident and reflected waveforms. The details of implementing CW LiDAR with chirp frequency functionality are described, for example, in U.S. Pat. Nos. 6,118,518 and 6,181,463, the disclosures of which are hereby incorporated by reference.

Figure 15:
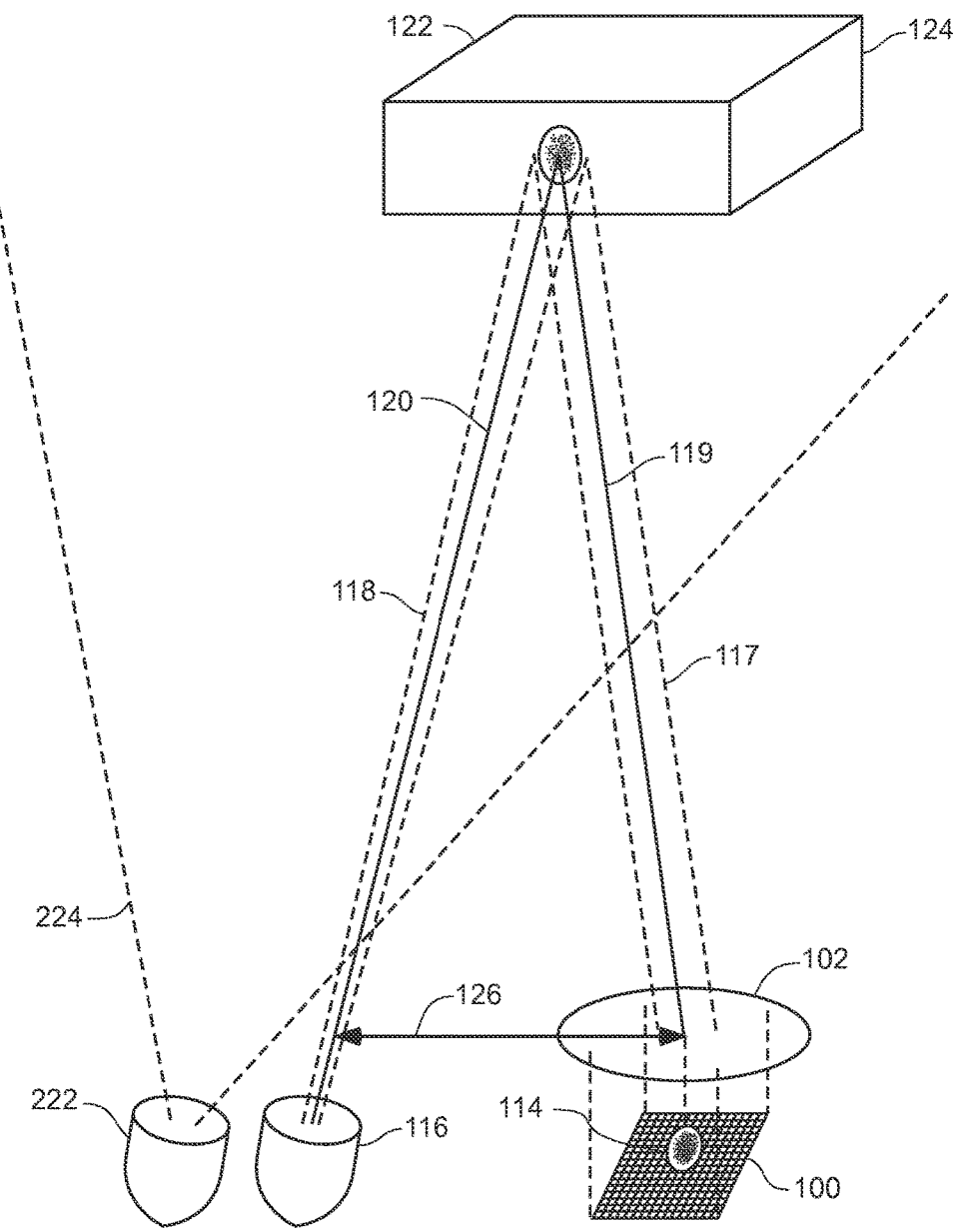
FIG. 15 illustrates the geometry of a dual-frequency emitter system in accordance with an embodiment of the invention.
Figure 16:
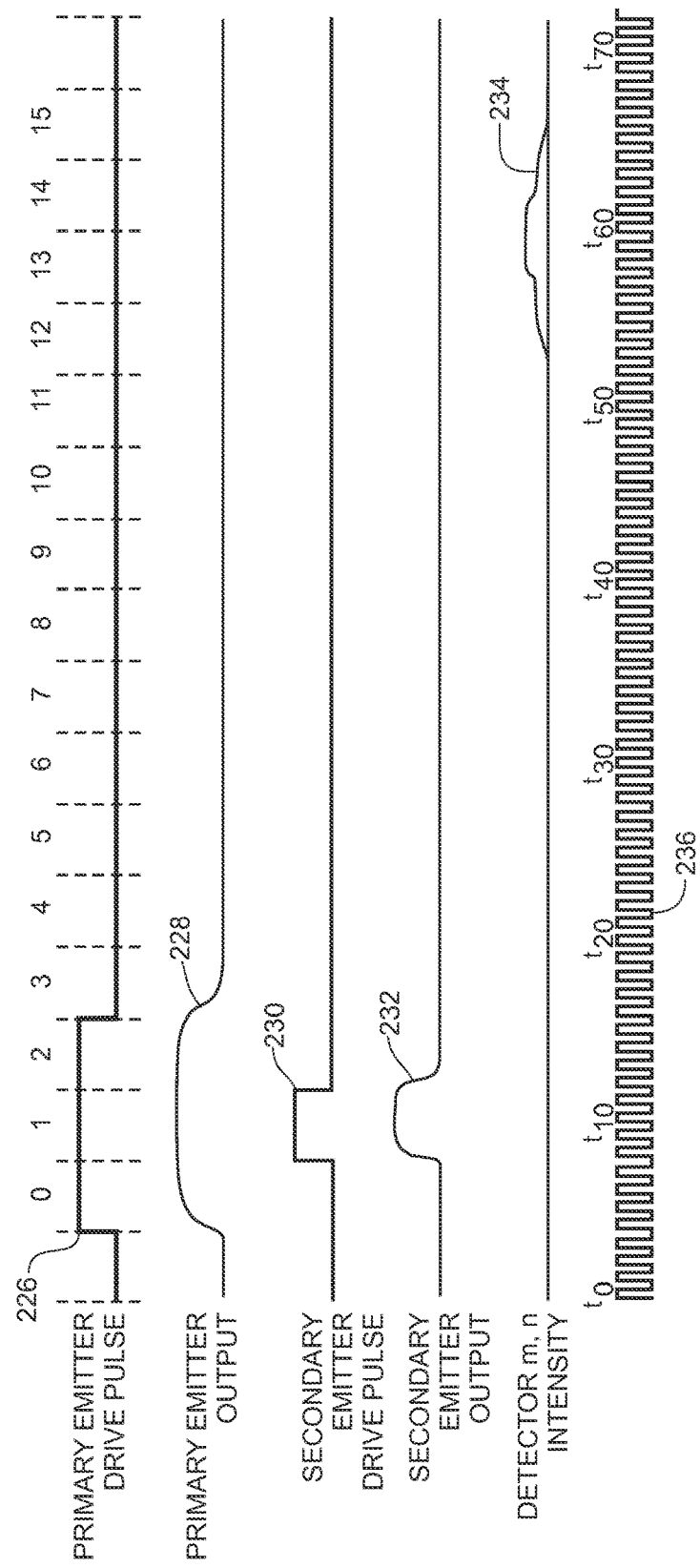
FIG. 16 illustrates the electrical and optical timing of a dual-frequency emitter system in accordance with an embodiment of the invention.

FIG. 15 shows a configuration that utilizes multi-frequency techniques similar to those utilized in CW LiDAR systems but without the interferometer to extend the range of an array-based LiDAR device. A secondary emitter 222 is added to the configuration with a field of view 224 that is equal to or greater than the field of view 118 of the primary emitter 116. The frequency of the secondary emitter 222 radiation will be at a constant frequency throughout its duration, but the frequency will be different than the emitted frequency of the primary emitter 116. The frequency difference Δf is utilized to detect objects that are beyond the range of the primary emitter 116 due to the distance of the object from the emitter or the retroreflective properties of the object.

$$\Delta f_{DF} = f_{primary} - f_{secondary} \quad \text{(Eq. 18)}$$

where $\Delta f_{DF}$ is the frequency difference in a system that utilizes dual frequency techniques
$f_{primary}$ is the frequency of the signals from the primary emitter
$f_{secondary}$ is the frequency of the signals from the secondary emitter FIG. 16 shows a timing diagram for an embodiment with dual-frequency emitters and the detection of a single object. The objective of a dual-emitter, dual-frequency embodiment is to establish distance measurement capabilities for objects that are out of range for single-frequency emitters. The primary emitter drive pulse 226 is activated for three emitter clock periods and the primary emitter output 228 is activated for a similar time. The secondary emitter drive pulse 230 is activated for one emitter clock period and the secondary emitter output 232 activated for a similar time. For embodiments whereby sampled frame buffers are analyzed for detected objects angular characteristics, the secondary emitter output should not be energized during the transition times for the primary emitter pulse 228. Furthermore, the time difference between the leading edges of the two emitter pulses and the trailing edges of the two emitter pulses should be sufficient to allow two detector sampling periods between the pairs of successive edges. The retroreflected information from the object is represented by the detector intensity 234 signal. The intensity values shown here are analyzed by the GPU and deemed as not having sufficient amplitude to perform volumetric analysis, segmentation analysis, constant ratio processing and/or leading/training edge analysis. Therefore, frequency analysis is performed to determine time of flight processing for the object.

Fast Fourier Transform (FFT) processing is performed on each location in the detector array to determine time of flight for the detected objects. The number of frequency bins for FFT processing is defined as:

$$\text{\# of bins} = \text{Samples}/2 \quad \text{(Eq. 19)}$$

where # of bins is the number of frequency bins for the FFT analysis
Samples is the number of samples collected for the FFT analysis The maximum frequency detectable with FFT is the Nyquist frequency, or ½ the detector sampling frequency. The bin resolution is defined as:

$$\text{Bin resolution} = f_S/S \quad \text{(Eq. 20)}$$

Where $f_S$ is the detector sampling frequency
S is the number of samples collected Referring again to FIG. 16, as a practical example the system utilizes a sampling frequency of 500 MHz, a detector sampling clock 236 period of 2 nSec, detector frame buffers with 128 samples, a primary emitter wavelength of 1550.001 nanometers and a secondary emitter wavelength of 1550.002 nanometers. An FFT analysis of the frame buffers by the GPU will detect a maximum frequency of 250 MHz, will utilize 64 bins with each bin having a resolution of 3.90625 MHz. The Δf of the primary and secondary emitters is 125 MHz, which is below the maximum frequency threshold. The FFT analysis will yield the amplitudes of the various frequency components for each frequency bin at each sampling time. Upon completion of the FFT the GPU will analyze the 125 MHz values to determine the sample locations at which this frequency yielded a signal. The amplitude of the 125 MHz frequency components at the sampling times are utilized to determine the time of flight for each detector element and the intensity value to be reported to the upstream application.

In practice the wavelength of emitters in a dual-frequency system may drift due to aging, fabrication tolerances, temperature, or environmental reasons. Furthermore, the frequencies of individual emitters may drift more than their companion emitters within the same device. In various embodiments modifications that adjust FFT parameters according to changing Δf values are incorporated to account for these drift factors.

The techniques disclosed herein can be utilized in a single-emitter configuration with a varying output frequency and an interferometer. The FFT analysis is performed in a similar fashion. The emitter frequency is constantly varying and the detected frequency in the interferometer version will vary depending on the distance to the object. The frequency ramp of the emitter should be confined so that Δf, the difference between the minimum and maximum frequencies, is less than ½ the sampling frequency of the detectors.

In various embodiments modifications to the system shown in FIG. 16 are made whereby the relative pulse widths are changed, the ratio of the primary to secondary widths are changed, the secondary emitter provides either the leading-edge or trailing-edge portion of the convolved signal, the amount of non-overlap between the signals is changed, or there exists 100% overlap with the signals. These modifications are all consistent with an embodiment that utilizes frequencies from two emitters that are energized over a field of view whereby there is some overlap in the time domain of the emitted signals and possibly some non-overlap in the time domain, thus allowing volumetric analysis of the detected signals that are of sufficient intensity for singular emitted signals. Three or more emitters with overlapping fields of view can also be utilized by selecting emitter wavelengths that produce Δf values for each emitter pair that will yield FFT results in different frequency bins for each pair.

In various embodiments of these multi-frequency techniques the use of transformation or other processing techniques known in the art may be substituted in place of FFT analysis, provided that such transform or processing technique can meet the requirements of detecting the presence of the beat frequency Δf at various locations throughout the sampled frame buffers.

LiDAR systems can be susceptible to crosstalk and other interference from energy sources at or near the target device frequencies. The use of multi-frequency emitters and Δf analysis techniques and other similar embodiments can allow for the detection of retroreflected device signals, even in noisy environments. FFT analysis on sampled frame buffers will identify the sampling times at which the Δf occurred and will identify the amplitude (intensity) of the Δf signal at those times. Utilizing Eq. 8 will yield the intensity of this detected signal, where $I_{[m,n]}(k)$ is ½ the value of the intensity reported by FFT analysis.

Figure 17:
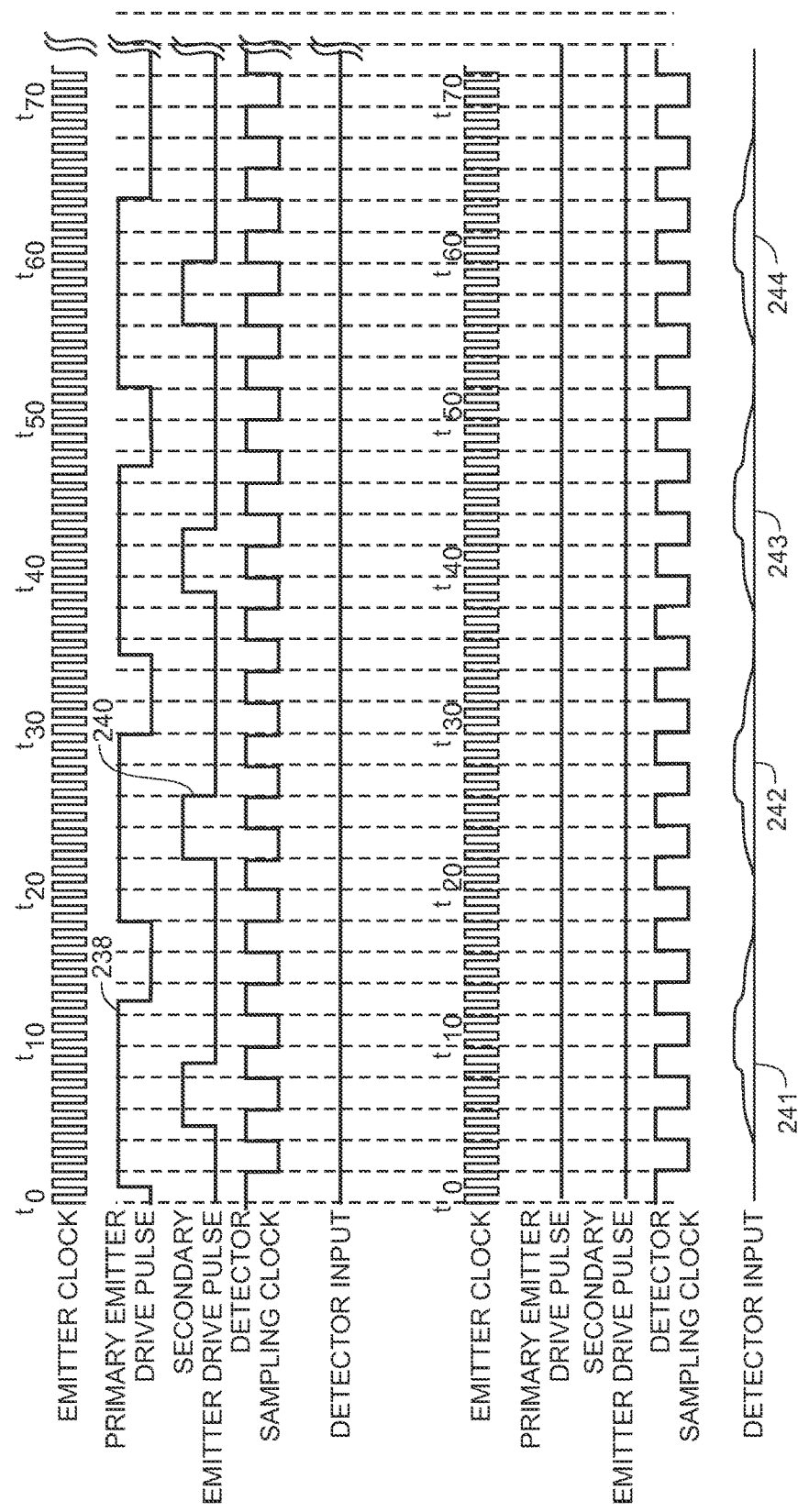
FIG. 17 illustrates the electrical and optical timing of a dual-frequency emitter system with relative time-shifted emitter pulses in accordance with an embodiment of the invention.

FIG. 17 shows the electrical and optical timing for a multi-pulse embodiment with emitters at two frequencies. In this embodiment the emitter clock is a signal that is used to determine the start time for the emitter drive pulses. Each activation of the electrical emitter drive pulses results in a corresponding activation of the optical emitter outputs. The detector sampling clock determines the sampling rate of the detector frame buffers. Utilizing positive transition logic, one detector frame buffer is filled with sampled detector data on each rising edge of the detector sampling clock. In a traditional system with a single-pulse emitter cycle, the start time for the emitter drive pulse is typically synchronized with the detector sampling clock.

In the FIG. 17 embodiment the frequency of the emitter clock is four times the frequency of the detector sampling clock. The four primary emitter pulses 238 and the four secondary emitter pulses 240 are offset in time by an emitter pulse cycle time and by a fraction of the detector sampling clock. The start times for the primary and secondary emitter drive pulses for the first emitter period are delayed by ¼ of a detector clock period, or one emitter clock period. The start times for the primary and secondary emitter drive pulses for the second emitter period are delayed by ½ of a detector clock period, or two emitter clock periods. The start times for the primary and secondary emitter drive pulses for the third emitter period are delayed by ¾ of a detector clock period, or three emitter clock periods. The start times for the primary and secondary emitter drive pulses for the fourth emitter period are delayed by one detector clock period, or four emitter clock periods.

At a point later in time (around $t_{84}$ in FIG. 17), the reflected signals begin energizing the detector input circuitry. The returned signals 241, 242, 243, 244 correspond to the reflected portions of the four primary and four secondary pulses emitted previously.

Emitters operating at different frequencies are utilized to establish distance measurement capabilities for objects that are out of range for single-frequency emitters. The primary emitter drive pulse 238 is activated for three emitter clock periods. The secondary emitter drive pulse 240 is activated for one emitter clock period. For embodiments whereby sampled frame buffers are analyzed for detected objects angular characteristics, the secondary emitter output should not be energized during the transition times for the primary emitter pulse 238, or the primary and secondary emitters should be energized with 100% overlap. Furthermore, the time difference between the leading edges of the two emitter pulses and the trailing edges of the two emitter pulses should be sufficient to allow two detector sampling periods between the pairs of successive edges. The retroreflected information from the object is represented by the detector input. The intensity values shown here are analyzed by the GPU and deemed as not having sufficient amplitude to perform volumetric analysis, segmentation analysis, constant ratio processing and/or leading/training edge analysis. Therefore, frequency analysis is performed to determine time of flight processing for the object.

FFT processing is performed on each location in the detector array to determine time of flight for the detected objects. By utilizing Eq. 17 and Eq. 18 the FFT parameters are established for the number of frequency bins, the frequency resolution of each bin and the number of samples needed for the frequencies utilized by the primary and secondary emitters. Since the sampled waveforms are a result of relative time-shifted emitter pulses, the sampled FFT values can be utilized to reconstruct the higher effective sampling rate waveform according to Eq. 15.

As a practical example the system in FIG. 17 utilizes a sampling frequency of 500 MHz, a detector sampling clock period of 2 nSec, detector frame buffers with 128 samples, a primary emitter wavelength of 1550.001 nanometers and a secondary emitter wavelength of 1550.002 nanometers. An FFT analysis of the frame buffers by the GPU will detect a maximum frequency of 250 MHz, will utilize 64 bins with each bin having a resolution of 3.90625 MHz. The Δf of the primary and secondary emitters is 125 MHz, which is below the maximum frequency threshold. The FFT analysis will yield the amplitudes of the various frequency components for each frequency bin at each sampling time. Upon completion of the FFT the GPU will analyze the 125 MHz values to determine the sample locations at which this frequency yielded a signal. The amplitude of the 125 MHz frequency components at the sampling times are utilized to determine the time of flight for each detector element and the intensity value to be reported to the upstream application. Since this example utilized four relative time-shifted emitter pulse pairs with start times offset by ¼ of a detector clock period for each subsequent pair, the effective sampling frequency is 2 GHz, or four times the detector sampling frequency. In turn, the effective sampling period is 500 picoseconds, or ¼ of the detector sampling period. The measurement precision of the four-pulse, dual-frequency emitter system is increased by a factor of four for objects that are out of range for a single-frequency emitter embodiment.

Figure 18:
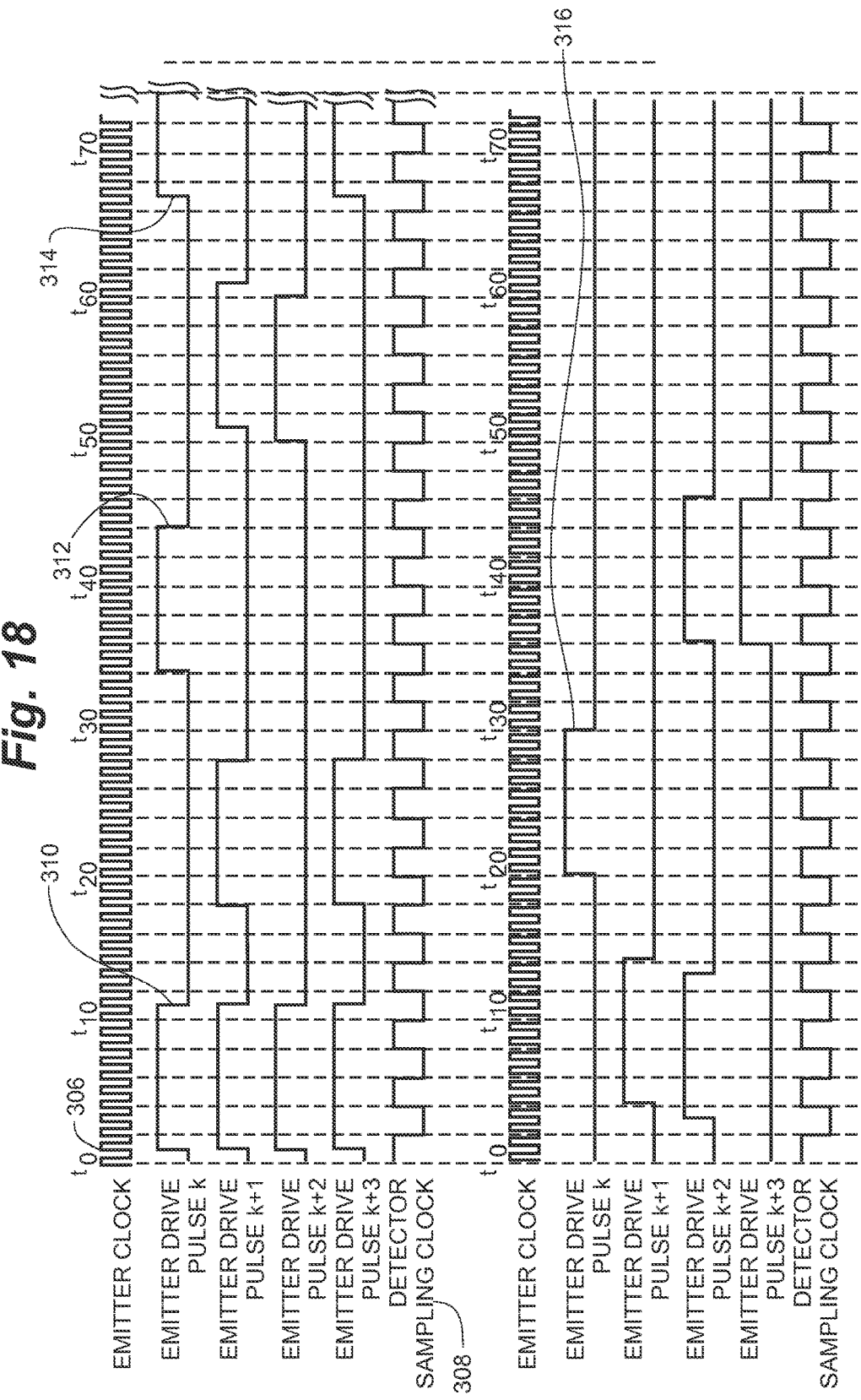
FIG. 18 illustrates the timing of a system with encoded emitter pulse streams and relative time-shifted emitter pulses in accordance with an embodiment of the invention.

LiDAR systems can be susceptible to crosstalk and other interference from energy sources at or near the target device frequencies. Multi-emitter LiDAR systems can emit locally unique waveforms, thus allowing detection circuitry to differentiate the target device reflected signals from the crosstalk or interference signals. U.S. patent application Ser. No. 14/078,001, which is commonly owned with the present application and the disclosure of which is hereby incorporated by reference, discloses an exemplary embodiment of a multi-emitter LiDAR system. FIG. 18 shows the electrical timing for a multi-pulse embodiment whereby the emitters utilize locally unique waveforms with emitter waveforms sequenced by 1/N emitter clock offsets to increase the effective sampling rate of each waveform, where N is the ratio of the effective sampling frequency to the actual sampling frequency.

For the succession of pulses within each emitter pulse sequence, the start time for each pulse number is determined by:

$t_n(e)$=the start times for each pulse for emitter $e$ (Eq. 21)

for $i=0$ to $M, n=P_e(i)*((T*i)+\Sigma_{j=0}^{i} P_e(j))$ (for all $n>0$) (Eq. 22)

where M indicates the number of possible emitter activation periods e identifies the emitter number T is the number of emitter clock cycles per emitter activation period $P_e(i)$ is the activation vector for the encoded sequence for emitter e Utilizing a value of M=8 possible activation periods and N=4 logic one values for each emitter activation vector, the four activation vectors for FIG. 18 are assigned as:

| Emitter # | Activation Vector |
|---|---|
| k | [1, 0, 1, 0, 1, 0, 1, 0] |
| k + 1 | [1, 1, 0, 0, 1, 0, 1, 0, 0] |
| k + 2 | [1, 0, 0, 0, 1, 0, 1, 0, 1] |
| k + 3 | [1, 1, 0, 0, 1, 0, 0, 1] |

Utilizing a value of T=16 emitter clock cycles for each emitter activation period the starts times for each emitter activation period are:

| Emitter Activation Period # | Period Start Time |
|---|---|
| 0 | $t_0$ |
| 1 | $t_{16}$ |
| 2 | $t_{32}$ |
| 3 | $t_{48}$ |
| 4 | $t_{64}$ |
| 5 | $t_{80}$ |
| 6 | $t_{96}$ |
| 7 | $t_{112}$ |

Using the values of T=16, N=4 and the activation vectors specified herein for FIG. 18, the start times for the N=4 pulses for the four emitters according to Eq. 21 are:

| Emitter # | Emitter Pulse Start Times |
|---|---|
| k | $t_1, t_{34}, t_{67}, t_{100}$ |
| k + 1 | $t_1, t_{18}, t_{51}, t_{84}$ |
| k + 2 | $t_1, t_{50}, t_{83}, t_{116}$ |
| k + 3 | $t_1, t_{18}, t_{67}, t_{116}$ |

In FIG. 18 the emitter clock 306 is an electrical signal that is used to determine the start time for each emitter drive pulse. Each activation of the electrical emitter drive pulses results in corresponding activation of the optical emitter outputs. The detector sampling clock 308 determines the sampling rate of the detector frame buffers. Utilizing positive transition logic, one detector frame buffer is filled with sampled detector data on each rising edge of the detector sampling clock 308. In a traditional system with a single-pulse emitter cycles, the start times for the emitter drive pulses are typically synchronized with the detector sampling clock 308.

In the FIG. 18 embodiment the frequency of the emitter clock 306 is four times the frequency of the detector sampling clock 308. Each of the emitter drive pulses—k, k+1, k+2 and k+3—will sequence four discrete pulses over the emitter drive period. The locally unique pulse encoding scheme utilizes four activations within eight possible emitter activation periods.

The four emitter pulses for each of the emitter sequences are offset in time by an integer number of emitter activation periods and by a fraction of the detector sampling clock 308. The start time for the first emitter drive pulse 310 for emitter k is delayed by ¼ of the detector clock period, or one emitter clock period. The start time for the second emitter drive pulse 312 for emitter k is delayed by ½ of the detector clock period, or two emitter clock periods. The start time for the emitter drive pulse 314 for emitter k is delayed by ¾ of the detector clock period, or three emitter clock periods. The start time for the emitter drive pulse 316 for emitter k is delayed by one detector clock period, or four emitter clock periods. Each of the sampled waveforms corresponding to each emitter is reconstructed to create a volumetric waveform with en effective sampled rate of N times the detector sampling clock rate.

Figure 19A:
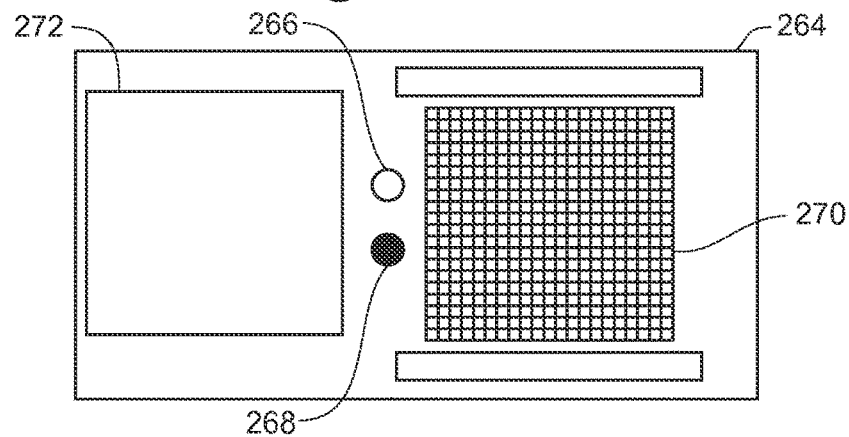
FIG. 19a-19b illustrates potential device layouts for optical and electrical components in accordance with an embodiment of the invention.

FIG. 19a shows a typical device 264 layout for an embodiment with two emitters and a detector array 270. The primary emitter 266 and secondary emitter 268 are controlled by the circuitry 272. The emitters 266, 268 may operate at the same frequency to increase emitted amplitude or may be operated at two frequencies to enable FFT analysis of the sampled waveforms to increase the range of the device 264 or to minimize crosstalk or interference. The control circuitry will include emitter control circuitry, detector sampling memory, A/D converters, GPUs, one or more control units, local memory, and support logic for device I/O and timing. The electrical and optical components may be fabricated on a single semiconductor die or may be fabricated on disparate die and mounted on a substrate. Emitter 266, 268 lenses may be added during the semiconductor fabrication phase or added to the device 264 as part of assembly. Detector lenses or waveguides may be added during the semiconductor fabrication phase or added to the device 264 as part of assembly.

Figure 19B:
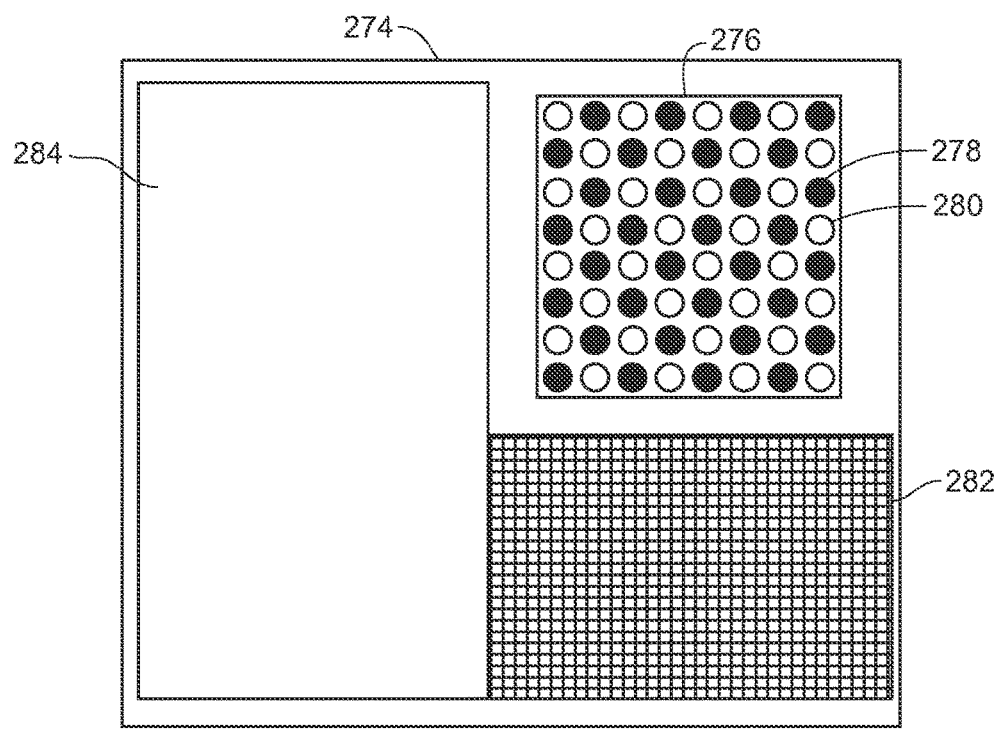

FIG. 19b shows a typical device 274 layout for an embodiment with an array of emitters 276 and a detector array 282. The primary emitters 278 and secondary emitters 280 are controlled by the circuitry 284. The emitters 278, 280 may operate at the same frequency to increase emitted amplitude or may be operated at two frequencies to enable FFT analysis of the sampled waveforms to increase the range of the device 274. The control circuitry will include emitter control circuitry, detector sampling memory, A/D converters, GPUs, one or more control units, local memory, and support logic for device I/O and timing. The electrical and optical components may be fabricated on a single semiconductor die or may be fabricated on disparate die and mounted on a substrate. Emitter 278, 280 lenses may be added during the semiconductor fabrication phase or added to the device 274 as part of assembly. Detector lenses or waveguides may be added during the semiconductor fabrication phase or added to the device 274 as part of assembly.

The electrical circuitry in FIGS. 19a and 19b is described utilizing semiconductor nomenclature. In other embodiment circuitry and control logic that utilizes optical computing, quantum computing or similar miniaturized scalable computing platform may be used to perform part or all of the necessary high-speed logic, digital storage, and computing aspects of the systems described herein. The optical emitter elements are described utilizing fabricated semiconductor laser diode nomenclature. In other embodiments the requirements for the various techniques described herein may be accomplished with the use of any controllable photon-emitting elements wherein the output frequency of the emitted photons is known or characterizable, is controllable with logic elements, and is of sufficient switching speed.

Figure 20:
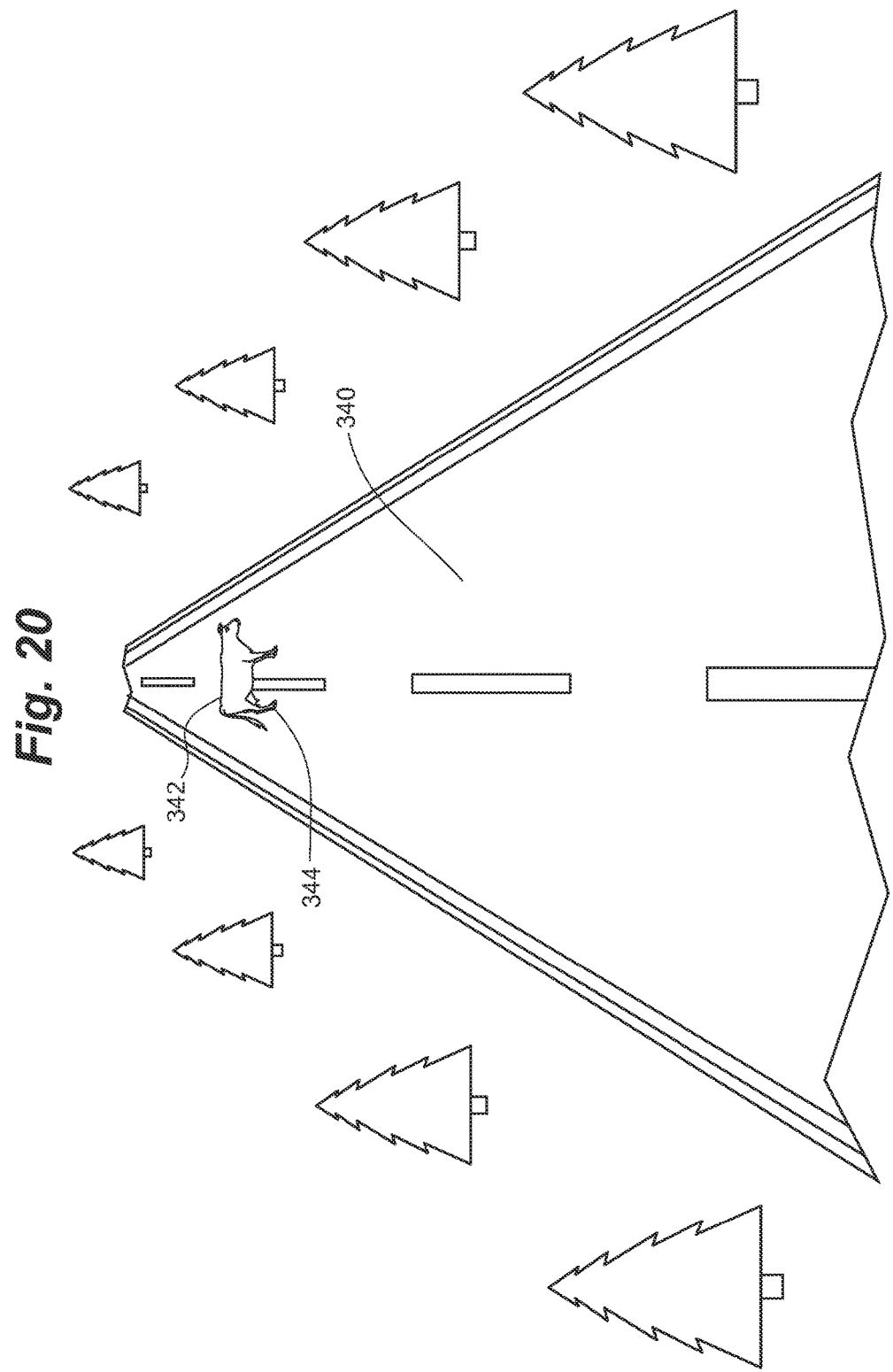
FIG. 20 illustrates the use of a device in accordance with an embodiment of the invention for detecting low-reflection objects and non-reflective objects utilizing contextual information.

In various embodiments, high density detector arrays can enable the use of contextual information to detect low-reflectivity or non-reflective objects. FIG. 20 shows the view of a roadway 340 as displayed within the field of view of a LiDAR device. The animal 342 in the roadway 340 has surface characteristics that cause most of the incident radiation to be absorbed, thus producing a "LiDAR black hole". Analysis of the detector array elements for a detector/emitter cycle will yield points along the roadway 340 that, when analyzed spatially, will produce a view of the continuous surface that is the roadway 340. Some of the elements in the detector array, those corresponding to return signals from the LiDAR black hole 342, will have zero or near-zero values throughout the detector/emitter cycle. Embodiments of the LiDAR system described herein utilize the contextual information from the more-reflective features in the scene to determine that the zero or near-zero signals are the result of the LiDAR black hole 342 and not due to the absence of an object within the device's range. In various embodiments of a LiDAR system as described herein, the information can be reported to the upstream application in the form of (d, φ, θ, i)—where d is the distance to each measured point or object from the device, φ and θ is the angle of each point/object and i is the signal intensity—and would report d values equivalent to the d value for the closest location established from the contextual information. In FIG. 20, these d values would be the same as the point on the roadway near the animal's 342 foot 344.

Figure 21:
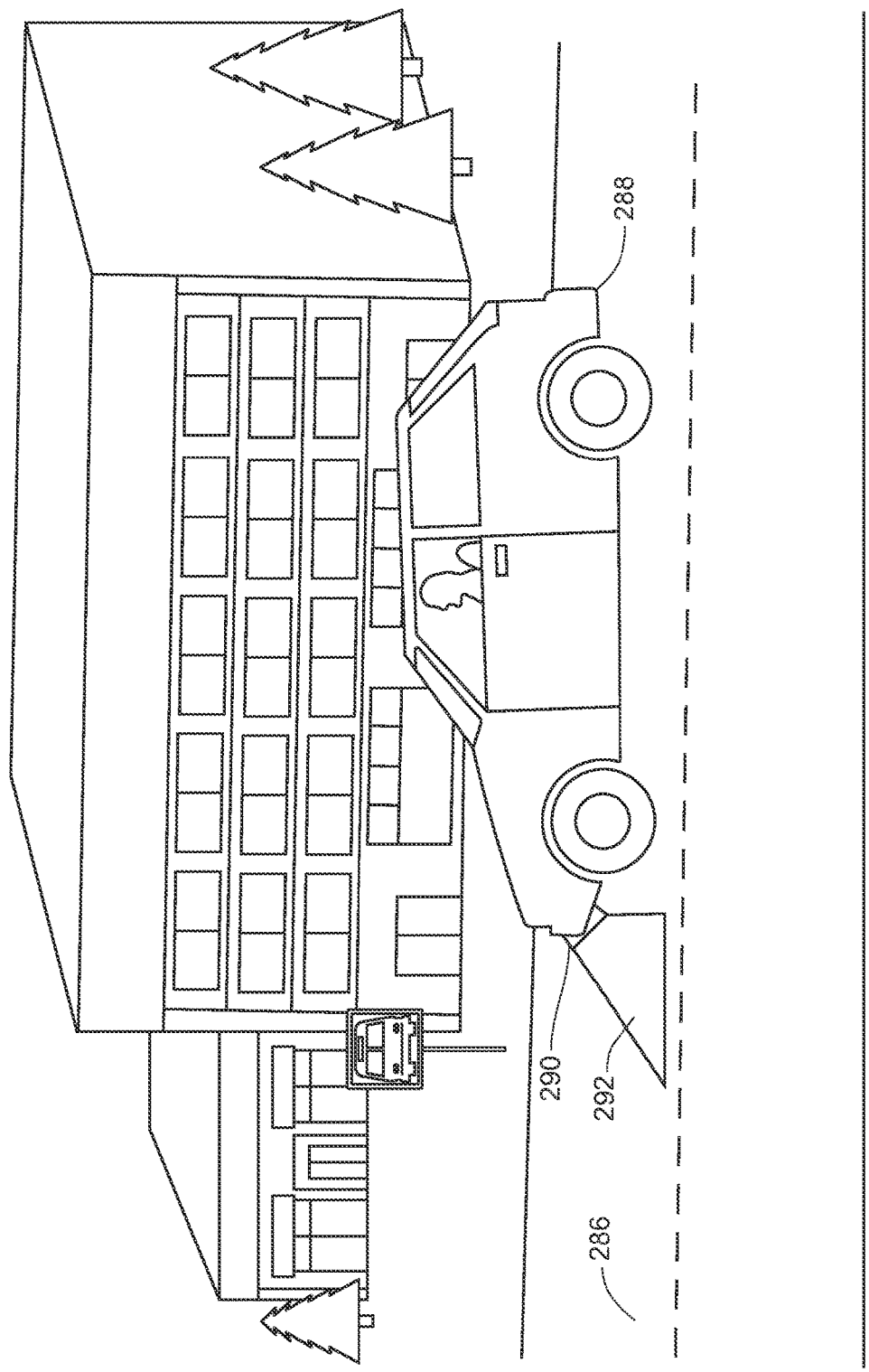
FIG. 21 illustrates the use of a device in accordance with an embodiment of the invention in a road surface detection and analysis application.

FIG. 21 shows a typical two-lane roadway 286 as imaged from a LiDAR device 290 in accordance with various embodiments of the present invention on a vehicle 288 that is traversing the roadway 286. The device 290 is a high effective sampling rate LiDAR device 290 and the field of view 292 of the device 290 includes an area on the roadway 286 over which the vehicle 288 will traverse. The device has a detector array with 4 million horizontal elements. With a diverging field of view over a four meter vehicle path and a sensor height of 0.3 meters the horizontal pixel size on the road surface will be roughly one micron at the center of the vehicle path and roughly 1.4 microns at the edge of the vehicle path. The device is utilized in a multi-sample mode whereby multiple pulses are emitted and sampled at a high rate, with each emitted pulse offset by a fraction of the detector sampling clock to achieve a high effective sampling rate. In this example the device emits 1000 pulses with a detector sampling period of 0.2 nSec. By utilizing volumetric reconstruction of the detector frame buffers, an effective sampling period of 0.5 picoseconds is achieved. Using a light velocity of 300 mm/nSec, a 0.2 picosecond effective sampling period equates to an inter-frame spacing of 0.06 mm.

For each 1.2 micron (average) section of the roadway in front of the vehicle the device will have a distance measurement from the sensor accurate to within 30 microns (using inter-frame interpolation) and a retroreflected intensity value. At this granularity the device can interpret and compute roadway textures. Low amplitude pixel-to-pixel variability and group-of-pixel variability in sensor-to-roadway distances will signal fine and coarse textures respectively. Little or no pixel-to-pixel or group-of-pixel variability in sensor-to-roadway distances will signal no texturing or very fine texturing in the roadway surface. For smooth roadway surfaces, analysis of the pixel intensity values will yield information about the surface of the roadway, with uniform intensity values with high amplitude signaling an ice-covered roadway conditions and uniform intensity values with low amplitude signaling a fluid-covered roadway. The chart below outlines the characteristics of the captured frame buffers of the FIG. 21 sensor and the information determined from the characteristics.

| Distance Variation | Intensity Values | Feature Detected |
| --- | --- | --- |
| Discontinuity | Discontinuity | Roadway Distress (crack) |
| Raised discontinuity | High amplitude | Reflective markings |
| Low pixel-to-pixel | Medium pixel-to-pixel | Smooth, dry surface |
| Low group-of-pixel | Medium pixel-to-pixel | Textured surface |
| Low pixel-to-pixel | High amplitude uniform | Ice-covered |
| Low pixel-to-pixel | Medium amplitude uniform | Fluid-covered |

The list of road surface features and characteristics is not exhaustive, and it will be understood that other road surface features and characteristics that are detectable and quantifiable with a LiDAR system are contemplated in accordance with embodiments of the present invention. In some embodiments, such road surface features will be detectable and quantifiable by a LiDAR system in accordance with embodiments of the present invention that has a spatial resolution of less than one micron, distance measuring capability with a precision of 1 micron or less, and intensity values for each pixel.

Roadway surface friction is a function of, among other things, surface material type, and three-dimensional surface area. The 3D surface area is a function of texture amplitude (difference between minimum and maximum surface elevations) and texture resolution (horizontal spacing between minimum and maximum surface elevations). Embodiments consistent with the horizontal pixel resolution and high effective rate sampling of the FIG. 21 embodiments allow for the collection and measurement of roadway texture amplitude and texture resolution at posted highway speeds, thus allowing real-time or post-processed friction analysis and measurement for a non-contact system.

Figure 22:
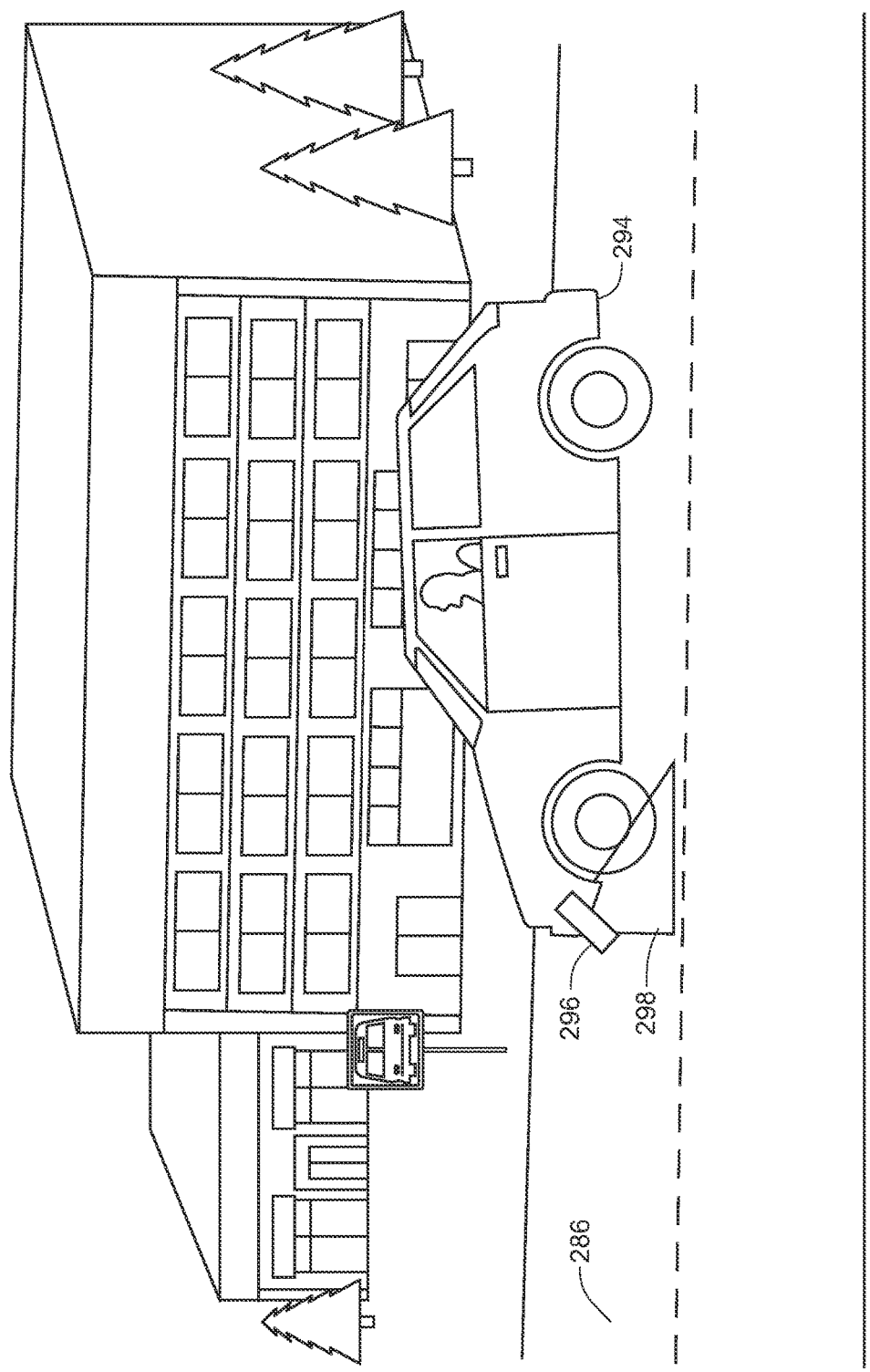
FIG. 22 illustrates the use of a device in accordance with an embodiment of the invention in a road surface deflectometer application.

Roadway surface integrity and roadway life cycle estimates typically rely on deflectometer testing whereby the deflectometer measures minute deformations in materials under transverse stress. FIG. 22 shows a typical two-lane roadway 286 as imaged from a LiDAR device 296 in accordance with embodiments of the present invention on a vehicle 294 that is performing deflectometer measurement within the device 296 field of view 298. Using device 296 specifications of 1 micron transverse pixel resolution and an effective sampling period of 0.2 picoseconds, surface deformations can be measured with a precision of 30 microns (using inter-frame interpolation).

Figure 23:
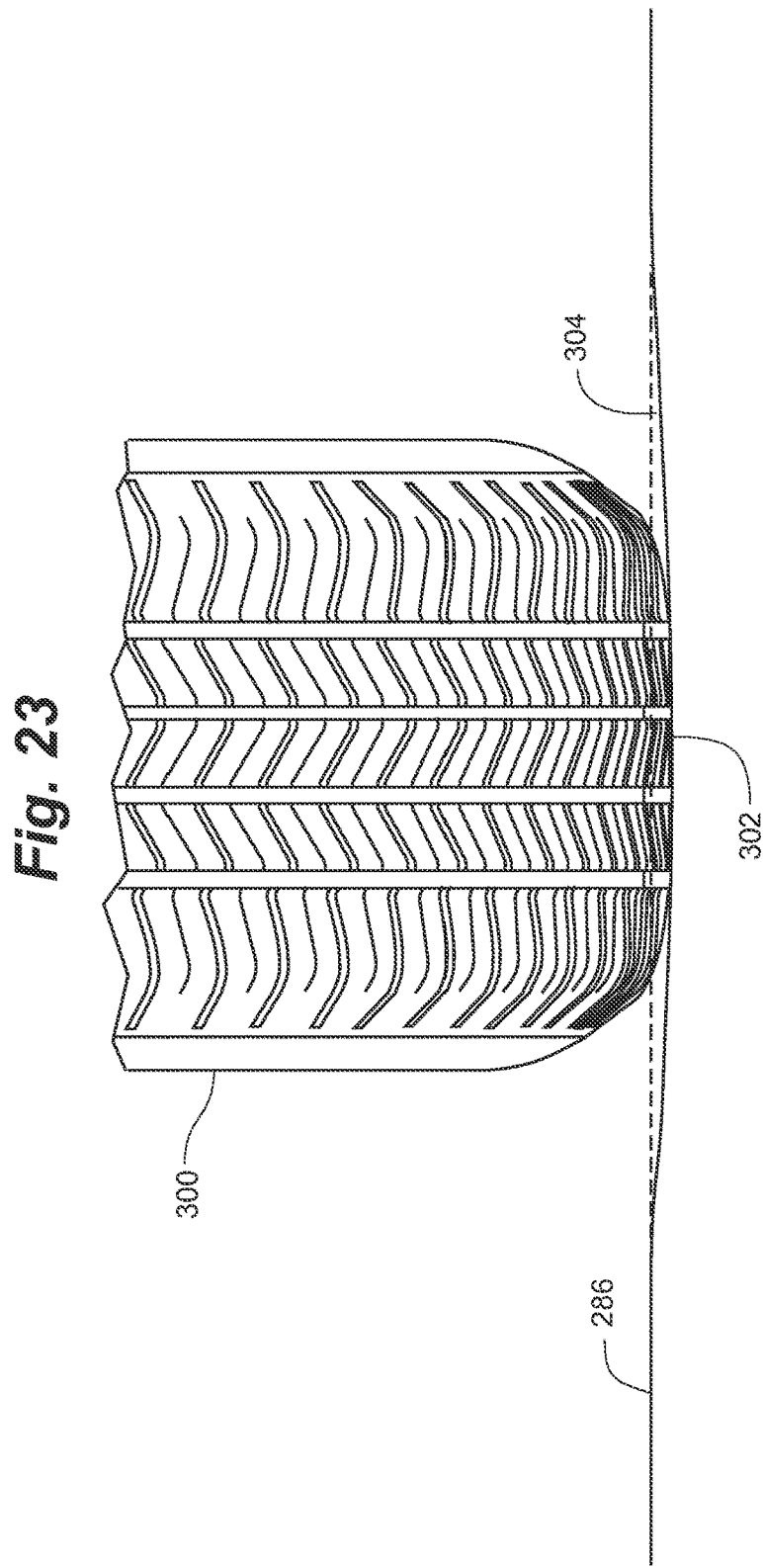
FIG. 23 illustrates a lateral view of the road surface deflectometer application.

FIG. 23 shows a cross-sectional view of the roadway 286 surface deformation 302. Depending upon the nature of the road surface (e.g., asphalt), the vehicle tire 300 may cause road surface deformation 302 at points under the tire and at the sides of the tire. The dotted line 304 shows the starting location of the roadway surface prior to deformation 302. Various embodiments of the present invention may be utilized to scan the roadway 286 and analyze surface deformations 302 for purposes of providing, for example, surface deflectometer measurements.

Figure 24:
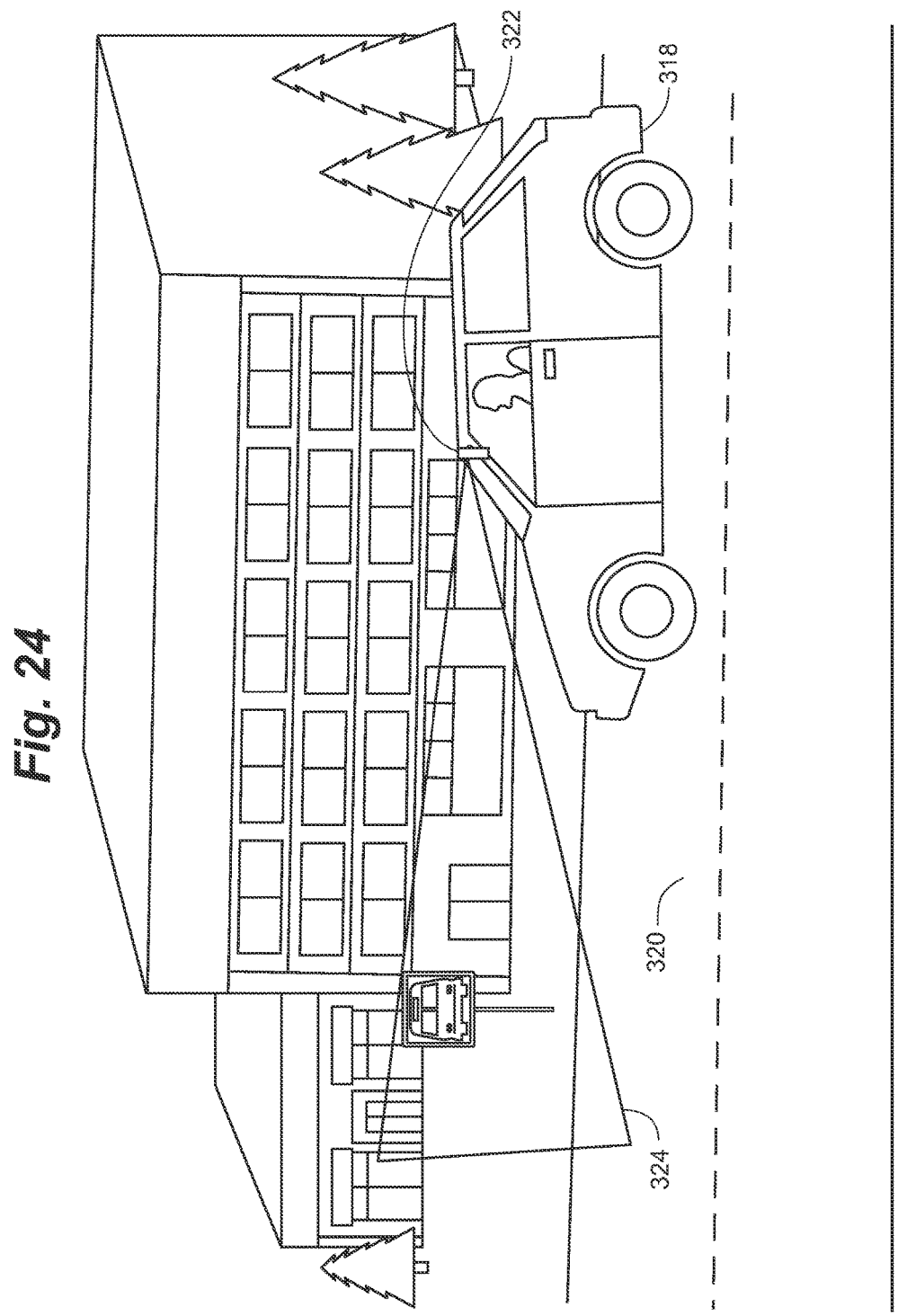
FIG. 24 illustrates the use of a device in accordance with an embodiment of the invention in an autonomous vehicle application.

FIG. 24 shows a use for embodiments of the present invention. A vehicle 318 traversing a roadway 320 contains a LiDAR device 322 that enables semi-autonomous or full autonomous capabilities for the vehicle 318. The device 322 may be mounted inside the vehicle 318 behind the windshield or may be mounted external to the vehicle 318. An example field of view 324 for the forward navigation direction of the vehicle 318 is shown. In other embodiments, multiple fields of view 324 may be captured with different LiDAR devices 322 oriented in different directions relative to the forward navigation of the vehicle 318, e.g., side view, rear view, corner view.

FIG. 25 shows another use for embodiments of the present invention. An Unmanned Aerial Vehicle (UAV) 326 utilizes six devices 328, each with a 90°×90° field of view 332. Utilizing six devices 328 allows for LiDAR coverage at every orientation (360° horizontally and vertically) surrounding the UAV 326. UAVs 326 equipped as such can be used for autonomous low-altitude data collection for structure analysis, assessment, and surveillance.

In some embodiments, the light energy or light packet is emitted and received as near-collimated, coherent, or wide-angle electromagnetic energy, such as common laser wavelengths of 650 nm, 905 nm or 1550 nm. In some embodiments, the light energy can be in the wavelength ranges of ultraviolet (UV)—100-400 nm, visible—400-700 nm, near infrared (NIR) 700-1400 nm, infrared (IR)—1400-8000 nm, long-wavelength IR (LWIR)—8 um-15 um, far IR (FIR)—15 um-1000 um, or terahertz—0.1 mm-1 mm. The various embodiments of the present invention can provide increased device resolution, higher effective sampling rates and increased device range at these various wavelengths.

Detectors as utilized in the various embodiments refer to discrete devices or a focal plane array of devices that convert optical energy to electrical energy. Detectors as defined herein can take the form of PIN photodiodes, avalanche photodiodes, photodiodes operating at or near Geiger mode biasing, or any other devices that convert optical to electrical energy whereby the electrical output of the device is related to the rate at which target photons are impacting the surface of the detector. Detectors can also embody elements that convert photons to charges and accumulate said charges over a defined charge collection window for each element.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A light detecting and ranging (LiDAR) system for acquiring information about objects in a scene, the LiDAR system comprising:
    at least one emitter configured to generate emitted radiation within a defined frequency range throughout a field of view of the scene, wherein the emitted radiation is a sequence of N successive pulses with each successive pulse having a same amplitude and duration and a different relative time shift in relation to a sampling time reference signal;
    an array of detectors configured to receive reflected radiation within the defined frequency range for the field of view;
    circuitry operably coupled to the array of detectors to generate and store digital information corresponding to each detector in the array of detectors, the digital information for each detector in the array of detectors being sampled and stored in a unique one of a set of frame buffers in response to the sampling time reference signal; and
    a processing system operably connected to the set of frame buffers and configured to construct a sampled waveform representing the field of view based on the digital information in the set of frame buffers having an effective sampling frequency that is N times a frequency of the sampling time reference signal, and to output at least one parameter based on an analysis of the sampled waveform.

2. The LiDAR system of claim 1 wherein one of the parameters in the analysis is a distance to an object based on time of flight of the emitted and reflected radiation, or an angle of an object associated with the reflected radiation.

3. The LiDAR system of claim 1 wherein the processing system includes at least one graphics processing unit (GPU) configured to process the stored information using a volumetric analysis of information for at least a given detector as stored in at least the frame buffer corresponding to the given detector that is performed for multiple points in time or samples within that frame buffer such that multiple periodic samples are evaluated to reconstruct and analyze the reflected radiation.

4. The LiDAR system of claim 1 wherein the at least one emitter generates emitted radiation at two different frequencies with overlapping fields of view within the scene, and wherein the processing system performs frequency analysis on information for at least a given detector as stored in at least the frame buffer corresponding to the given detector to determine sampling times at which differences in frequency waveforms are detected.

5. The LiDAR system of claim 4 wherein the processing system outputs the at least one parameters based on the analysis of the differences in frequency waveforms.

6. The LiDAR system of claim 5 wherein the frequency analysis is a Fast Fourier Transform.

7. The LiDAR system of claim 1 wherein the emitted radiation is emitted in packets and the processing system includes at least one graphics processing unit (GPU) configured to produce multiple output points for each packet of the emitted radiation corresponding to a pre-defined grid of points for the field of view of the emitter.

8. The LiDAR system of claim 7 wherein the GPU is configured to utilize at least one analysis selected from a segmentation analysis to differentiate between multiple objects in a single field of view, an edge-detection process to define an edge feature describing an edge of an object in the field of view, or a corner-detection process to define a corner feature describing a corner of an object in the field of view.

9. The LiDAR system of claim 1 wherein the set of frame buffers includes at least three frame buffers corresponding to each detector that are collectively analyzed by the processing system for that detector.

10. The LiDAR system of claim 9 wherein the processing system collectively analyzes the at least three frame buffers for each detector to compare relative intensities among detectors in the detector array, or to determine a direction and a rate of a slope of objects detected within the field of view based on a time domain analysis, or both.

11. The LiDAR system of claim 1 wherein the at least one emitter is configured for in situ calibration by emitting pre-determined calibration patterns of emitted radiation and measuring at least one of an intensity, a location or an angle of the reflected radiation.

12. The LiDAR system of claim 1 wherein each detector in the detector array has a unique angle through which the reflected radiation is received.

13. The LiDAR system of claim 1 wherein the emitted radiation is collimated electromagnetic energy selected from the wavelength ranges of: ultraviolet (UV)—100-400 nm, visible—400-700 nm, near infrared (NIR)—700-1400 nm, infrared (IR)—1400-8000 nm, long-wavelength IR (LWIR)—8 um-15 um, or far IR (FIR)—15 um-1000 um.

14. The LiDAR system of claim 1 wherein the emitter is a laser diode.

15. The LiDAR system of claim 14 wherein the laser diode is tunable by a waveform that represents a bias voltage or a bias current that varies over a sampling period defined by successive ones of the sampling time reference signal.

16. The LiDAR system of claim 1 wherein the emitter utilizes two or more frequencies that have a reflected radiation that produces a chirp frequency as a difference between the frequencies of the emitted radiation.

17. The LiDAR system of claim 1 wherein the processing system performs an N-sample Fast Fourier Transform to determine a time location of the chirp frequency for each detector.

18. A light detecting and ranging (LiDAR) system for acquiring information about objects in a scene, the LiDAR system comprising:
an array of detectors configured to receive retroreflected radiation within a defined frequency range for a field of view of the scene;
circuitry operably coupled to the array of detectors including analog-to-digital (A/D) converters to generate digital data and sampling circuitry to generate a sampling time reference signal;
a set of frame buffers operably coupled to the array of detectors and the circuitry to sample and configured to store digital data from each detector in response to the sampling time reference signal as sampled data;
a plurality of emitters to generate incident radiation within the defined frequency range throughout the field of view, the incident radiation being generated at two frequencies with overlapping fields of view within the scene, the difference between the frequencies being designated as $\Delta f$;
a processing system configured to perform a frequency analysis on the sampled data to determine sampling times at which $\Delta f$ waveforms are detected and generate at least one parameter based on the frequency analysis.

19. The LiDAR system of claim 10 wherein the incident radiation is a sequence of N successive pulses with each successive pulse exhibiting the same amplitude and duration and a relative time shift in relation to the sampling time reference signal, and wherein the processing system is configured to construct a version of the sampled data having an effective sampling frequency that is N times a frequency of the sampling time reference signal.

20. A method for detecting and identifying an object within a field of view of a scene comprising:
providing a LiDAR system, the LiDAR system including an emitter and a detector array;
activating the emitter to emit a series of N successive pulses over a field of view for the scene, wherein each successive pulse has a same amplitude and duration and a different relative time shift in relation to a sampling time reference signal;
sampling a portion of reflected energy from the emitted light pulses utilizing the detector array at a frequency that is N times the sampling time reference signal and storing the sampled data in a set of frame buffers;
using a processing system to construct a sampled waveform representing the field of view based on the data in the set of frame buffers, and analyze sampled waveform to identify and detect an object within the field of view.

* * * * *